(12) United States Patent
Zhu

(10) Patent No.: US 11,848,591 B2
(45) Date of Patent: Dec. 19, 2023

(54) SYSTEMS, METHODS, AND COMPUTER-READABLE MEDIA FOR DRIVING POLYPHASE MOTORS

(71) Applicant: Yufei Zhu, Santa Clara, CA (US)

(72) Inventor: Yufei Zhu, Santa Clara, CA (US)

(*) Notice: Subject to any disclaimer, the term of this patent is extended or adjusted under 35 U.S.C. 154(b) by 0 days.

(21) Appl. No.: 18/026,375

(22) PCT Filed: Sep. 15, 2021

(86) PCT No.: PCT/US2021/050528
§ 371 (c)(1),
(2) Date: Mar. 15, 2023

(87) PCT Pub. No.: WO2022/060885
PCT Pub. Date: Mar. 24, 2022

(65) Prior Publication Data
US 2023/0283154 A1 Sep. 7, 2023

Related U.S. Application Data

(60) Provisional application No. 63/078,334, filed on Sep. 15, 2020.

(51) Int. Cl.
*H02K 21/14* (2006.01)
*H02P 6/10* (2006.01)
(Continued)

(52) U.S. Cl.
CPC .......... *H02K 21/14* (2013.01); *H02K 1/2766* (2013.01); *H02K 3/28* (2013.01); *H02K 11/33* (2016.01);
(Continued)

(58) Field of Classification Search
CPC ........ H02K 21/14; H02K 1/2766; H02K 3/28; H02K 11/33; H02K 1/246; H02K 1/223; H02K 1/243; H02K 1/265; H02K 1/2706; H02K 1/2713; H02K 1/272; H02K 1/2726; H02K 1/274; H02K 1/2746; H02K 1/2753;
(Continued)

(56) References Cited

U.S. PATENT DOCUMENTS 5,925,965 A 7/1999 Li et al.
6,864,661 B2 3/2005 Edelson
(Continued)

FOREIGN PATENT DOCUMENTS

WO WO-2016193031 A1 * 12/2016 .......... H02P 23/0031

*Primary Examiner* — Bickey Dhakal
(74) *Attorney, Agent, or Firm* — VAN COURT & ALDRIDGE LLP

(57) ABSTRACT

Systems, methods, and computer-readable media for driving polyphase motors are provided. A system is provided that may include an inverter with more than three phases, a stator with more than three phases, and a rotor with a number of poles. The geometry, construction, magnet flux distribution, and/or reluctance distribution can be varied between rotor poles. A method is provided that may control a system by selectively activating inverter half-bridges or other suitable inverter components, and energizing stator coils with different amplitude, which may result in non-repeating stator combined magnetic flux distribution, which may electromagnetically couple and produce torque on individual rotor poles, such as based on a pre-determined efficiency map.

15 Claims, 34 Drawing Sheets

(51) Int. Cl.
| | |
|---|---|
| *H02K 11/33* | (2016.01) |
| *H02K 3/28* | (2006.01) |
| *H02P 25/10* | (2006.01) |
| *H02K 1/276* | (2022.01) |
| *H02K 1/24* | (2006.01) |
| *H02P 25/22* | (2006.01) |
| *H02P 25/022* | (2016.01) |

(52) U.S. Cl.
CPC .............. *H02P 6/10* (2013.01); *H02P 25/022* (2013.01); *H02P 25/107* (2013.01); *H02P 25/22* (2013.01); *H02K 1/246* (2013.01)

(58) Field of Classification Search
CPC .... H02K 1/276; H02K 1/2773; H02K 1/2786; H02K 1/2793; H02P 6/10; H02P 25/022; H02P 25/107; H02P 25/22
See application file for complete search history.

(56) References Cited

U.S. PATENT DOCUMENTS

| | | | |
|---|---|---|---|
| 7,710,081 | B2 | 5/2010 | Saban et al. |
| 2004/0145330 | A1 | 7/2004 | Maslov et al. |
| 2007/0046247 | A1 | 3/2007 | Barie et al. |
| 2011/0298310 | A1 | 12/2011 | Ross et al. |
| 2013/0049513 | A1* | 2/2013 | El-Refaie ............... H02K 1/278 310/156.43 |
| 2015/0022036 | A1 | 1/2015 | Devarakonda et al. |
| 2019/0207446 | A1 | 7/2019 | Swales et al. |
| 2021/0273505 | A1* | 9/2021 | Jing ........................ H02P 29/60 |

\* cited by examiner

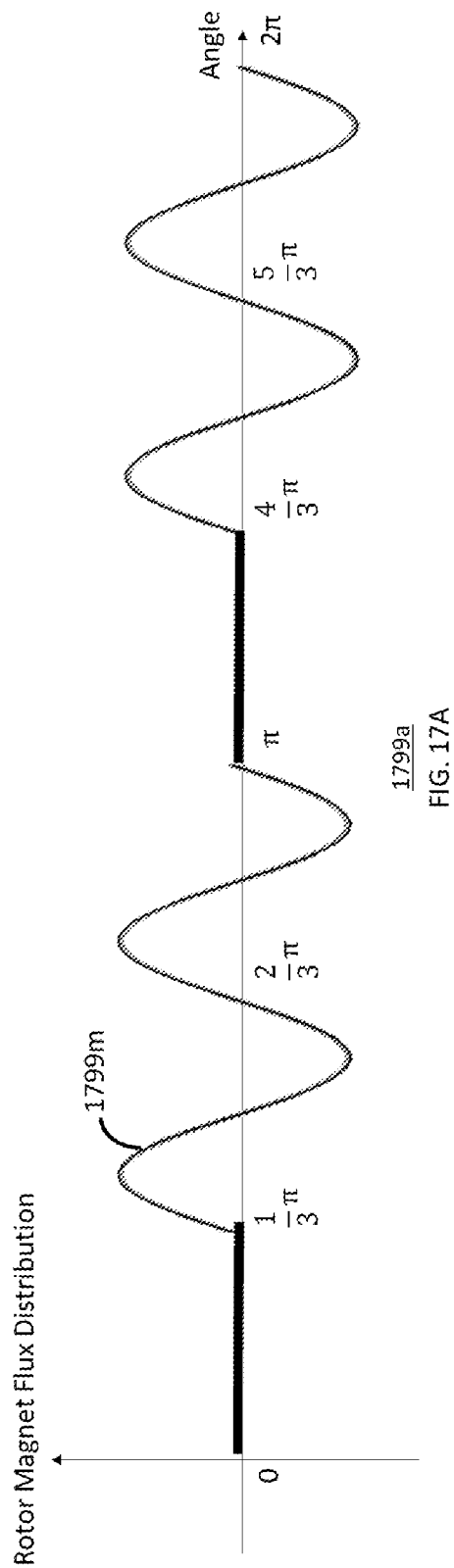

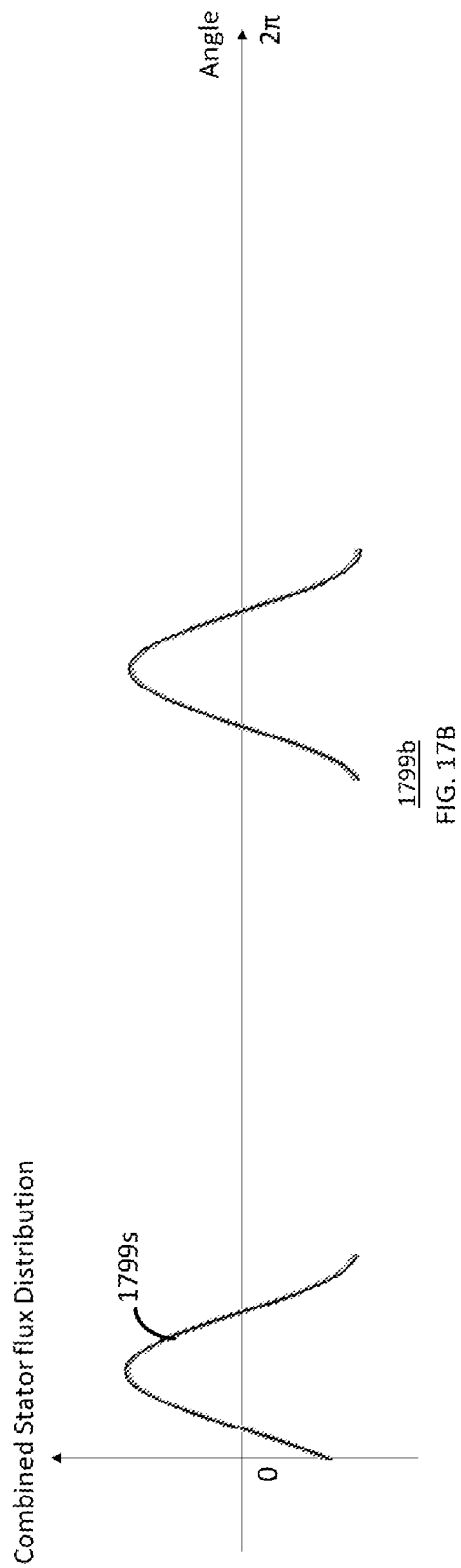

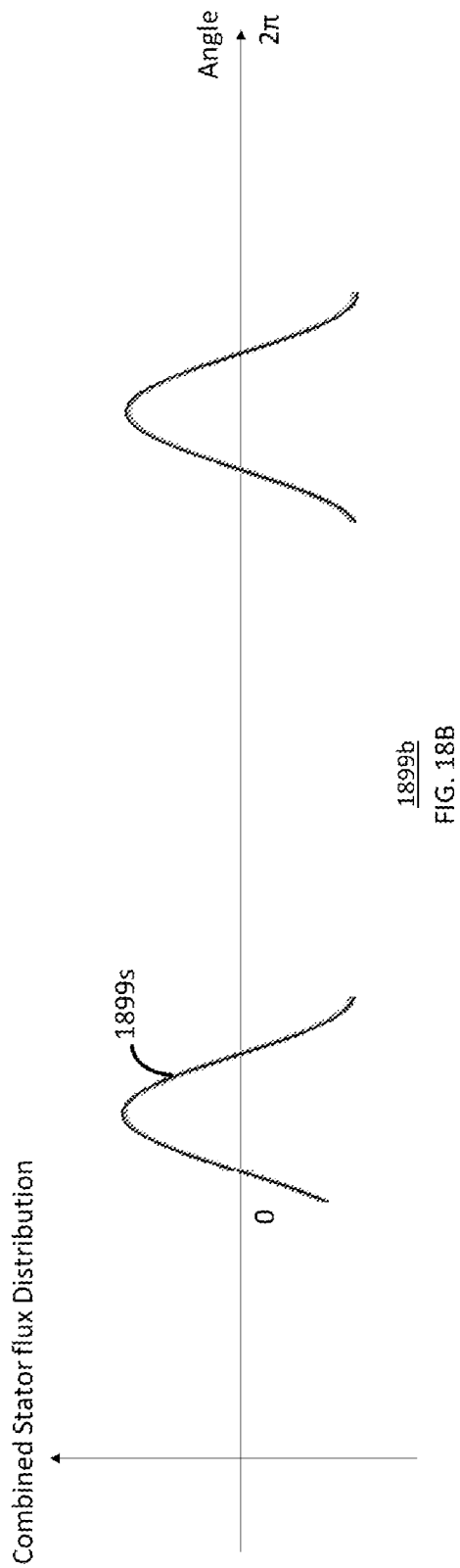

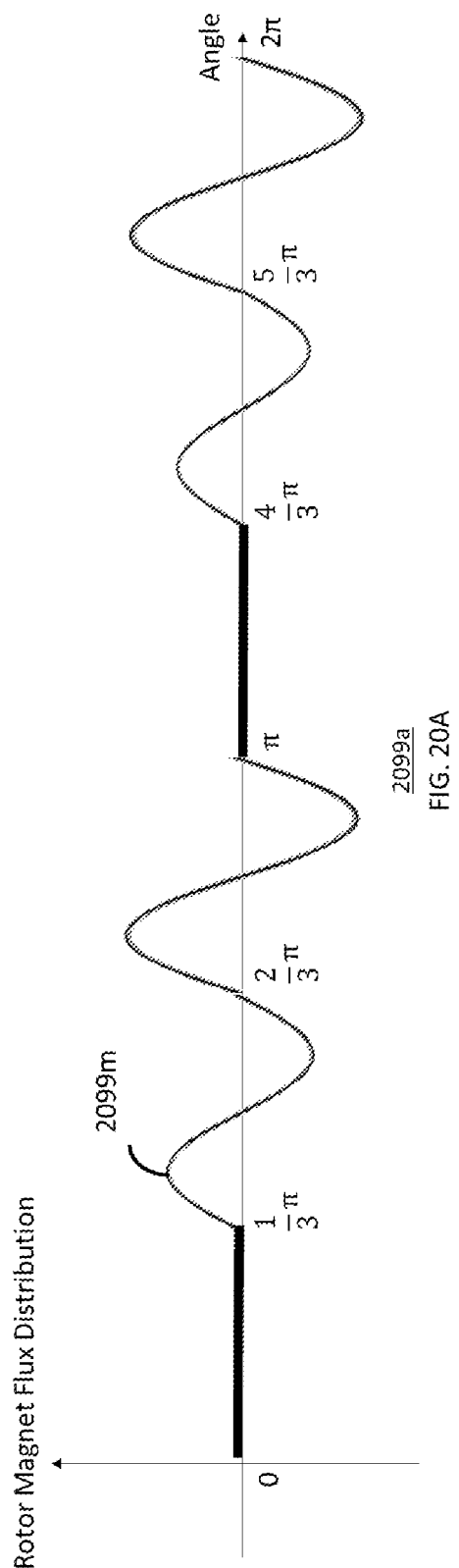

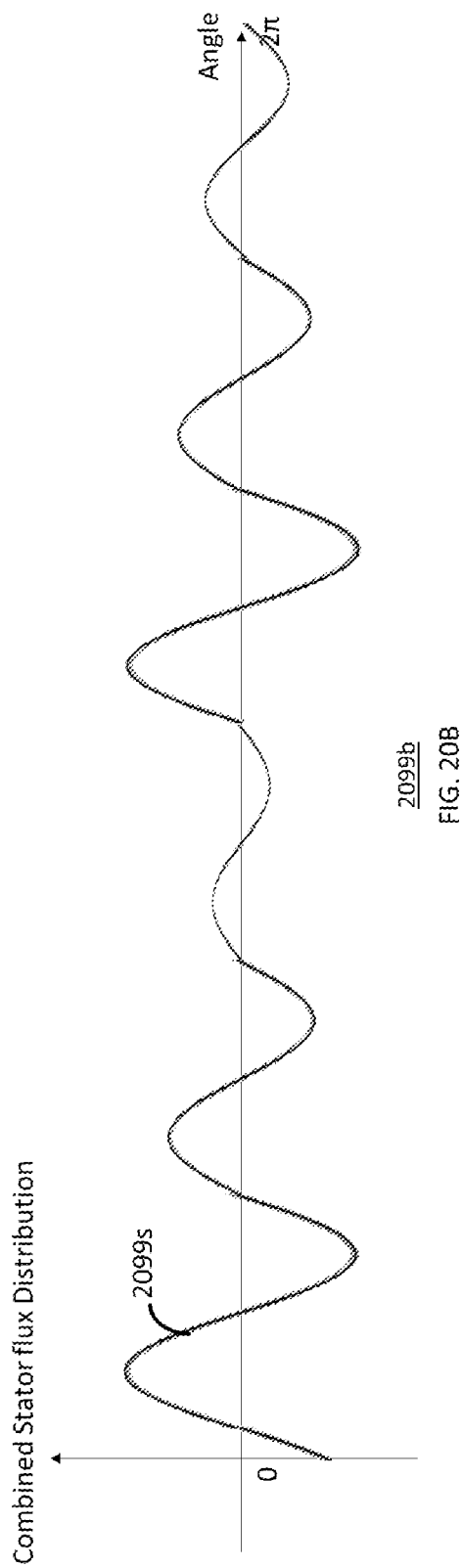

| Torque(%) | | | | | | | | | | | | | | | |
|---|---|---|---|---|---|---|---|---|---|---|---|---|---|---|---|
| 100% | id 11 | id 21 | id 31 | id 41 | id 51 | id 61 | id 71 | id 81 | id 91 | id 101 | id 111 | id 121 | id 131 | id 141 |
| 90% | id 12 | id 22 | id 32 | id 42 | id 52 | id 62 | id 72 | id 82 | id 92 | id 102 | id 112 | id 122 | id 132 | id 142 |
| 80% | id 13 | id 23 | id 33 | id 43 | id 53 | id 63 | id 73 | id 83 | id 93 | id 103 | id 113 | id 123 | id 133 | id 143 |
| 70% | id 14 | id 24 | id 34 | id 44 | id 54 | id 64 | id 74 | id 84 | id 94 | id 104 | id 114 | id 124 | id 134 | id 144 |
| 60% | id 15 | id 25 | id 35 | id 45 | id 55 | id 65 | id 75 | id 85 | id 95 | id 105 | id 115 | id 125 | id 135 | id 145 |
| 50% | id 16 | id 26 | id 36 | id 46 | id 56 | id 66 | id 76 | id 86 | id 96 | id 106 | id 116 | id 126 | id 136 | id 146 |
| 40% | id 17 | id 27 | id 37 | id 47 | id 57 | id 67 | id 77 | id 87 | id 97 | id 107 | id 117 | id 127 | id 137 | id 147 |
| 30% | id 18 | id 28 | id 38 | id 48 | id 58 | id 68 | id 78 | id 88 | id 98 | id 108 | id 118 | id 128 | id 138 | id 148 |
| 20% | id 19 | id 29 | id 39 | id 49 | id 59 | id 69 | id 79 | id 89 | id 99 | id 109 | id 119 | id 129 | id 139 | id 149 |
| 10% | id 110 | id 210 | id 310 | id 410 | id 510 | id 610 | id 710 | id 810 | id 910 | id 1010 | id 1110 | id 1210 | id 1310 | id 1410 |
| | 1000 | 2000 | 3000 | 4000 | 5000 | 6000 | 7000 | 8000 | 9000 | 10000 | 11000 | 12000 | 13000 | 14000 |

Speed(RPM)

| Torque(%) | | | | | | | | | | | | | | |
|---|---|---|---|---|---|---|---|---|---|---|---|---|---|---|
| 100% | Iq 11 | Iq 21 | Iq 31 | Iq 41 | Iq 51 | Iq 61 | Iq 71 | Iq 81 | Iq 91 | Iq 101 | Iq 111 | Iq 121 | Iq 131 | Iq 141 |
| 90% | Iq 12 | Iq 22 | Iq 32 | Iq 42 | Iq 52 | Iq 62 | Iq 72 | Iq 82 | Iq 92 | Iq 102 | Iq 112 | Iq 122 | Iq 132 | Iq 142 |
| 80% | Iq 13 | Iq 23 | Iq 33 | Iq 43 | Iq 53 | Iq 63 | Iq 73 | Iq 83 | Iq 93 | Iq 103 | Iq 113 | Iq 123 | Iq 133 | Iq 143 |
| 70% | Iq 14 | Iq 24 | Iq 34 | Iq 44 | Iq 54 | Iq 64 | Iq 74 | Iq 84 | Iq 94 | Iq 104 | Iq 114 | Iq 124 | Iq 134 | Iq 144 |
| 60% | Iq 15 | Iq 25 | Iq 35 | Iq 45 | Iq 55 | Iq 65 | Iq 75 | Iq 85 | Iq 95 | Iq 105 | Iq 115 | Iq 125 | Iq 135 | Iq 145 |
| 50% | Iq 16 | Iq 26 | Iq 36 | Iq 46 | Iq 56 | Iq 66 | Iq 76 | Iq 86 | Iq 96 | Iq 106 | Iq 116 | Iq 126 | Iq 136 | Iq 146 |
| 40% | Iq 17 | Iq 27 | Iq 37 | Iq 47 | Iq 57 | Iq 67 | Iq 77 | Iq 87 | Iq 97 | Iq 107 | Iq 117 | Iq 127 | Iq 137 | Iq 147 |
| 30% | Iq 18 | Iq 28 | Iq 38 | Iq 48 | Iq 58 | Iq 68 | Iq 78 | Iq 88 | Iq 98 | Iq 108 | Iq 118 | Iq 128 | Iq 138 | Iq 148 |
| 20% | Iq 19 | Iq 29 | Iq 39 | Iq 49 | Iq 59 | Iq 69 | Iq 79 | Iq 89 | Iq 99 | Iq 109 | Iq 119 | Iq 129 | Iq 139 | Iq 149 |
| 10% | Iq 110 | Iq 210 | Iq 310 | Iq 410 | Iq 510 | Iq 610 | Iq 710 | Iq 810 | Iq 910 | Iq 1010 | Iq 1110 | Iq 1210 | Iq 1310 | Iq 1410 |
| | 1000 | 2000 | 3000 | 4000 | 5000 | 6000 | 7000 | 8000 | 9000 | 10000 | 11000 | 12000 | 13000 | 14000 |

Speed(RPM)

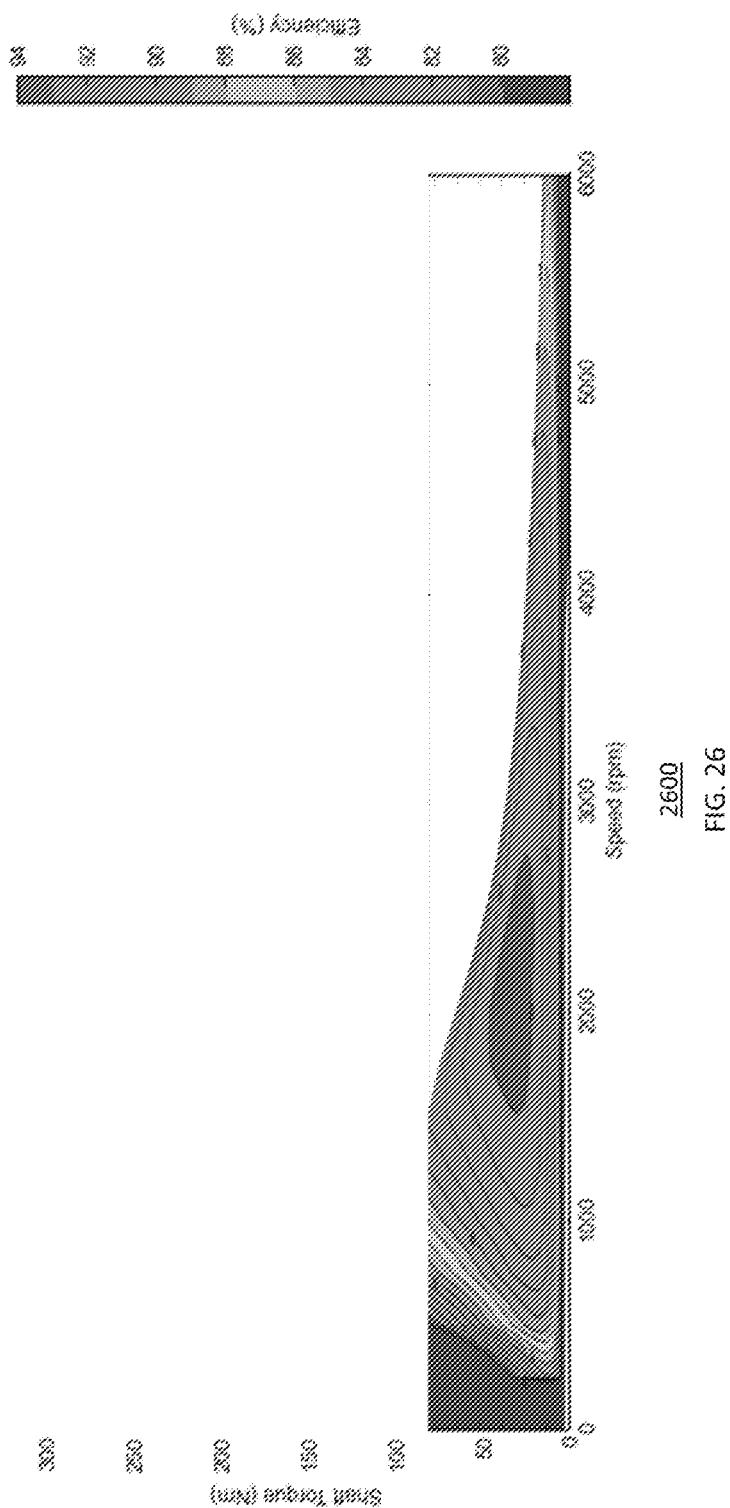

FIG. 27

DEFINING A FIRST ROTOR PORTION LOOK UP TABLE THAT, FOR EACH ONE OF A PLURALITY OF COMBINATIONS OF A PARTICULAR FIRST ROTOR PORTION MOTOR TORQUE AND A PARTICULAR FIRST ROTOR PORTION MOTOR SPEED, INCLUDES A FIRST $I_D$ VALUE AND A FIRST $I_Q$ VALUE TO BE APPLIED TO ONE OF THE GROUPS OF STATOR PHASES TO ACHIEVE THE PARTICULAR FIRST ROTOR PORTION MOTOR TORQUE AND THE PARTICULAR FIRST ROTOR PORTION MOTOR SPEED WHEN THE MOTOR IS OPERATING WITH AN OPTIMUM CHARACTERISTIC
2802

↓

DEFINING A SECOND ROTOR PORTION LOOK UP TABLE THAT, FOR EACH ONE OF THE PLURALITY OF COMBINATIONS OF A PARTICULAR SECOND ROTOR PORTION MOTOR TORQUE AND A PARTICULAR SECOND ROTOR PORTION MOTOR SPEED, INCLUDES A SECOND $I_D$ VALUE AND A SECOND $I_Q$ VALUE TO BE APPLIED TO ONE OF THE GROUPS OF STATOR PHASES TO ACHIEVE THE PARTICULAR SECOND ROTOR PORTION MOTOR TORQUE AND THE PARTICULAR SECOND ROTOR PORTION MOTOR SPEED WHEN THE MOTOR IS OPERATING WITH THE OPTIMUM CHARACTERISTIC
2804

↓

DEFINING A TOTAL ROTOR LOOK UP TABLE THAT, FOR EACH ONE OF THE PLURALITY OF COMBINATIONS OF A PARTICULAR TOTAL ROTOR MOTOR TORQUE AND A PARTICULAR TOTAL ROTOR MOTOR SPEED, INCLUDES (1) THE FIRST $I_D$ VALUE AND THE FIRST $I_Q$ VALUE FROM THE FIRST ROTOR PORTION LOOK UP TABLE FOR THE COMBINATION OF (1A) A PARTICULAR FIRST ROTOR PORTION MOTOR TORQUE THAT IS RELATED TO THE PARTICULAR TOTAL ROTOR MOTOR TORQUE BASED ON A FIRST ROTOR PORTION COEFFICIENT AND (1B) A PARTICULAR FIRST ROTOR PORTION MOTOR SPEED THAT IS EQUAL TO THE PARTICULAR TOTAL ROTOR MOTOR SPEED, AND (2) THE SECOND $I_D$ VALUE AND THE SECOND $I_Q$ VALUE FROM THE SECOND ROTOR PORTION LOOK UP TABLE FOR THE COMBINATION OF (2A) A PARTICULAR SECOND ROTOR PORTION MOTOR TORQUE THAT IS RELATED TO THE PARTICULAR TOTAL ROTOR MOTOR TORQUE BASED ON A SECOND ROTOR PORTION COEFFICIENT AND (2B) A PARTICULAR SECOND ROTOR PORTION MOTOR SPEED THAT IS EQUAL TO THE PARTICULAR TOTAL ROTOR MOTOR SPEED
2806

↓

ENABLING A CONTROLLER TO ACCESS THE DEFINED TOTAL ROTOR LOOK UP TABLE FOR CONTROLLING THE MOTOR IN THE FIELD
2808

SYSTEMS, METHODS, AND COMPUTER-READABLE MEDIA FOR DRIVING POLYPHASE MOTORS

CROSS-REFERENCES TO RELATED APPLICATION(S)

This application is a National Phase entry of International Patent Application No. PCT/US2021/050528, filed Sep. 15, 2021, which claims the benefit of prior filed U.S. Provisional Patent Application No. 63/078,334, filed Sep. 15, 2020, which is hereby incorporated by reference herein in its entirety.

COPYRIGHT NOTICE

At least a portion of the disclosure of this patent document contains material that may be subject to copyright protection. The copyright owner has no objection to the facsimile reproduction by anyone of the patent document or patent disclosure as it appears in the Patent and Trademark Office patent file or records, but otherwise reserves all copyright rights whatsoever. patent file or records, but otherwise reserves all copyright rights whatsoever.

FIELD

This generally relates to electric rotating machines and, more particularly, to systems, methods, and computer-readable media for modulating the energy to drive a polyphase motor.

BACKGROUND

Motors and other electric rotating machines with certain characteristics, such as number of inverter phases, number of stator phases, and number of poles, often present challenges that have heretofore proven difficult to overcome, particularly with respect to control and torque production.

SUMMARY

Systems, methods, and computer-readable media for driving polyphase motors are provided.

For example, a method is provided for enabling control of a motor, wherein the motor includes a stator and a rotor, wherein the rotor includes a first rotor portion with a first rotor structural geometry and a second rotor portion with a second rotor structural geometry that is different than the first rotor structural geometry, and wherein the stator includes a first group of stator phases and a second group of stator phases that is different than the first group of stator phases, the method may include defining a first rotor portion look up table that, for each one of a plurality of combinations of a particular first rotor portion motor torque and a particular first rotor portion motor speed, includes a first Id value and a first Iq value to be applied to one of the groups of stator phases to achieve the particular first rotor portion motor torque and the particular first rotor portion motor speed when the motor is operating with an optimum characteristic, and defining a second rotor portion look up table that, for each one of the plurality of combinations of a particular second rotor portion motor torque and a particular second rotor portion motor speed, includes a second Id value and a second Iq value to be applied to one of the groups of stator phases to achieve the particular second rotor portion motor torque and the particular second rotor portion motor speed when the motor is operating with the optimum characteristic.

As another example, a motor is provided that may include a stator and a rotor, wherein the rotor includes a first rotor portion including a first rotor structural geometry, and a second rotor portion including a second rotor structural geometry that is different than the first rotor structural geometry.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 17A is a graph of magnetic flux distribution of a rotor of the motor of FIG. 17 in the first stage of FIG. 17, according to some embodiments;

FIG. 17B is a graph of stator flux distribution of the rotor of the motor of FIG. 17 in the first stage of FIG. 17, according to some embodiments;

FIG. 18B is a graph of stator flux distribution of the rotor of the motor of FIGS. 17 and 18 in the second stage of FIG. 18, according to some embodiments;

FIG. 20A is a graph of magnetic flux distribution of a rotor of the motor of FIG. 20, according to some embodiments;

FIG. 20B is a graph of stator flux distribution of the rotor of the motor of FIG. 20, according to some embodiments;

FIG. 24 is an exemplary Id calibration table;

FIG. 25 is an exemplary Iq calibration table;

FIG. 26 is another exemplary efficiency map;

FIG. 27 is a collection of related look up tables; and

FIG. 28 is a flowchart of another illustrative process for controlling a motor.

DETAILED DESCRIPTION

Figure 1:
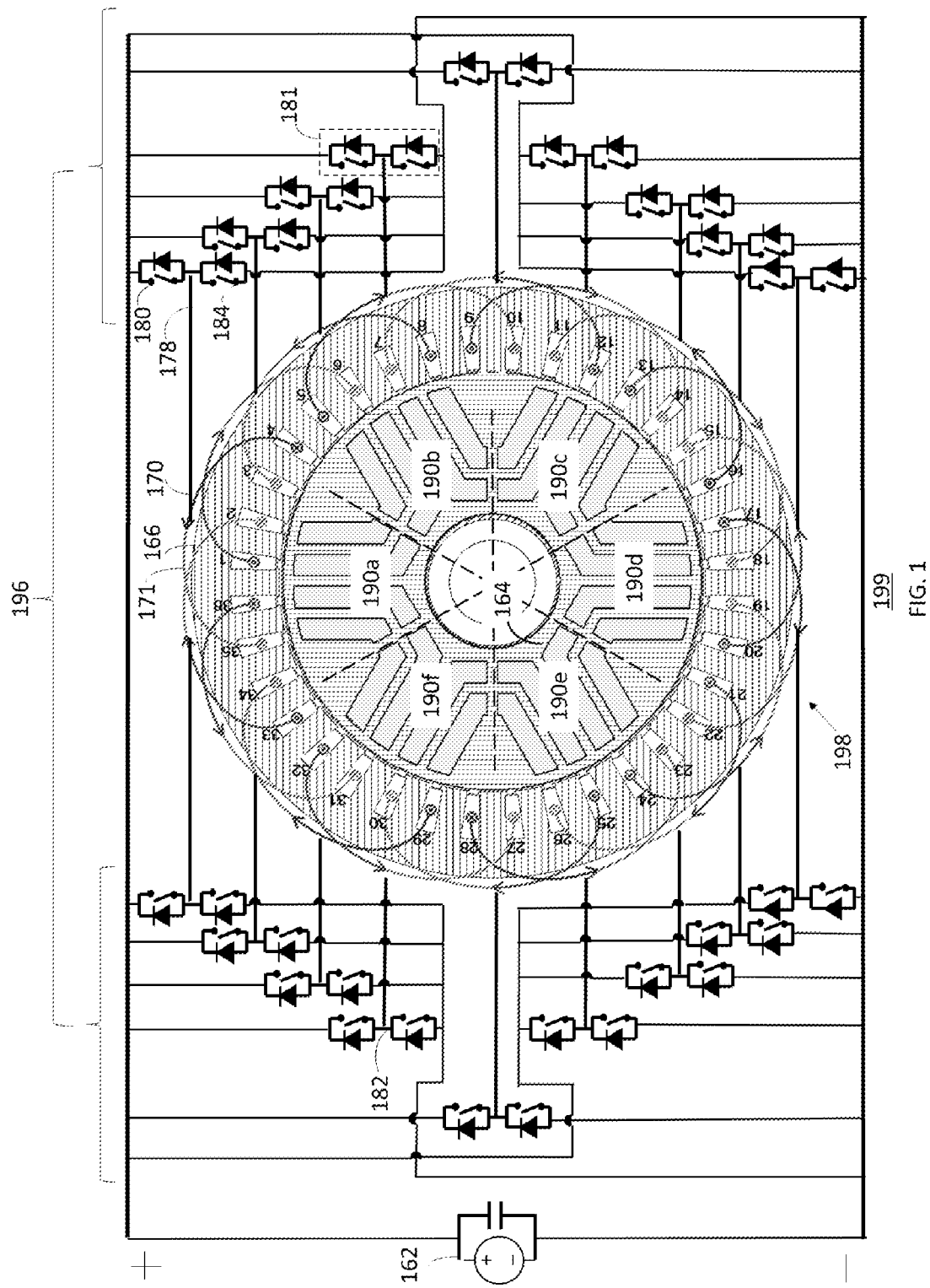
FIG. 1 is a schematic of a system with a motor in cross section, according to some embodiments.

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. The terms "includes," "including," "comprises," and/or "comprising," when used in this specification, may specify the presence of stated features, integers, steps, operations, elements, and/or components, but do not preclude the presence or addition of one or more other features, integers, steps, operations, elements, components, and/or groups thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

As used herein, the terms "computer," "personal computer," "device," "computing device," "server device," and "controller device" may refer to any programmable computer system that is known or that will be developed in the future. In certain embodiments, a computer may be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system" may be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

This relates generally to electric rotating machines and, more specifically, to synchronous rotating machines.

A modern electric rotating machine often includes one power inverter with three phases connecting to one motor. The motor often also includes a stator and a rotor.

The inverter may convert direct current ("DC") power from an energy source, typically a battery, to alternating current ("AC") using half bridges. The half bridges may include two power switches connecting to the high and low side of the power source, and the midpoint, which may be the inverter phase output, may connect to the stator phases. When a power switch connecting to the high side turns on, a corresponding motor phase may be connected to the high side of a power source. When a power switch connecting to the low side turns on, a corresponding motor phase may be connected to the low side of the power source.

A stator often has three phases, with each phase connecting to the midpoint of one of the three inverter half bridges. Thus, for a three-phase motor, the corresponding inverter may have three half bridges. As switches of each half bridge turn on and off, motor phase windings may be connected alternatively to the high and low side of the power source (e.g., the DC source), creating AC current along the phase winding. The switches often operate to turn on and off according to a pulse width modulation ("PWM") specification that may produce an optimum AC current wave form.

The motor stator may include a plurality of slots and teeth, where concentrated or distributed stator windings (e.g., made of conductor) may rotate along a tooth and fill a slot. The concentrated windings may form coils, which, when energized, may generate radial magnetic flux towards the rotor. The coils can be wound along a single tooth or across multiple teeth. All coils may be coupled to the stator phases. One or more windings of a same phase often occupy either completely or share individual slots with windings from other phases.

Coils may wind around a pole of the rotor and, when energized, may form a magnetic flux that may direct radially inward or outward towards the center or that may direct along the centerline in axial flux machines.

Stator flux, when applied onto the rotor, may create torque, for example, through linkage with permanent magnet flux on the rotor or through difference of reluctance at angle on the rotor. The polarity of the poles of an electro-magnet may be determined by the direction of the current flow through the coil.

A rotating component, such as a rotor, often includes several rotor poles, with individual poles often sharing the same geometry of rotor core material and equal reluctance distribution. If rotor poles have embedded permanent magnets, the magnetic pole direction may be successively alternating.

As a rotor rotates, stator coils periodically may energize and deenergize via switching action from inverter half bridges, which may create a rotating stator magnetic flux that may rotate synchronously with the rotor, which may produce a constant torque at the rotor.

Stator coils of the same phase often share the same connections or couplings to the same inverter half bridge. When the number of coils is larger than the number of stator phases, as may be the case of stator coils that connect serially or in parallel to stator phases, individual control to the stator coils is difficult if not impossible. Stator coils may activate and deactivate simultaneously, the magnetic flux may be generated simultaneously with the same amplitude and distribution (e.g., with polarity determined by the winding direction), the flux may act on all poles of the rotor, thereby often creating torque evenly across all rotor poles. It is often not possible to produce torque selectively on individual poles of the rotor. In addition, because the coils are usually arranged in repeating pattern, the poles of the rotor often share the same geometry, the same flux pattern from permanent magnet, and the same distribution of reluctance in order to link with all stators magnetic flux distribution. Having different poles geometry in the same rotor is generally not the optimum configuration.

Therefore, this disclosure provides systems, methods, and computer-readable media that overcome these disadvantages.

A system is provided that may include an inverter with more than three phases, a stator with more than three phases, and a rotor with a number of poles. The geometry, construction, magnet flux distribution, and/or reluctance distribution can be varied between rotor poles.

A method is provided that may control a system by selectively activating inverter half-bridges or other suitable inverter components, and energizing stator coils with different amplitude, which may result in non-repeating stator combined magnetic flux distribution, which may electromagnetically couple and produce torque on individual rotor poles, such as based on a pre-determined efficiency map.

Although several examples are described as including particular numbers of stator phases, stator coils, inverter phases, and/or rotor poles, such examples are given by way of example and not limitation, as countless other configurations are contemplated.

FIG. 1 illustrates a schematic of a system 199 that may include a power source 162, a switch subsystem or inverter 196, and a motor 198 that may include a rotor 164 and a stator 166 (the stator and rotor are shown in section view for clarity). As shown, in some embodiments, rotor 164 may be a six-pole rotor with 6 rotor poles 190a-190f, although any other suitable number of poles may be provided by a rotor of this disclosure. As shown, in some embodiments, stator 166 may include 36 stator slots 101-136, 18 stator coils 171, and 18 stator phases 170, which may be electrically coupled to 18 inverter phases 178, respectively, although any other suitable number of stator slots, stator coils, stator phases, and/or inverter phases may be provided by or for a stator of this disclosure (it is to be noted that the stator slots referred to herein as stator slots 101-136 are shown by FIG. 1 as stator slots 1-36 for clarity sake).

As shown in FIG. 1, inverter 196 may include any suitable number of inverter components or half bridges 181 (e.g., 18 as shown, or any other suitable number), where each half bridge 181 may include a high power switch or switching device 180 (e.g., at the top) and a low power switch or switching device 184 (e.g., at the bottom), where switching device 180 may be electrically coupled to a high side of any suitable power source 162 (e.g., a battery), and where switching device 184 may be electrically coupled to a low side of power source 162. A midpoint 182 of a connection between switching devices 180 and 184 of a half bridge 181 may be operative to output or otherwise provide a respective inverter phase 178 and electrically couple to a respective stator phase 170. Each stator phase 170 may be electrically coupled to a respective stator coil 171. Any suitable inverter component(s) may be utilized to provide an inverter, including, but not limited to, a half bridge, H-bridge, various switches, and/or the like. As shown, a diode may be provided in parallel with a switching device (e.g., for reactive power/generating action), although such a component may not be provided in some embodiments. While two terminals of a switching device may be coupled to a midpoint and one of a low or high side of a power source, each switch may be controlled to be open or closed selectively using any suitable control signal(s) from any suitable source (e.g., control signal(s) 393 from controller 394 of FIG. 3 or any other suitable controller).

Power source 162 can include any suitable circuitry for receiving and/or generating power, and for providing such power to one or more of the other components of system 199. For example, power source 162 can be coupled to a power grid (e.g., when system 199 is not acting as a portable system or when a battery of the system is being charged at an electrical outlet with power generated by an electrical power plant). As another example, power source 162 can be configured to generate power from a natural source (e.g., solar power using solar cells). As another example, power source 162 can include one or more batteries of any suitable type(s) for providing power (e.g., when system 199 is acting as a portable system). The power can be provided by power source 162 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power source 162 can be operative to request or provide particular amounts of power at different times, for example, based on the needs or requirements of system 199 or periphery devices that may be coupled to system 199.

As shown in FIG. 1, each stator coil 171 may be represented by a curved line that may be surrounding stator 166. Each stator coil 171 may occupy two or more stator slots (e.g., labelled stator coil 171 may occupy stator slots 104 and 135, etc.), with the curved line entering or exiting the plane of the illustrated section along the slots of the stator. Stator 166 may include any suitable number of stator slots (e.g., 36 slots 101-136) and any suitable number of stator coils 171 (e.g., 18 stator coils 171), where each stator coil 171 may be coupled to one stator phase 170. Although the number of stator slots may be twice the number of stator coils for a particular system (e.g., one coil may occupy two different slots, where each slot may be configured to accept one coil) as shown herein (e.g., for clarity purposes), any other suitable relationship may be appropriate. For example, certain systems may provide slots where each slot may be configured to accept two or more coils, in which case the number of slots may be equal to or less than the number of coils. In some particular situations (e.g., where balance and/or physical space may not be a determining factor), a system may include different slots that accept different numbers of coils, respectively. Different stator coils of stator 170 may be coupled together to form connection(s), such as a star/Wye connection (see, e.g., the connections of FIG. 3) or a delta connection or any other suitable connection, to complete the circuit. Although the number of stator coils in a system may be a multiple of three (e.g., as shown by FIG. 1), the number of stator coils in a system can be any number, such as five (e.g., in a five phase motor).

Switching devices 180 and 184 of a half bridge 181 of inverter 196 may be operative to switch on and off to generate and output AC from an inverter phase 178 to a stator phase 170, whereby the AC may enter a stator coil 171 through that inverter phase 178 and may generate a magnetic field. Six-pole rotor 164 may be electromagnetically coupled to the magnetic field generated by all of the stator coils (e.g., all 18 stator coils 171).

Figure 2:
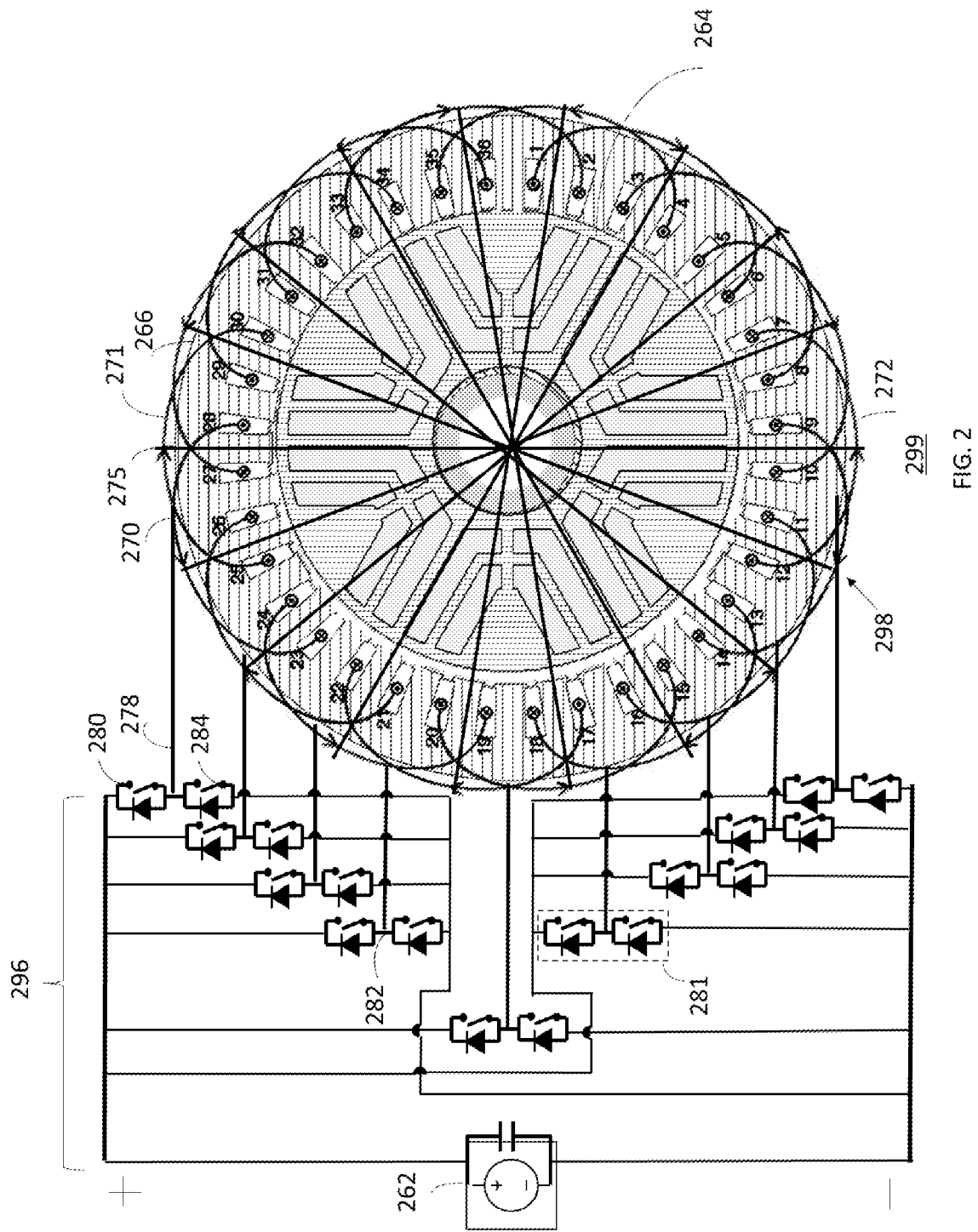
FIG. 2 is a schematic of another system with a motor in cross section, according to some embodiments.

FIG. 2 illustrates a schematic of a system 299 that may include a power source 262, an inverter 296, and a motor 298 that may include a rotor 264 and a stator 266 (the stator and rotor are shown in section view for clarity). As shown, in some embodiments, rotor 264 may be a six-pole rotor with 6 rotor poles, although any other suitable number of poles may be provided by a rotor of this disclosure. As shown, in some embodiments, stator 266 may include 36 stator slots 201-236, 18 stator coils (e.g., 9 stator coils 271 and 9 stator coils 272), and 9 stator phases 270, which may be electrically coupled to 9 inverter phases 278, respectively, although any other suitable number of stator slots, stator coils, stator phases, and/or inverter phases may be provided by or for a stator of this disclosure (it is to be noted that the stator slots referred to herein as stator slots 201-236 are shown by FIG. 2 as stator slots 1-36 for clarity sake).

As shown in FIG. 2, inverter 296 may include any suitable number of inverter components or half bridges 281 (e.g., 9 as shown, or any other suitable number), where each half bridge 281 may include a high power switch or switching device 280 (e.g., at the top) and a low power switch or switching device 284 (e.g., at the bottom), where switching device 280 may be electrically coupled to a high side of any suitable power source 262 (e.g., a battery), and where switching device 284 may be electrically coupled to a low side of power source 262. A midpoint 282 of a connection between switching devices 280 and 284 of a half bridge 281 may be operative to output or otherwise provide a respective inverter phase 278 and electrically couple to a respective stator phase 270. Each stator phase 270 may be electrically coupled to a respective stator coil pair, where each stator coil pair may include a respective one stator coil 271 and a respective one stator coil 272 that may be electrically coupled together by a respective coil coupling 275 that may be illustrated by a line traversing across the center of the illustrated motor section. Each stator phase 270 may be coupled to a respective inverter phase 278. The AC output from an inverter phase 278 may enable its associated stator phase 270 to energize both the stator coil 271 and stator coil 272 of the associated stator coil pair (e.g., via associated coil coupling 275). Although a coil pair may be shown to include a coil 271 that may be clockwise ("CW") and a coil 272 that may be counterclockwise ("CCW"), this may not always be true, as a system may be designed with any coupled coil pair having any suitable direction(s) (see, e.g., coil pairs of system 599 of FIG. 5, where each coil of a pair may be of the same direction). The polarity of a permanent magnet of a permanent magnet ("PM") motor on opposing rotor poles may be the same (e.g., both N or both S), so opposing coils like coil 271 and coil 272 may oppose direction, whereby the stator flux generated from these coils may be both positive towards the rotor or both negative towards the rotor. However, there's no limitation and no rule requiring that the magnet on opposing rotor poles to be absolutely the same polarity. In the case of a synchronous reluctance motor ("SynRM") without PM assist, where there may be no polarity in rotor magnets, direction may be even less relevant. Although a coil pair may be shown to include a particular coupling order from stator phase 270 to coil 271 to coupling 275 to coil 272, it is to be understood that any suitable coupling order may be utilized in various types of systems. For example, with respect to FIG. 2, system 299 may alternatively include a particular coupling order from stator phase 270 to coil 272 to coupling 275 to coil 271. Moreover, although FIG. 2 may show a serial coupling between coils 271 and 272 of a coil pair via coupling 275, it is to be understood that any suitable coupling type may be utilized in various types of systems. For example, with respect to FIG. 2, system 299 may alternatively include a particular coupling type with a parallel coupling that may directly couple each one of coils 271 and 272 of a coil pair to stator phase 270 (e.g., without a coupling 275) or that may directly couple stator phase 270 to coupling 275 that may then couple in parallel to coils 271 and 272 of a coil pair. In some embodiments (e.g., in a system where more than two coils may be coupled to a particular stator phase (see, e.g., system 799 of FIG. 7), the system may be provided with any suitable combination of serial and parallel couplings. For example, one coil may be coupled to a stator phase directly, while two coils may be coupled in series. As the number of coils in a system grows, the possible connection configuration can grow exponentially (e.g., a stator phase may be coupled to two branches of coils in parallel, where each branch may include two or more (e.g., four) coils coupled in series). Although the two coils of a stator pair of system 299 may be shown by FIG. 2 to be directly opposing (e.g., 180 degrees apart), which may be a reasonable design for the consideration of electromagnetic and mechanical balancing, it is to be understood that coils of a pair or grouping for a respective stator phase may be arranged at any other suitable relative angle(s) in order to meet various design specification(s), such as torque, power, efficiency, cogging torque, harmonic distortion, torque ripple, and/or the like. A coupling, such as coupling 275, for use between two or more coils of a coil pair or grouping, may be any suitable coupling (e.g., a physical wire connecting two coils). Such a coupling may be wound along the circle of a stator, but it may be appropriate to use a straight wire across the stator (e.g., as may be illustrated by FIG. 2).

As shown in FIG. 2, each stator coil may be represented by a curved line that may be surrounding stator 266. Each stator coil may occupy two or more stator slots (e.g., labelled stator coil 271 may occupy stator slots 225 and 230, labelled stator coil 272 may occupy stator slots 207 and 212, etc.), with the curved line entering or exiting the plane of the illustrated section along the slots of the stator. Stator 266 may include any suitable number of stator slots (e.g., 36 slots 201-236) and any suitable number of stator coils (e.g., 18 stator coils (e.g., 9 stator coils 271 and 9 stator coils 272)), where each coupled pair of stator coils (e.g., a stator coil 271 and a stator coil 272 coupled via coil coupling 275) may be coupled to one stator phase 270. Different stator coils of stator 270 may be coupled together to form connection(s), such as a star/Wye connection (see, e.g., the connections of FIG. 3) or a delta connection or any other suitable connection, to complete the circuit. Such a connection between different coils may be for couplings between different phases (e.g., rather than coupling 275, which may be used to couple two coils for the same stator phase). Therefore, both coils of a particular coil pair associated with the same stator phase may be a part of the same one leg of a three leg connection (e.g., either a star connection (see, e.g., the three star connections of FIG. 3) or a delta connection, etc.)).

Switching devices 280 and 284 of a half bridge 281 of inverter 296 may be operative to switch on and off to generate and output AC from an inverter phase 278 to a stator phase 270, whereby the AC may enter a stator coil pair through that inverter phase 278 and may generate a magnetic field. Six-pole rotor 264 may be electromagnetically coupled to the magnetic field generated by all of the stator coils (e.g., all 18 stator coils (e.g., all 9 stator coil pairs)).

As mentioned, stator 266 of FIG. 2 is illustrated to include 18 stator coils and 9 stator phases, wherein each pair of opposing coils are coupled via a coil coupling, represented by the straight lines across the center of motor. Such a coil coupling may allow opposing coils to share the same stator phase. When operating, the stator coils sharing the same stator phase may activate and deactivate simultaneously. It is to be noted that the sharing of a half bridge and stator phase may not be limited to opposing coils. Any group of coils can share one half bridge if the desired function can be obtained. Any two or more coils of the same coil pair or group (e.g., coils 271 and 272 of a coil pair of system 299 of FIG. 2, coils 771, 772, 773, and 774 of a coil group of system 799 of FIG. 7) may be coupled to the same stator phase. Any two coils of such a coil group may be distributed similarly to any other two coils of any other coil group (e.g., 180 degrees as shown in FIG. 2, 90 degrees, etc.). However, it is to be understood that there's no limitation that a coil location must be equally distributed. For example, coils 771 and 773 of a particular coil group may be apart by a first angle while coils 772 and 773 of that same coil group may be apart by a second angle that is different than the first angle (e.g., 60 degrees and 120 degrees, respectively, or 92 degrees and 88 degrees, respectively, etc.). A motor design may include a small variation between the angle of coils to reduce the torque ripple and harmonic distortion.

Figure 3:
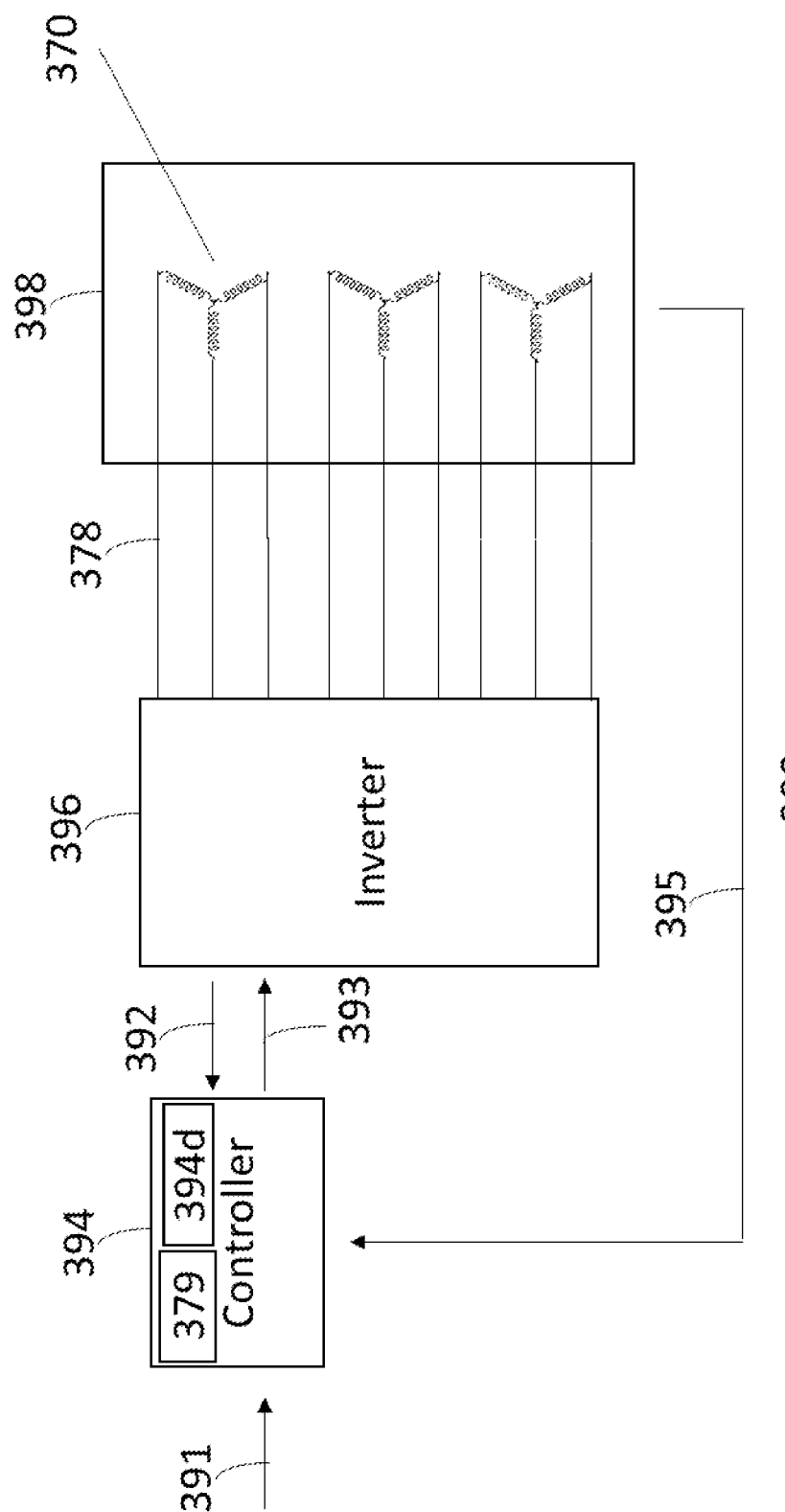
FIG. 3 is a block diagram representing a control system of the motor system of FIG. 2, according to some embodiments.

FIG. 3 illustrates a block diagram representing a control system 399 that may include a controller 394, an inverter 396, and a motor 398. As shown, controller 394 may be any suitable controller configured to generate one or more control signals 393 operative to be received by and used to control the inverter components (e.g., the switching devices of the half bridges) of inverter 396. Inverter 396 may be configured to generate and output any suitable number of inverter phases 378 to motor 398 (e.g., 9 inverter phases (e.g., the 9 inverter phases of system 299 of FIG. 2)). As shown, each inverter phase 378 may be coupled to a respective stator phase 370 of motor 398. Motor 398 may be configured (e.g., using a resolver or other suitable component(s)) to feedback to controller 394, either continuously or at set intervals, one or more motor feedback signals 395 that may be indicative of the motor's rotor position (e.g., the angular position of the rotor in relation to the stator as the rotor rotates) and/or any other suitable information (e.g., motor temperature that may be used for thermal management, etc.). Inverter 396 may be configured (e.g., using one or more current sensors (e.g., mounted inside an inverter or at a stator or otherwise in between)) to feedback to controller 394, either continuously or at set intervals, one or more inverter feedback signals 392 that may be indicative of the AC amplitude of one, some, or each of the inverter phases 378. Controller 394 may also be configured to receive, either continuously or at set intervals, one or more torque command signals 391 that may be indicative of a value of a desired torque or torque demand or torque command. A torque command may be any suitable input from any suitable source. For example, in a vehicle application, the command may be based on the pedal position (e.g., when a user presses an acceleration pedal, it may generate a pedal position signal and that signal may be converted to a torque demand, such that the engine may be operative to produce the torque as driver desired). Therefore, a torque command may be a pure input (e.g., the torque command may be the need for a vehicle to achieve a desired speed at a given road load condition). For industrial applications, like wind turbines, the torque command may come from a speed requirement of the turbine. Controller 394 may be configured to store or otherwise access any suitable additional controller data 394d, including, but not limited to, a pre-determined efficiency map or any other suitable information or processing commands (e.g., software, firmware, etc.). Controller 394 may be configured to generate and transmit any suitable control signal(s) 393 by referencing controller data 394d (e.g., a pre-determined efficiency map), the rotor position and/or any other suitable information from motor feedback signal(s) 395, the AC amplitude and/or any other suitable information from inverter feedback signal(s) 392, and the value of torque command and/or any other suitable information from command signal(s) 391. Analysis and processing of such signal(s) 391, 392, and 395 along with data 394d may enable controller 394 to determine which inverter phase(s) 378 to activate and/or the strategy of controlling inverter switching devices of half bridges of inverter 396 that may output activated inverter phases 378 that may achieve desired current amplitude of all activated inverter phases that may in turn achieve the value of the desired torque command at the motor with optimum efficiency, and then generate the appropriate control signal(s) 393 to enable such activation. The controller may be any suitable controller that may be operative to vary one or more suitable control parameters based on any suitable accessible data (e.g., an efficiency map) using any suitable control logic (e.g., any suitable control application). Often, a motor may not be able to know or determine its own efficiency during operation, but this is not entirely impossible as a feedback loop at both input of the inverter and output of the motor may be operative to measure the efficiency. An efficiency map may be determined during the design phase of a motor, and validated after prototype construction. The optimum efficiency of a motor may utilize some tuning to be achieved, but the map may be generally well defined before mass production of the motor. The controller may or may not store an efficiency map. Instead, in some embodiments, a programmer or otherwise creating a control algorithm may tune a set of parameters to achieve an optimum efficiency with a given motor/inverter structure (e.g., for Id, Iq, the controller may hard code a matrix of Iq, Id, then reference the Iq, Id output during actual operation). A full calculation may involve a rotor position, torque demand, and possibly rotor speed. While a control algorithm of any suitable type may be complex, an end goal may be to achieve optimum efficiency.

Controller 394 of system 399 may include any suitable processing circuitry that may be operative to control the operations and performance of one or more components of system 399, including inverter 396. For example, as mentioned, controller 394 may receive any suitable input signals or other suitable data and drive any suitable output signals. As shown in FIG. 3, processor or controller 394 may be used to run at least one application 379. Application 379 may include, but is not limited to, one or more operating system applications, firmware applications, software applications, algorithmic modules, data analysis applications, state determination applications, activity monitoring applications, and/or any other suitable applications. For example, controller 394 may load application 379 as a user interface program to determine how instructions or data received at controller 394 may manipulate the one or more ways in which information may be stored by and/or generated by and transmitted from controller 394. Any application 379 may be accessed by any processing circuitry of controller 394 from any suitable source, such as from any suitable memory and/or from any other system or server (e.g., a remote server (e.g., via any suitable communications circuitry)). Controller 394 may include a single processor or multiple processors. For example, controller 394 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Controller 394 also may include on board memory for caching purposes.

Figure 4:
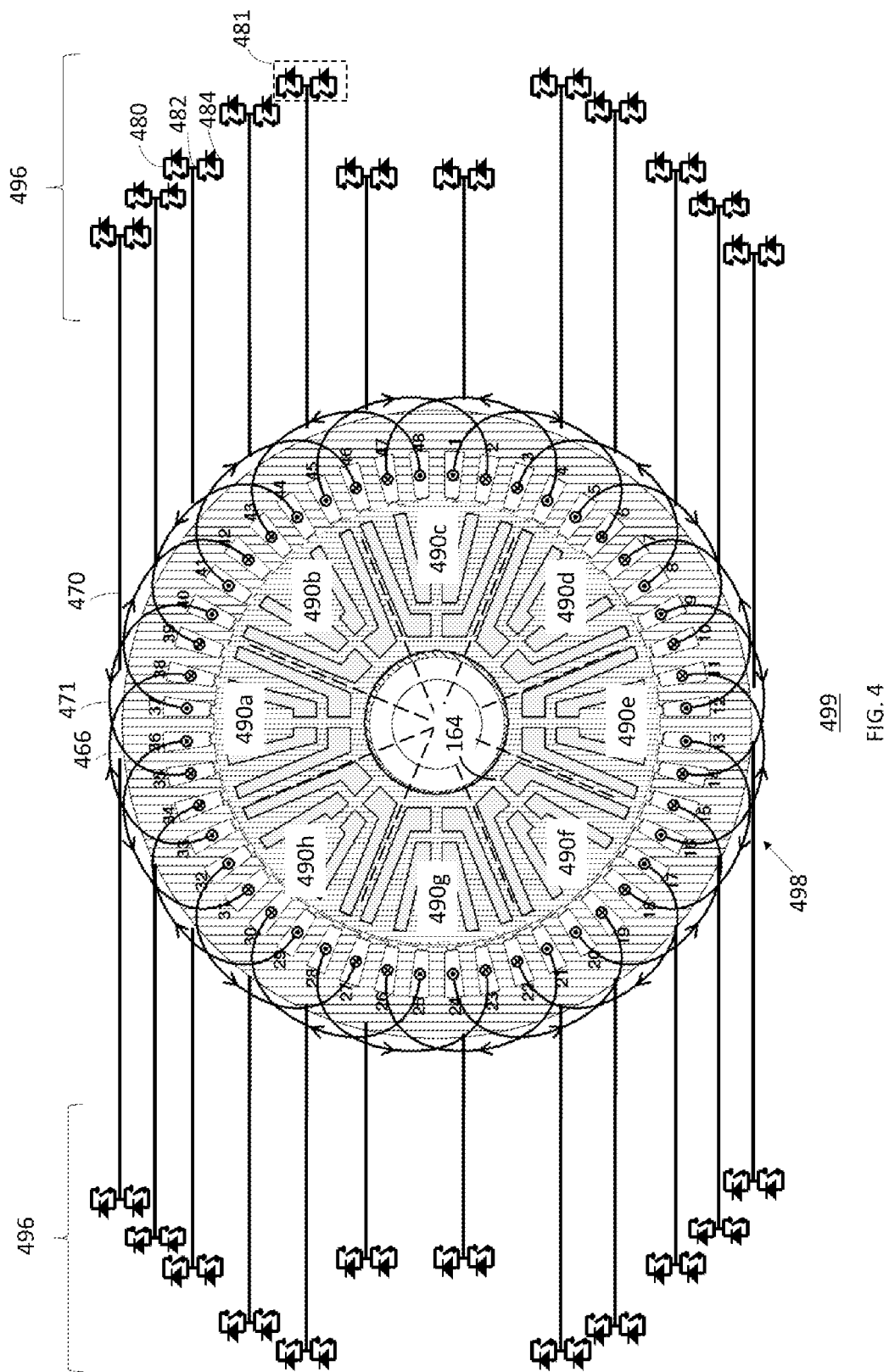
FIG. 4 is a schematic of another system with a motor in cross section, according to some embodiments.

FIG. 4 illustrates a schematic of a system 499 that may include a power source (not shown but that may be similar to power source 162 and/or power source 262), an inverter 496, and a motor 498 that may include a rotor 464 and a stator 466 (the stator and rotor are shown in section view for clarity). As shown, in some embodiments, rotor 464 may be an eight-pole rotor with 8 rotor poles 490*a*-190*h*, although any other suitable number of poles may be provided by a rotor of this disclosure. As shown, in some embodiments, stator 466 may include 48 stator slots 401-448, 24 stator coils 471, and 24 stator phases 470, which may be electrically coupled to 24 inverter phases 478, respectively, although any other suitable number of stator slots, stator coils, stator phases, and/or inverter phases may be provided by or for a stator of this disclosure (it is to be noted that the stator slots referred to herein as stator slots 401-448 are shown by FIG. 4 as stator slots 1-48 for clarity sake).

As shown in FIG. 4, inverter 496 may include any suitable number of inverter components or half bridges 481 (e.g., 24 as shown, or any other suitable number), where each half bridge 481 may include a high power switch or switching device 480 (e.g., at the top) and a low power switch or switching device 484 (e.g., at the bottom), where switching device 480 may be electrically coupled to a high side of any suitable power source (not shown), and where switching device 484 may be electrically coupled to a low side of any suitable power source (not shown). A midpoint 482 of a connection between switching devices 480 and 484 of a half bridge 481 may be operative to output or otherwise provide a respective inverter phase 478 and electrically couple to a respective stator phase 470. Each stator phase 470 may be electrically coupled to a respective stator coil 471.

As shown in FIG. 4, each stator coil 471 may be represented by a curved line that may be surrounding stator 466. Each stator coil 471 may occupy two or more stator slots (e.g., labelled stator coil 471 may occupy stator slots 435 and 440, etc.), with the curved line entering or exiting the plane of the illustrated section along the slots of the stator. Stator 466 may include any suitable number of stator slots (e.g., 48 slots 401-148) and any suitable number of stator coils 471 (e.g., 24 stator coils 471), where each stator coil 471 may be coupled to one stator phase 470. Different stator coils of stator 470 may be coupled together to form connection(s), such as a star/Wye connection (see, e.g., the connections of FIG. 6) or a delta connection or any other suitable connection, to complete the circuit.

Switching devices 480 and 484 of a half bridge 481 of inverter 496 may be operative to switch on and off to generate and output AC from an inverter phase 478 to a stator phase 470, whereby the AC may enter a stator coil 471 through that inverter phase 478 and may generate a magnetic field. Eight-pole rotor 464 may be electromagnetically coupled to the magnetic field generated by all of the stator coils (e.g., all 24 stator coils 471).

Figure 5:
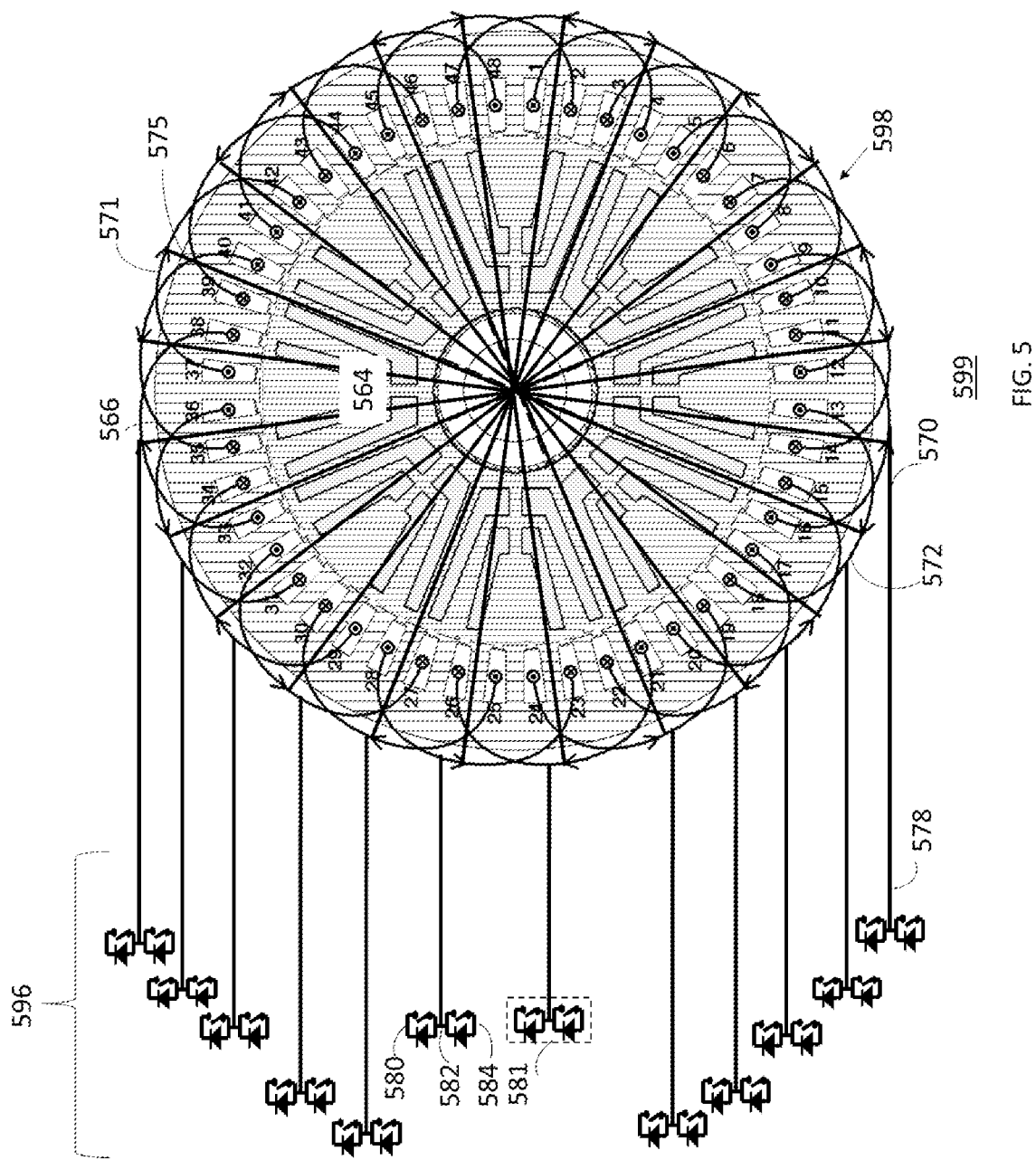
FIG. 5 is a schematic of another system with a motor in cross section, according to some embodiments.

FIG. 5 illustrates a schematic of a system 599 that may include a power source (not shown but that may be similar to power source 162 and/or power source 262), an inverter 596, and a motor 598 that may include a rotor 564 and a stator 566 (the stator and rotor are shown in section view for clarity). As shown, in some embodiments, rotor 564 may be an eight-pole rotor with 8 rotor poles, although any other suitable number of poles may be provided by a rotor of this disclosure. As shown, in some embodiments, stator 566 may include 48 stator slots 501-548, 24 stator coils (e.g., 12 stator coils 571 and 12 stator coils 572), and 12 stator phases 570, which may be electrically coupled to 12 inverter phases 578, respectively, although any other suitable number of stator slots, stator coils, stator phases, and/or inverter phases may be provided by or for a stator of this disclosure (it is to be noted that the stator slots referred to herein as stator slots 501-548 are shown by FIG. 5 as stator slots 1-48 for clarity sake).

As shown in FIG. 5, inverter 596 may include any suitable number of inverter components or half bridges 581 (e.g., 12 as shown, or any other suitable number), where each half bridge 581 may include a high power switch or switching device 580 (e.g., at the top) and a low power switch or switching device 584 (e.g., at the bottom), where switching device 580 may be electrically coupled to a high side of any suitable power source (not shown), and where switching device 584 may be electrically coupled to a low side of any suitable power source (not shown). A midpoint 582 of a connection between switching devices 580 and 584 of a half bridge 581 may be operative to output or otherwise provide a respective inverter phase 578 and electrically couple to a respective stator phase 570. Each stator phase 570 may be electrically coupled to a respective stator coil pair, where each stator coil pair may include a respective one stator coil 571 and a respective one stator coil 572 that may be electrically coupled together by a respective coil coupling 575 that may be illustrated by a line traversing across the center of the illustrated motor section. Each stator phase 570 may be coupled to a respective inverter phase 578. The AC output from an inverter phase 578 may enable its associated stator phase 570 to energize both the stator coil 571 and stator coil 572 of the associated stator coil pair (e.g., via associated coil coupling 575).

As shown in FIG. 5, each stator coil may be represented by a curved line that may be surrounding stator 566. Each stator coil may occupy two or more stator slots (e.g., labelled stator coil 571 may occupy stator slots 537 and 542, labelled stator coil 572 may occupy stator slots 513 and 518, etc.), with the curved line entering or exiting the plane of the illustrated section along the slots of the stator. Stator 566 may include any suitable number of stator slots (e.g., 48 slots 501-548) and any suitable number of stator coils (e.g., 24 stator coils (e.g., 12 stator coils 571 and 12 stator coils 572)), where each coupled pair of stator coils (e.g., a stator coil 571 and a stator coil 572 coupled via coil coupling 575) may be coupled to one stator phase 570. Different stator coils of stator 570 may be coupled together to form connection(s), such as a star/Wye connection (see, e.g., the connections of FIG. 6) or a delta connection or any other suitable connection, to complete the circuit.

Switching devices 580 and 584 of a half bridge 581 of inverter 596 may be operative to switch on and off to generate and output AC from an inverter phase 578 to a stator phase 570, whereby the AC may enter a stator coil pair through that inverter phase 578 and may generate a magnetic field. Eight-pole rotor 564 may be electromagnetically coupled to the magnetic field generated by all of the stator coils (e.g., all 24 stator coils (e.g., all 12 stator coil pairs)).

As mentioned, stator 566 of FIG. 5 is illustrated to include 24 stator coils and 12 stator phases, wherein each pair of opposing coils are coupled via a coil coupling, represented by the straight lines across the center of motor. Such a coil coupling may allow opposing coils to share the same stator phase. When operating, the stator coils sharing the same stator phase may activate and deactivate simultaneously. It is to be noted that the sharing of a half bridge and stator phase may not be limited to opposing coils. Any group of coils can share one half bridge if the desired function can be obtained.

Figure 6:
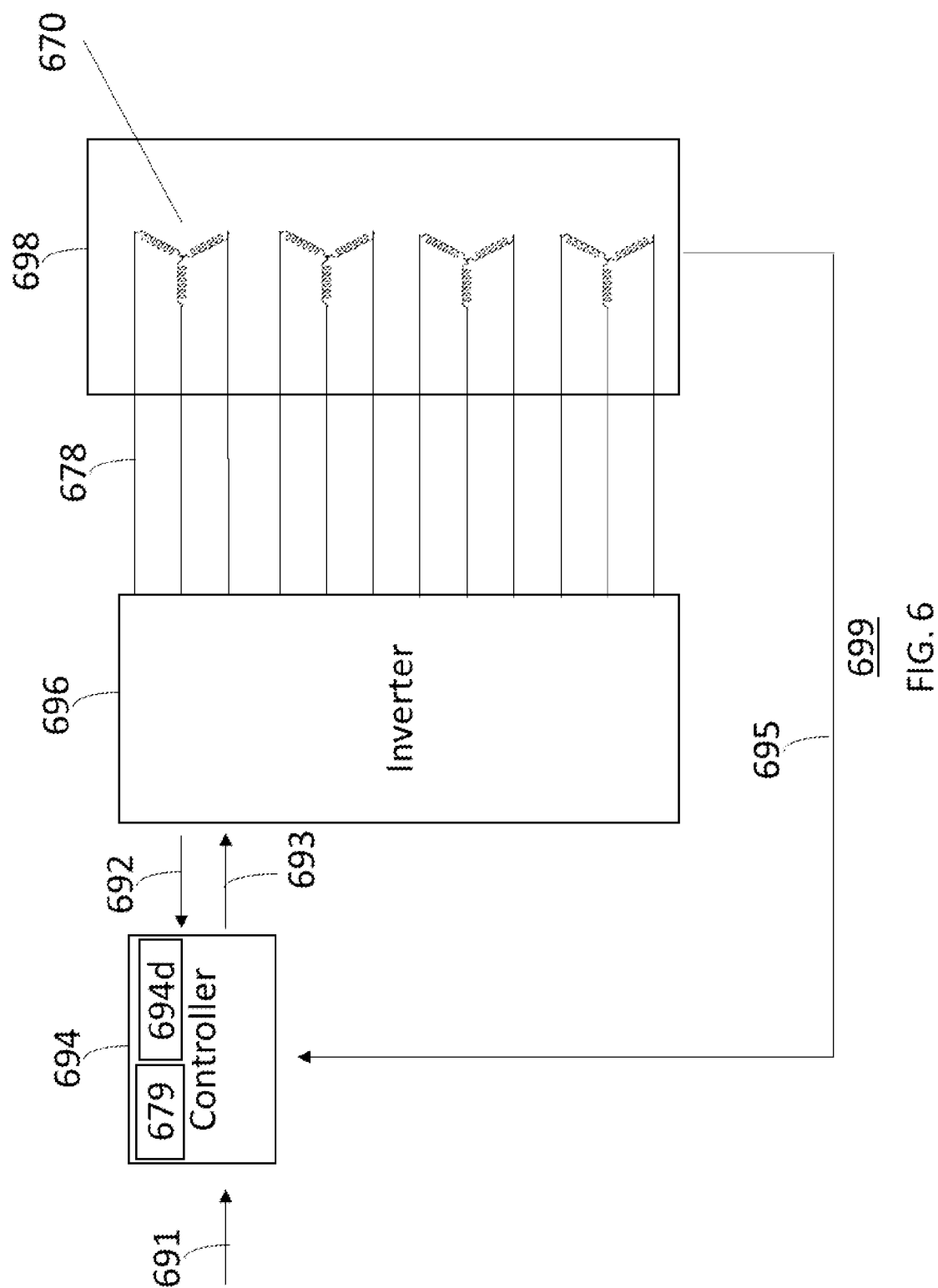
FIG. 6 is a block diagram representing a control system of the motor system of FIG. 5, according to some embodiments.

FIG. 6 illustrates a block diagram representing a control system 699 that may include a controller 694, an inverter 696, and a motor 698. As shown, controller 694 may be any suitable controller configured to generate one or more control signals 693 operative to be received by and used to control the inverter components (e.g., the switching devices of the half bridges) of inverter 696. Inverter 696 may be configured to generate and output any suitable number of inverter phases 678 to motor 698 (e.g., 12 inverter phases (e.g., the 12 inverter phases of system 599 of FIG. 5)). As shown, each inverter phase 678 may be coupled to a respective stator phase 670 of motor 698. Motor 698 may be configured to feedback to controller 694, either continuously or at set intervals, one or more motor feedback signals 695 that may be indicative of the motor's rotor position. Inverter 696 may be configured to feedback to controller 694, either continuously or at set intervals, one or more inverter feedback signals 692 that may be indicative of the AC amplitude of one, some, or each of the inverter phases 678. Controller 694 may also be configured to receive, either continuously or at set intervals, one or more torque command signals 691 that may be indicative of a value of a desired torque or torque command. Controller 694 may be configured to store or otherwise access any suitable additional controller data 694d, including, but not limited to, a pre-determined efficiency map or any other suitable information or processing commands (e.g., software, firmware, etc.). Controller 694 may be configured to generate and transmit any suitable control signal(s) 693 by referencing controller data 694d (e.g., a pre-determined efficiency map), the rotor position and/or any other suitable information from motor feedback signal(s) 695, the AC amplitude and/or any other suitable information from inverter feedback signal(s) 692, and the value of torque command and/or any other suitable information from command signal(s) 691. Analysis and processing of such signal(s) 691, 692, and 695 along with data 694d may enable controller 694 to determine which inverter phase(s) 678 to activate and/or the strategy of controlling inverter switching devices of half bridges of inverter 696 that may output activated inverter phases 678 that may achieve desired current amplitude of all activated inverter phases that may in turn achieve the value of the desired torque command at the motor with optimum efficiency, and then generate the appropriate control signal(s) 693 to enable such activation.

Controller 694 of system 699 may include any suitable processing circuitry that may be operative to control the operations and performance of one or more components of system 699, including inverter 696. For example, as mentioned, controller 694 may receive any suitable input signals or other suitable data and drive any suitable output signals. As shown in FIG. 6, processor or controller 694 may be used to run at least one application 679. Application 679 may include, but is not limited to, one or more operating system applications, firmware applications, software applications, algorithmic modules, data analysis applications, state determination applications, activity monitoring applications, and/or any other suitable applications. For example, controller 694 may load application 679 as a user interface program to determine how instructions or data received at controller 694 may manipulate the one or more ways in which information may be stored by and/or generated by and transmitted from controller 694. Any application 679 may be accessed by any processing circuitry of controller 694 from any suitable source, such as from any suitable memory and/or from any other system or server (e.g., a remote server (e.g., via any suitable communications circuitry)). Controller 694 may include a single processor or multiple processors. For example, controller 694 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Controller 394 also may include on board memory for caching purposes.

Figure 7:
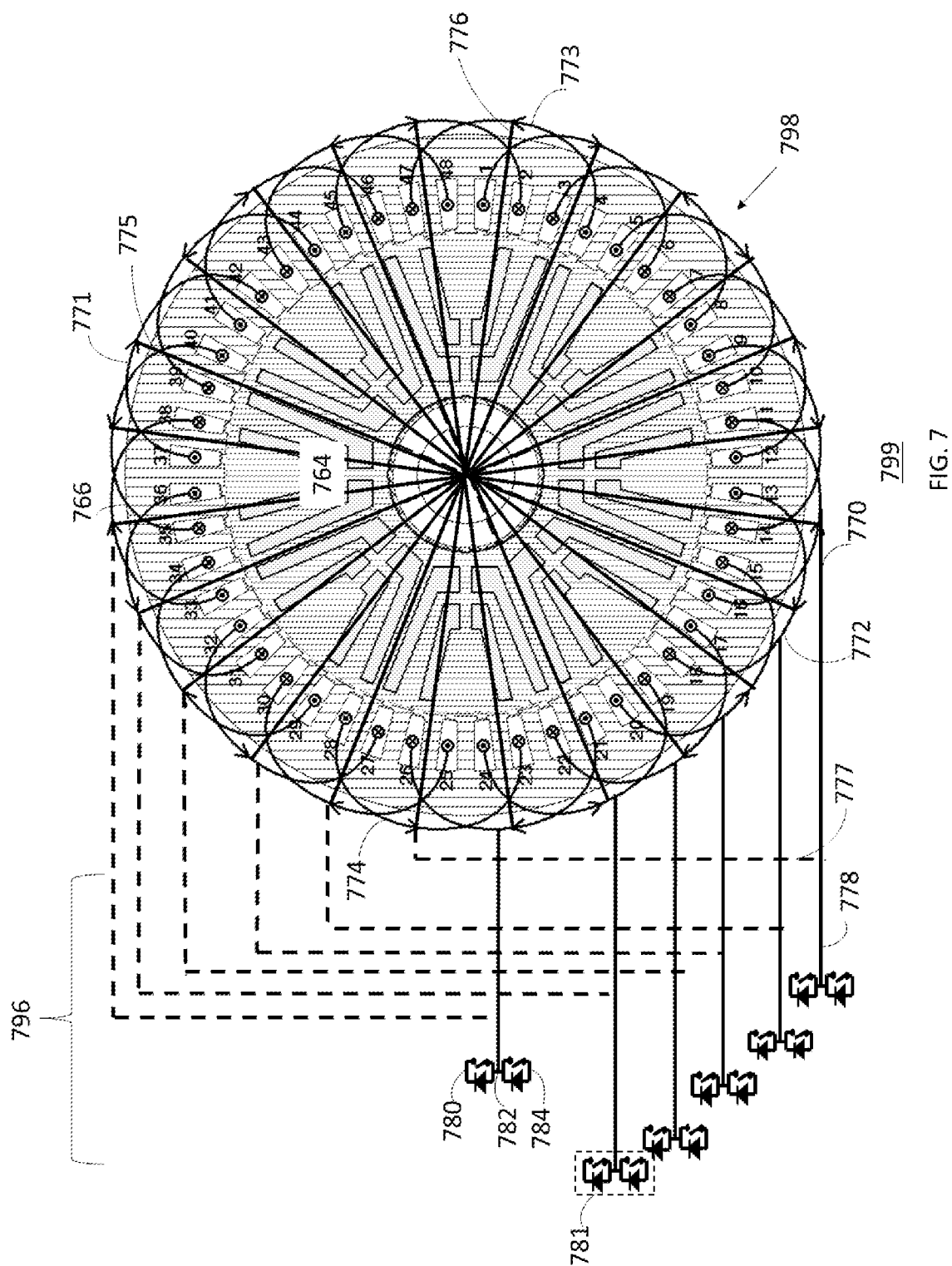
FIG. 7 is a schematic of another system with a motor in cross section, according to some embodiments.

FIG. 7 illustrates a schematic of a system 799 that may include a power source (not shown but that may be similar to power source 162 and/or power source 262), an inverter 796, and a motor 798 that may include a rotor 764 and a stator 766 (the stator and rotor are shown in section view for clarity). As shown, in some embodiments, rotor 764 may be an eight-pole rotor with 8 rotor poles, although any other suitable number of poles may be provided by a rotor of this disclosure. As shown, in some embodiments, stator 766 may include 48 stator slots 701-748, 24 stator coils (e.g., 6 stator coils 771, 6 stator coils 772, 6 stator coils 773, and 6 stator coils 774), and 6 stator phases 770, which may be electrically coupled to 6 inverter phases 778, respectively, although any other suitable number of stator slots, stator coils, stator phases, and/or inverter phases may be provided by or for a stator of this disclosure (it is to be noted that the stator slots referred to herein as stator slots 701-748 are shown by FIG. 7 as stator slots 1-48 for clarity sake).

As shown in FIG. 7, inverter 796 may include any suitable number of inverter components or half bridges 781 (e.g., 6 as shown, or any other suitable number), where each half bridge 781 may include a high power switch or switching device 780 (e.g., at the top) and a low power switch or switching device 784 (e.g., at the bottom), where switching device 780 may be electrically coupled to a high side of any suitable power source (not shown), and where switching device 784 may be electrically coupled to a low side of any suitable power source (not shown). A midpoint 782 of a connection between switching devices 780 and 784 of a half bridge 781 may be operative to output or otherwise provide a respective inverter phase 778 and electrically couple to a respective stator phase 770. Each stator phase 770 may be electrically coupled to a respective stator coil group. Each stator coil group may include a respective first stator coil 771 and a respective one stator coil 772 that may be electrically coupled together by a respective first coil coupling 775 that may be illustrated by a line traversing across the center of the illustrated motor section, where that pair of stator coils may be coupled to a respective stator phase 770. Each stator coil group may also include a respective one stator coil 773 and a respective one stator coil 774 that may be electrically coupled together by a respective second coil coupling 776 that may also be illustrated by a line traversing across the center of the illustrated motor section, where that pair of stator coils may be coupled to a respective stator phase 770 via a respective stator phase coupling 777. Each stator phase 770 may be coupled to a respective inverter phase 778. The AC output from an inverter phase 778 may enable its associated stator phase 770 to energize both the stator coil 771 and stator coil 772 of the first associated stator coil pair of the stator coil group (e.g., via associated first coil coupling 775) and also to energize (e.g., via associated stator phase coupling 777) both the stator coil 773 and stator coil 773 of the second associated stator coil pair of the stator coil group (e.g., via associated second coil coupling 776).

As shown in FIG. 7, each stator coil may be represented by a curved line that may be surrounding stator 766. Each stator coil may occupy two or more stator slots (e.g., labelled stator coil 771 may occupy stator slots 737 and 742, labelled stator coil 772 may occupy stator slots 713 and 718, labelled stator coil 773 may occupy stator slots 747 and 704, labelled stator coil 774 may occupy stator slots 723 and 728, etc.), with the curved line entering or exiting the plane of the illustrated section along the slots of the stator. Stator 766 may include any suitable number of stator slots (e.g., 48 slots 701-748) and any suitable number of stator coils (e.g., 24 stator coils (e.g., 6 stator coils 771, 6 stator coils 772, 6 stator coils 773, and 6 stator coils 774)), where each coupled group of stator coils (e.g., a stator coil 771 and a stator coil 772 coupled via a coil coupling 775 and a stator coil 773 and a stator coil 774 coupled via a coil coupling 776) may be coupled to one stator phase 770 (e.g., directly and/or via one or more stator phase couplings 777). Different stator coils of stator 770 may be coupled together to form connection(s), such as a star/Wye connection (see, e.g., the connections of FIG. 6) or a delta connection or any other suitable connection, to complete the circuit.

Switching devices 780 and 784 of a half bridge 781 of inverter 796 may be operative to switch on and off to generate and output AC from an inverter phase 778 to a stator phase 770, whereby the AC may enter a stator coil group through that inverter phase 778 and may generate a magnetic field. Eight-pole rotor 764 may be electromagnetically coupled to the magnetic field generated by all of the stator coils (e.g., all 24 stator coils (e.g., all 6 stator coil groups)).

As mentioned, stator 766 of FIG. 7 is illustrated to include 24 stator coils and 6 stator phases, wherein each group of coils are coupled via coil couplings, represented by the straight lines across the center of motor. Such coil couplings may allow a group of coils to share the same stator phase. When operating, the stator coils sharing the same stator phase may activate and deactivate simultaneously. Here both a stator coil 771 and a stator coil 772 may be coupled to stator phase 770 with a connection represented by line of coupling 775 across the center of the motor. Both a stator coil 773 and a stator coil 774 may also be coupled to stator phase 770 with a connection represented by line of coupling 776 across the center of the motor and with a connection represented by dash line of coupling 777. Stator phase 770 may be coupled to inverter phase 778. The AC output from inverter phase 778 may energize coils 771, 772, 773, and 774 of the associated coil group. The remaining stator coils may be coupled into groups and coupled to associated stator phases and inverter phases similarly. It is to be noted that the sharing of a half bridge and stator phase may not be limited to a group of 4 coils. Any group of coils can share one half bridge if the desired function can be obtained.

Figure 8:
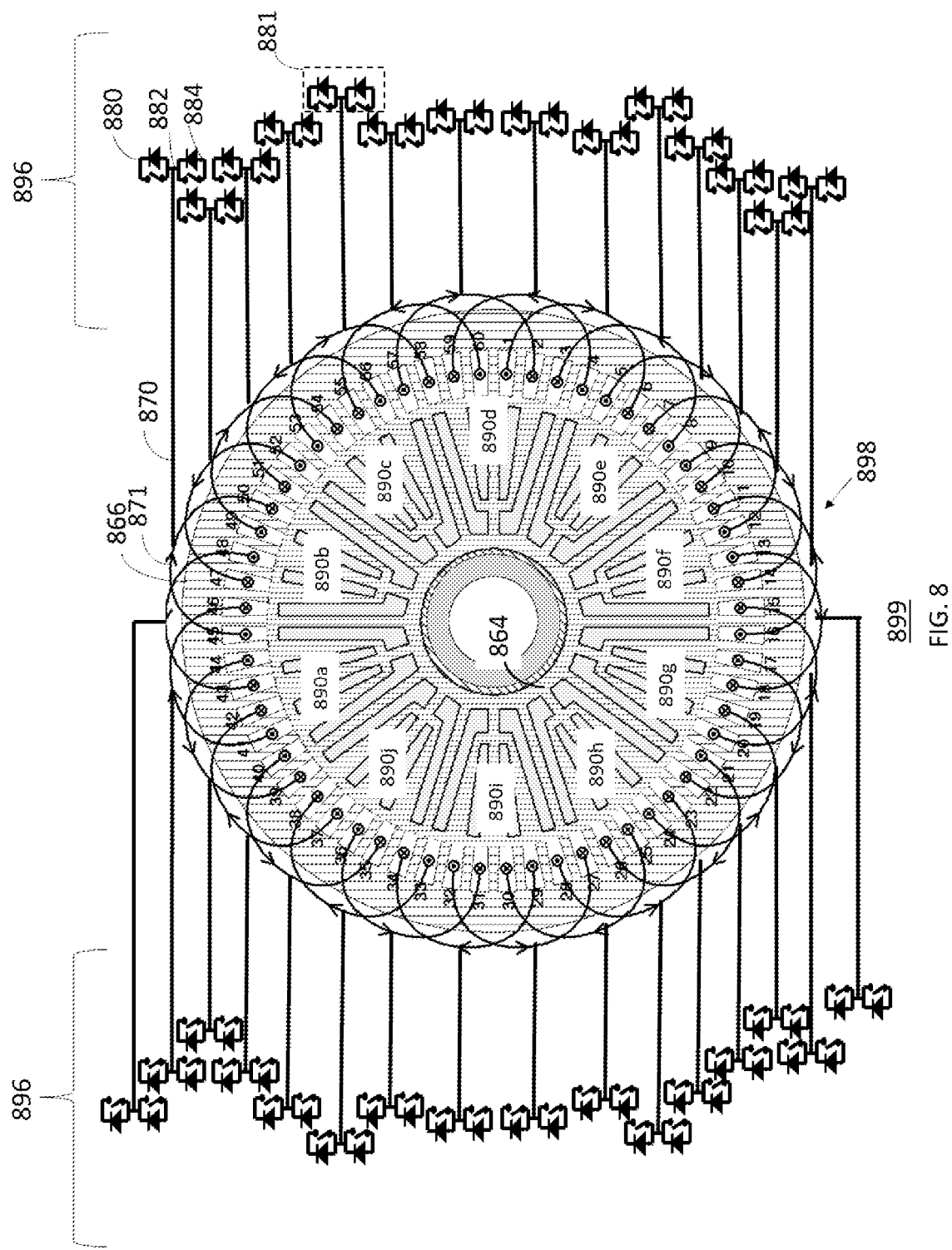
FIG. 8 is a schematic of another system with a motor in cross section, according to some embodiments.

FIG. 8 illustrates a schematic of a system 899 that may include a power source (not shown but that may be similar to power source 162 and/or power source 262), an inverter 896, and a motor 898 that may include a rotor 864 and a stator 866 (the stator and rotor are shown in section view for clarity). As shown, in some embodiments, rotor 864 may be a ten-pole rotor with 10 rotor poles 890a-890j, although any other suitable number of poles may be provided by a rotor of this disclosure. As shown, in some embodiments, stator 866 may include 60 stator slots 801-860, 30 stator coils 871, and 30 stator phases 870, which may be electrically coupled to 30 inverter phases 878, respectively, although any other suitable number of stator slots, stator coils, stator phases, and/or inverter phases may be provided by or for a stator of this disclosure (it is to be noted that the stator slots referred to herein as stator slots 801-860 are shown by FIG. 8 as stator slots 1-60 for clarity sake).

As shown in FIG. 8, inverter 896 may include any suitable number of inverter components or half bridges 881 (e.g., 30 as shown, or any other suitable number), where each half bridge 881 may include a high power switch or switching device 880 (e.g., at the top) and a low power switch or switching device 884 (e.g., at the bottom), where switching device 880 may be electrically coupled to a high side of any suitable power source (not shown), and where switching device 884 may be electrically coupled to a low side of any suitable power source (not shown). A midpoint 882 of a connection between switching devices 880 and 884 of a half bridge 881 may be operative to output or otherwise provide a respective inverter phase 878 and electrically couple to a respective stator phase 870. Each stator phase 870 may be electrically coupled to a respective stator coil 871.

As shown in FIG. 8, each stator coil 871 may be represented by a curved line that may be surrounding stator 866. Each stator coil 871 may occupy two or more stator slots (e.g., labelled stator coil 871 may occupy stator slots 845 and 850, etc.), with the curved line entering or exiting the plane of the illustrated section along the slots of the stator. Stator 866 may include any suitable number of stator slots (e.g., 60 slots 801-860) and any suitable number of stator coils 871 (e.g., 30 stator coils 871), where each stator coil 871 may be coupled to one stator phase 870. Different stator coils of stator 870 may be coupled together to form connection(s), such as a star or Wye connection (see, e.g., the connections of FIG. 10) or a delta connection or any other suitable connection, to complete the circuit.

Switching devices 880 and 884 of a half bridge 881 of inverter 896 may be operative to switch on and off to generate and output AC from an inverter phase 878 to a stator phase 870, whereby the AC may enter a stator coil 871 through that inverter phase 878 and may generate a magnetic field. Ten-pole rotor 864 may be electromagnetically coupled to the magnetic field generated by all of the stator coils (e.g., all 30 stator coils 871).

Figure 9:
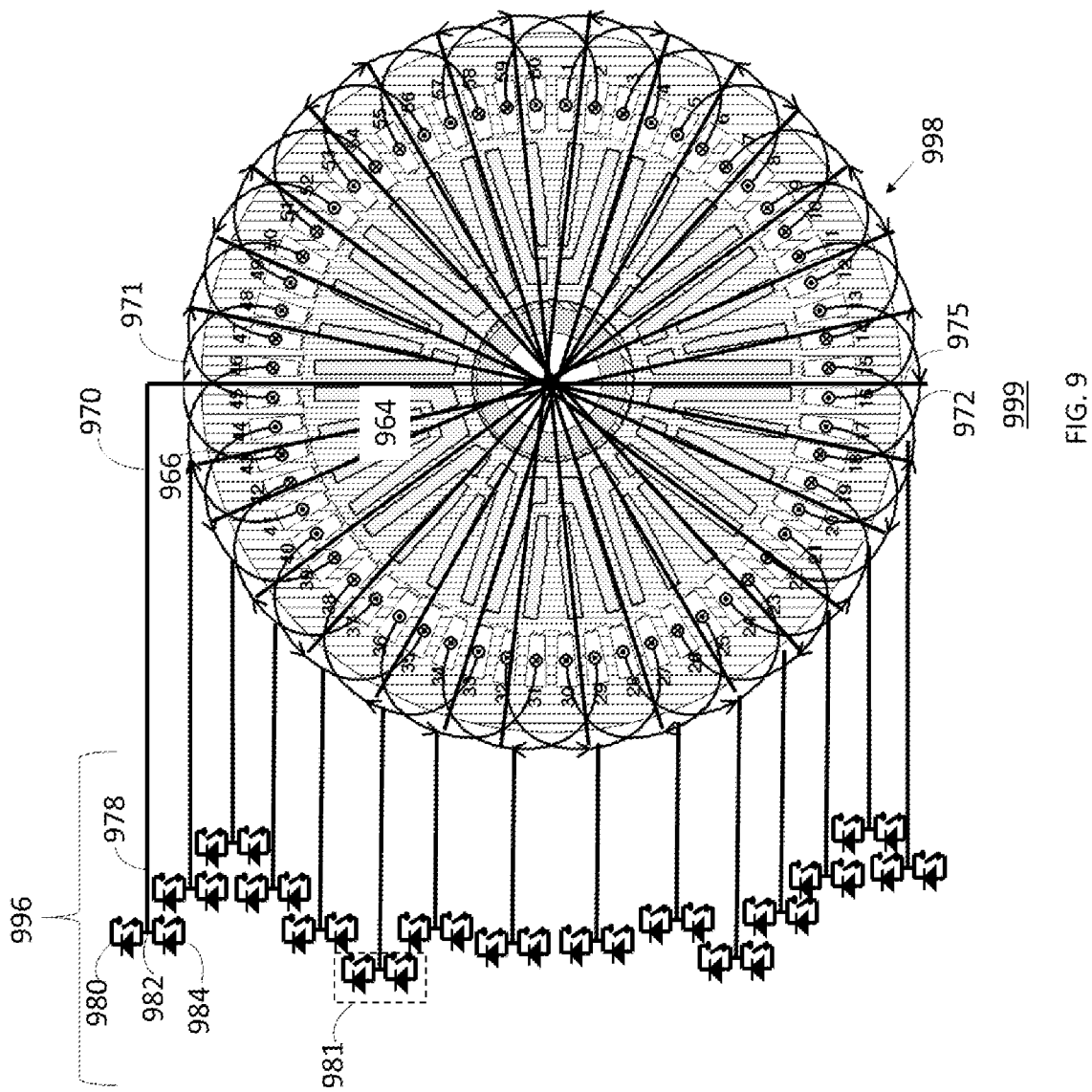
FIG. 9 is a schematic of another system with a motor in cross section, according to some embodiments.

FIG. 9 illustrates a schematic of a system 999 that may include a power source (not shown but that may be similar to power source 162 and/or power source 262), an inverter 996, and a motor 998 that may include a rotor 964 and a stator 966 (the stator and rotor are shown in section view for clarity). As shown, in some embodiments, rotor 964 may be a ten-pole rotor with 10 rotor poles, although any other suitable number of poles may be provided by a rotor of this disclosure. As shown, in some embodiments, stator 966 may include 60 stator slots 901-960, 30 stator coils (e.g., 15 stator coils 971 and 15 stator coils 972), and 15 stator phases 970, which may be electrically coupled to 15 inverter phases 978, respectively, although any other suitable number of stator slots, stator coils, stator phases, and/or inverter phases may be provided by or for a stator of this disclosure (it is to be noted that the stator slots referred to herein as stator slots 901-960 are shown by FIG. 9 as stator slots 1-60 for clarity sake).

As shown in FIG. 9, inverter 996 may include any suitable number of inverter components or half bridges 981 (e.g., 15 as shown, or any other suitable number), where each half bridge 981 may include a high power switch or switching device 980 (e.g., at the top) and a low power switch or switching device 984 (e.g., at the bottom), where switching device 980 may be electrically coupled to a high side of any suitable power source (not shown), and where switching device 984 may be electrically coupled to a low side of any suitable power source (not shown). A midpoint 982 of a connection between switching devices 980 and 984 of a half bridge 981 may be operative to output or otherwise provide a respective inverter phase 978 and electrically couple to a respective stator phase 970. Each stator phase 970 may be electrically coupled to a respective stator coil pair, where each stator coil pair may include a respective one stator coil 971 and a respective one stator coil 972 that may be electrically coupled together by a respective coil coupling 975 that may be illustrated by a line traversing across the center of the illustrated motor section. Each stator phase 970 may be coupled to a respective inverter phase 978. The AC output from an inverter phase 978 may enable its associated stator phase 970 to energize both the stator coil 971 and stator coil 972 of the associated stator coil pair (e.g., via associated coil coupling 975).

As shown in FIG. 9, each stator coil may be represented by a curved line that may be surrounding stator 966. Each stator coil may occupy two or more stator slots (e.g., labelled stator coil 971 may occupy stator slots 943 and 948, labelled stator coil 972 may occupy stator slots 913 and 918, etc.), with the curved line entering or exiting the plane of the illustrated section along the slots of the stator. Stator 966 may include any suitable number of stator slots (e.g., 60 slots 901-960) and any suitable number of stator coils (e.g., 30 stator coils (e.g., 15 stator coils 971 and 15 stator coils 972)), where each coupled pair of stator coils (e.g., a stator coil 971 and a stator coil 972 coupled via coil coupling 975) may be coupled to one stator phase 970. Different stator coils of stator 970 may be coupled together to form connection(s), such as a star/Wye connection (see, e.g., the connections of FIG. 10) or a delta connection or any other suitable connection, to complete the circuit.

Switching devices 980 and 984 of a half bridge 981 of inverter 996 may be operative to switch on and off to generate and output AC from an inverter phase 978 to a stator phase 970, whereby the AC may enter a stator coil pair through that inverter phase 978 and may generate a magnetic field. Ten-pole rotor 964 may be electromagnetically coupled to the magnetic field generated by all of the stator coils (e.g., all 30 stator coils (e.g., all 15 stator coil pairs)).

As mentioned, stator 966 of FIG. 9 is illustrated to include 30 stator coils and 15 stator phases, wherein each pair of opposing coils are coupled via a coil coupling, represented by the straight lines across the center of motor. Such a coil coupling may allow opposing coils to share the same stator phase. When operating, the stator coils sharing the same stator phase may activate and deactivate simultaneously. It is to be noted that the sharing of a half bridge and stator phase may not be limited to opposing coils. Any group of coils can share one half bridge if the desired function can be obtained.

Figure 10:
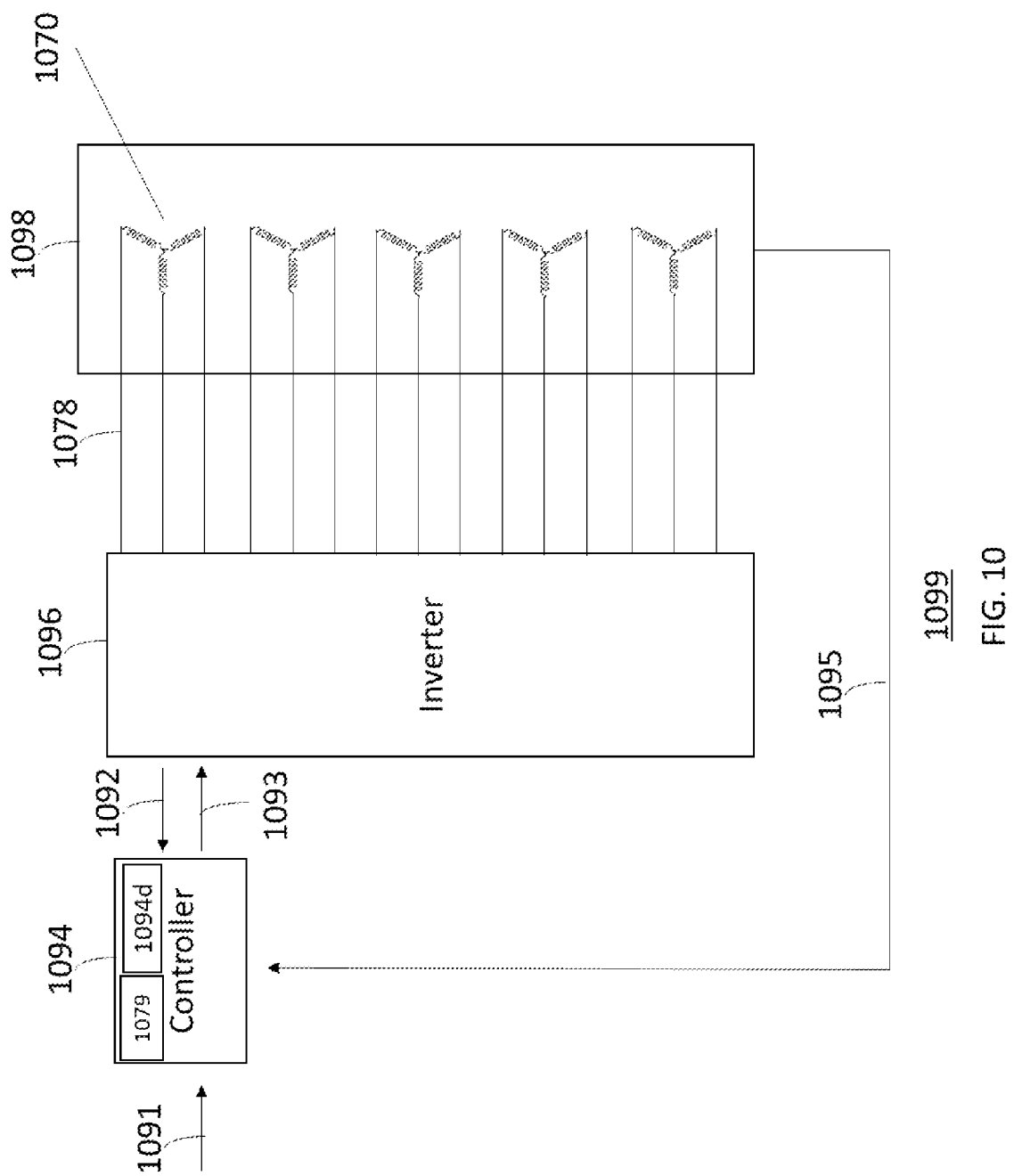
FIG. 10 is a block diagram representing a control system of the motor system of FIG. 9, according to some embodiments.

FIG. 10 illustrates a block diagram representing a control system 1099 that may include a controller 1094, an inverter 1096, and a motor 1098. As shown, controller 1094 may be any suitable controller configured to generate one or more control signals 1093 operative to be received by and used to control the inverter components (e.g., the switching devices of the half bridges) of inverter 1096. Inverter 1096 may be configured to generate and output any suitable number of inverter phases 1078 to motor 1098 (e.g., 15 inverter phases (e.g., the 15 inverter phases of system 999 of FIG. 9)). As shown, each inverter phase 1078 may be coupled to a respective stator phase 1070 of motor 1098. Motor 1098 may be configured to feedback to controller 1094, either continuously or at set intervals, one or more motor feedback signals 1095 that may be indicative of the motor's rotor position. Inverter 1096 may be configured to feedback to controller 1094, either continuously or at set intervals, one or more inverter feedback signals 1092 that may be indicative of the AC amplitude of one, some, or each of the inverter phases 1078. Controller 1094 may also be configured to receive, either continuously or at set intervals, one or more torque command signals 1091 that may be indicative of a value of a desired torque or torque command. Controller 1094 may be configured to store or otherwise access any suitable additional controller data 1094*d*, including, but not limited to, a pre-determined efficiency map or any other suitable information or processing commands (e.g., software, firmware, etc.). Controller 1094 may be configured to generate and transmit any suitable control signal(s) 1093 by referencing controller data 1094*d* (e.g., a pre-determined efficiency map), the rotor position and/or any other suitable information from motor feedback signal(s) 1095, the AC amplitude and/or any other suitable information from inverter feedback signal(s) 1092, and the value of torque command and/or any other suitable information from command signal(s) 1091. Analysis and processing of such signal(s) 1091, 1092, and 1095 along with data 1094*d* may enable controller 1094 to determine which inverter phase(s) 1078 to activate and/or the strategy of controlling inverter switching devices of half bridges of inverter 1096 that may output activated inverter phases 1078 that may achieve desired current amplitude of all activated inverter phases that may in turn achieve the value of the desired torque command at the motor with optimum efficiency, and then generate the appropriate control signal(s) 1093 to enable such activation.

Controller 1094 of system 1099 may include any suitable processing circuitry that may be operative to control the operations and performance of one or more components of system 1099, including inverter 1096. For example, as mentioned, controller 1094 may receive any suitable input signals or other suitable data and drive any suitable output signals. As shown in FIG. 10, processor or controller 1094 may be used to run at least one application 1079. Application 1079 may include, but is not limited to, one or more operating system applications, firmware applications, software applications, algorithmic modules, data analysis applications, state determination applications, activity monitoring applications, and/or any other suitable applications. For example, controller 1094 may load application 1079 as a user interface program to determine how instructions or data received at controller 1094 may manipulate the one or more ways in which information may be stored by and/or generated by and transmitted from controller 1094. Any application 1079 may be accessed by any processing circuitry of controller 1094 from any suitable source, such as from any suitable memory and/or from any other system or server (e.g., a remote server (e.g., via any suitable communications circuitry)). Controller 1094 may include a single processor or multiple processors. For example, controller 1094 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Controller 394 also may include on board memory for caching purposes.

Figure 11:
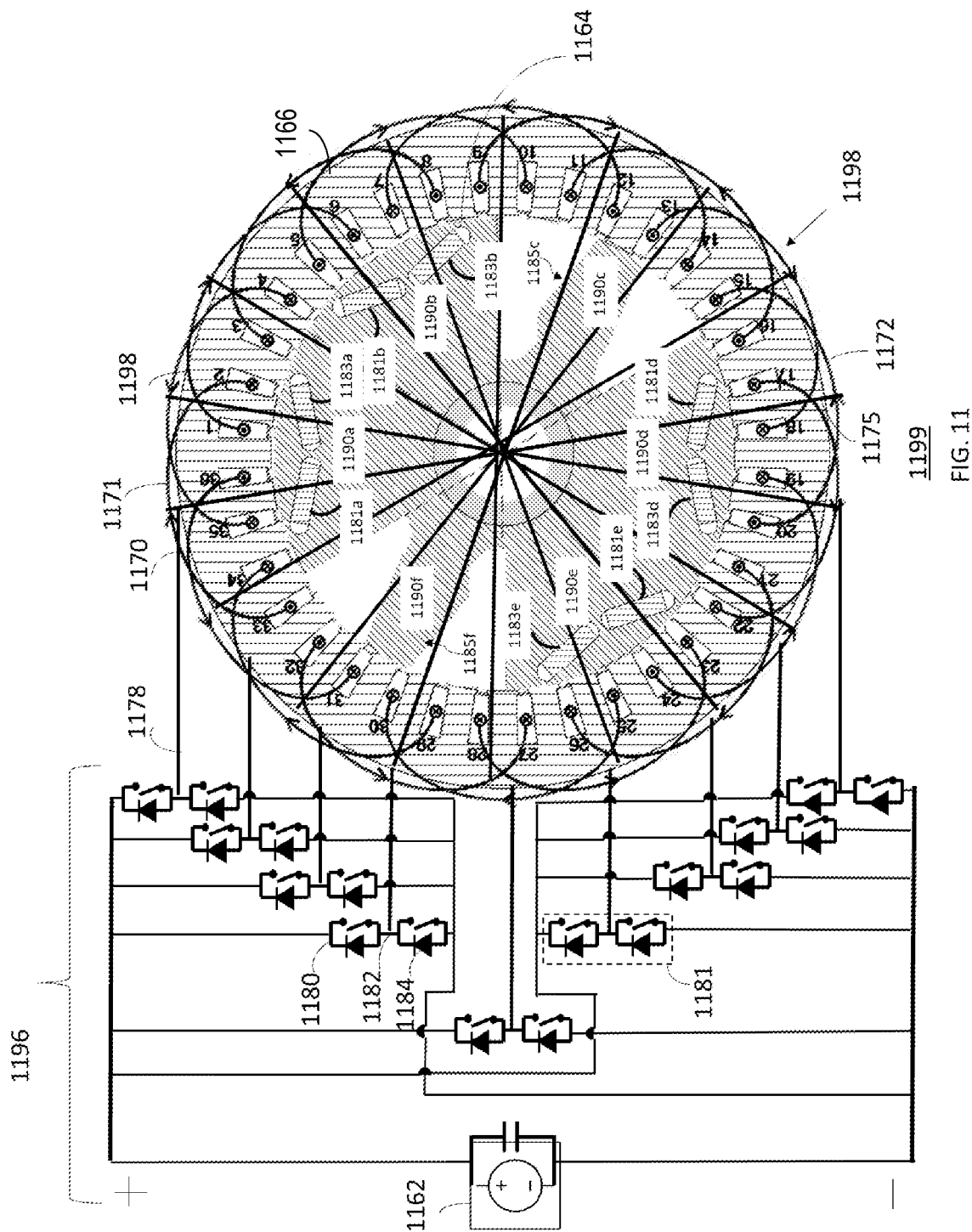
FIG. 11 is a schematic of another system with a motor in cross section, according to some embodiments.

FIG. 11 illustrates a schematic of a system 1199 that may include a power source 1162, an inverter 1196, and a motor 1198 that may include a rotor 1164 and a stator 1166 (the stator and rotor are shown in section view for clarity). As shown, in some embodiments, rotor 1164 may be a six-pole rotor with 6 rotor poles, although any other suitable number of poles may be provided by a rotor of this disclosure. As shown, in some embodiments, stator 1166 may include 36 stator slots 1101-1136, 18 stator coils (e.g., 9 stator coils 1171 and 9 stator coils 1172), and 9 stator phases 1170, which may be electrically coupled to 9 inverter phases 1178, respectively, although any other suitable number of stator slots, stator coils, stator phases, and/or inverter phases may be provided by or for a stator of this disclosure (it is to be noted that the stator slots referred to herein as stator slots 1101-1136 are shown by FIG. 11 as stator slots 1-36 for clarity sake).

As shown in FIG. 11, inverter 1196 may include any suitable number of inverter components or half bridges 1181 (e.g., 9 as shown, or any other suitable number), where each half bridge 1181 may include a high power switch or switching device 1180 (e.g., at the top) and a low power switch or switching device 1184 (e.g., at the bottom), where switching device 1180 may be electrically coupled to a high side of any suitable power source 1162 (e.g., a battery), and where switching device 1184 may be electrically coupled to a low side of power source 1162. A midpoint 1182 of a connection between switching devices 1180 and 1184 of a half bridge 1181 may be operative to output or otherwise provide a respective inverter phase 1178 and electrically couple to a respective stator phase 1170. Each stator phase 1170 may be electrically coupled to a respective stator coil pair, where each stator coil pair may include a respective one stator coil 1171 and a respective one stator coil 1172 that may be electrically coupled together by a respective coil coupling 1175 that may be illustrated by a line traversing across the center of the illustrated motor section. Each stator phase 1170 may be coupled to a respective inverter phase 1178. The AC output from an inverter phase 1178 may enable its associated stator phase 1170 to energize both the stator coil 1171 and stator coil 1172 of the associated stator coil pair (e.g., via associated coil coupling 1175).

As shown in FIG. 11, each stator coil may be represented by a curved line that may be surrounding stator 1166. Each stator coil may occupy two or more stator slots (e.g., labelled stator coil 1171 may occupy stator slots 1133 and 1102, labelled stator coil 1172 may occupy stator slots 1115 and 1120, etc.), with the curved line entering or exiting the plane of the illustrated section along the slots of the stator. Stator 1166 may include any suitable number of stator slots (e.g., 36 slots 1101-1136) and any suitable number of stator coils (e.g., 18 stator coils (e.g., 9 stator coils 1171 and 9 stator coils 1172)), where each coupled pair of stator coils (e.g., a stator coil 1171 and a stator coil 1172 coupled via coil coupling 1175) may be coupled to one stator phase 1170. Different stator coils of stator 1170 may be coupled together to form connection(s), such as a star/Wye connection (see, e.g., the connections of FIG. 3) or a delta connection or any other suitable connection, to complete the circuit.

Switching devices 1180 and 1184 of a half bridge 1181 of inverter 1196 may be operative to switch on and off to generate and output AC from an inverter phase 1178 to a stator phase 1170, whereby the AC may enter a stator coil pair through that inverter phase 1178 and may generate a magnetic field. Six-pole rotor 1164 may be electromagnetically coupled to the magnetic field generated by all of the stator coils (e.g., all 18 stator coils (e.g., all 9 stator coil pairs)).

As mentioned, stator 1166 of FIG. 11 is illustrated to include 18 stator coils and 9 stator phases, wherein each pair of opposing coils are coupled via a coil coupling, represented by the straight lines across the center of motor. Such a coil coupling may allow opposing coils to share the same stator phase. When operating, the stator coils sharing the same stator phase may activate and deactivate simultaneously. It is to be noted that the sharing of a half bridge and stator phase may not be limited to opposing coils. Any group of coils can share one half bridge if the desired function can be obtained.

Therefore, FIG. 11 may illustrate a system 1199 that may be substantially similar to system 299 of FIG. 2, with an exception being that, unlike rotor 264 of system 299 that may include six poles that are all of the same geometry (e.g., each pole has an identical geometry of variable reluctance (e.g., each rotor pole has the same geometrical structure removed from the rotor pole base (e.g., soft magnetic material, such as laminated silicon steel) for creating variable depth in each rotor pole such that when stator flux may electromagnetically couple with these geometries at an angle, a reluctance force can be generated on the rotor (e.g., flux at different locations will experience different depths of the rotor, so the reluctance may vary, but will also repeat each pole as each pole may be substantially the same if not exactly the same (e.g., distribution may vary within the same pole)))), the geometry of six-phase rotor 1164 of motor 1198 of system 1199 may be arranged in poles 1190a-1190f that may include a non-uniform physical construction and layout (e.g., at least two rotor poles of the rotor differ from one another in structural geometry). For example, as shown in FIG. 11, rotor pole 1190a may include embedded magnets 1181a and 1183a (e.g., arranged in a V shape (e.g., permanent magnets that have magnetic flux when magnetized may be positioned within cutouts made into the rotor pole base)). Similar to rotor pole 1190a, rotor poles 1190b, 1190d, and 1190e may each include embedded magnets (e.g., magnets 1181b and 1183b, magnets 1181d and 1183d, and magnets 1181e and 1183e, respectively), where any suitable type(s) of magnets may be used to provide any permanent/embedded rotor magnet (e.g., Neodymium Iron Boron, NdFeB, Ferrite, etc.), although it is to be understood that any suitable magnet material(s), magnet geometry(ies), and/or rotor pole geometry(ies) may be used based on the particular design goals. However, rotor poles 1190c and 1190f may not have embedded permanent magnets. Instead, rotor poles 1190c and 1190f may each have a switch reluctance geometry (e.g., cutout geometry 1185c and cutout geometry 1185f, respectively) that may be designed to allow electromagnetic coupling between stator and rotor to generate reluctance torque.

Figure 12:
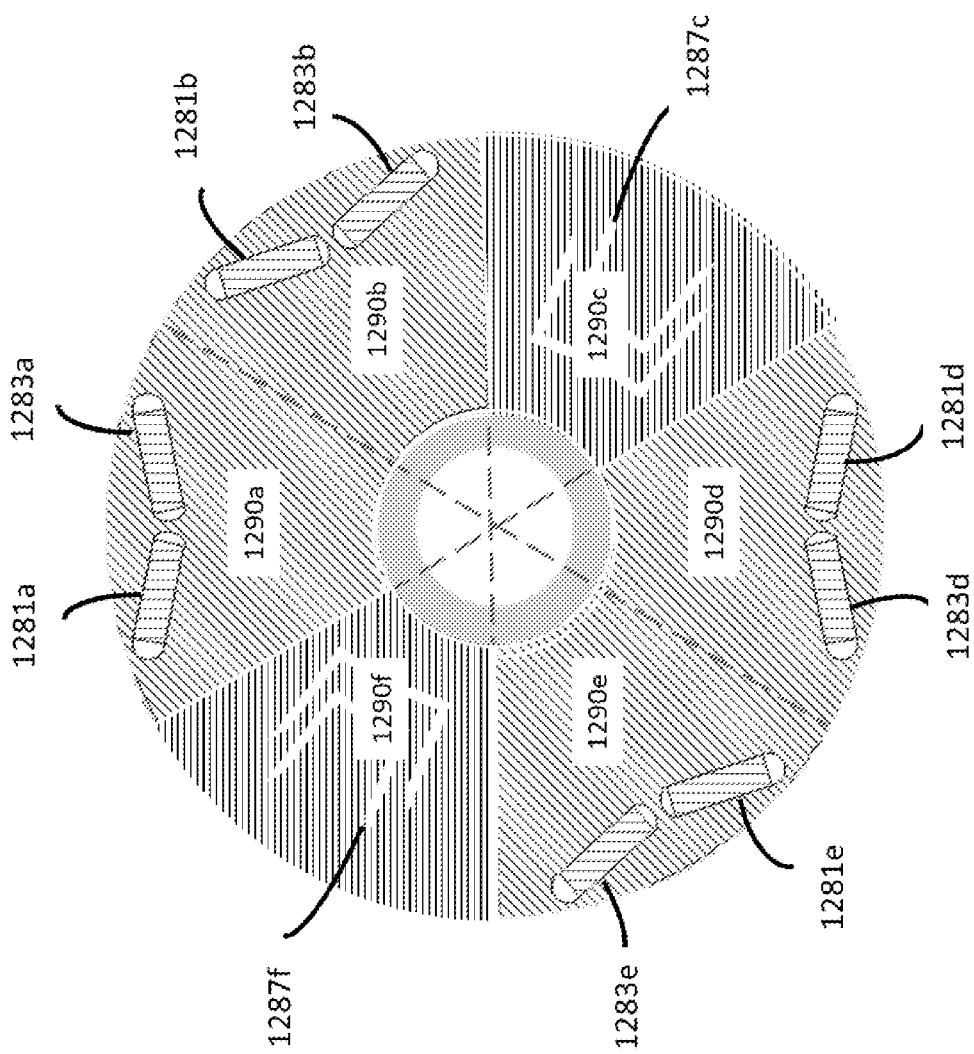
FIG. 12 is a schematic of a rotor structure in cross section, according to some embodiments.

FIG. 12 illustrates another embodiment of a construction of a six-pole rotor 1264 of a motor system. The geometry of six-phase rotor 1264 may be arranged in poles 1290a-1290f that may include another non-uniform physical construction and layout. For example, as shown in FIG. 12, rotor pole 1290a may include embedded magnets 1281a and 1283a (e.g., arranged in a V shape). Similar to rotor pole 1290a, rotor poles 1290b, 1290d, and 1290e may each include embedded magnets (e.g., magnets 1281b and 1283b, magnets 1281d and 1283d, and magnets 1281e and 1283e, respectively). However, rotor poles 1290c and 1290f may not have embedded permanent magnets. Instead, rotor poles 1290c and 1290f may each have a synchronized reluctance geometry (e.g., cutout geometry 1287c and cutout geometry 1287f, respectively) that may be designed to allow electromagnetic coupling between stator and rotor to generate reluctance torque. Geometry 1287c and geometry 1287f may differ from geometry 1185c and geometry 1185f in one or more ways for being optimized or otherwise configured for different motor configurations (e.g., the synchronized reluctance geometry may be configured for distributed coil winding pattern motors while the switch reluctance geometry may be configured for concentrated winding pattern motors)

Figure 13:
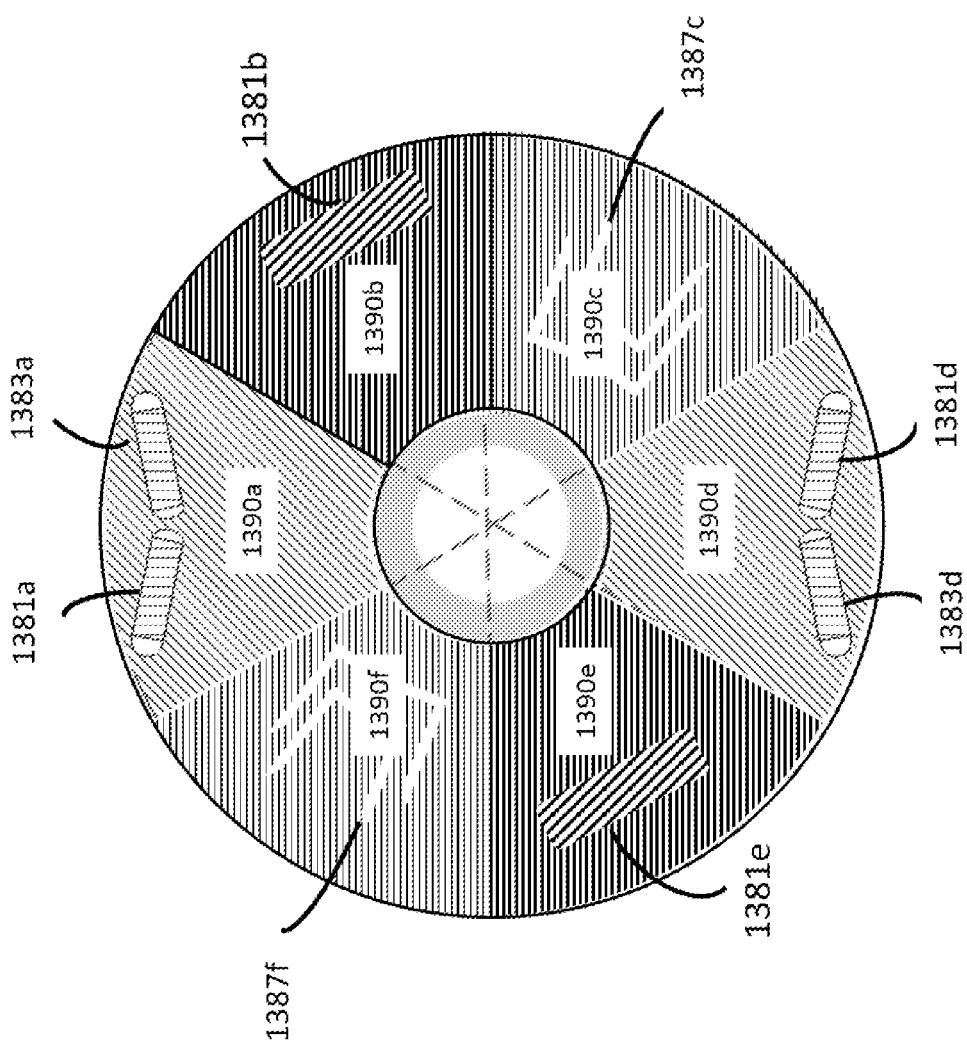
FIG. 13 is a schematic of another rotor structure in cross section, according to some embodiments.

FIG. 13 illustrates another embodiment of a construction of a six-pole rotor 1364 of a motor system. The geometry of six-phase rotor 1364 may be arranged in poles 1390a-1390f that may include another non-uniform physical construction and layout. For example, as shown in FIG. 13, rotor pole 1390a may include embedded magnets 1381a and 1383a (e.g., arranged in a V shape). Similar to rotor pole 1390a, rotor pole 1390d may include embedded magnets 1381d and 1383d, while rotor poles 1390b and 1290e may only have one embedded magnet (e.g., magnet 1381b and magnet 1381e, respectively). However, rotor poles 1390c and 1390f may not have embedded permanent magnets. Instead, rotor poles 1390c and 1390f may each have a synchronized reluctance geometry (e.g., geometry 1387c and geometry 1387f, respectively) that may be designed to allow electromagnetic coupling between stator and rotor to generate reluctance torque.

Figure 14:
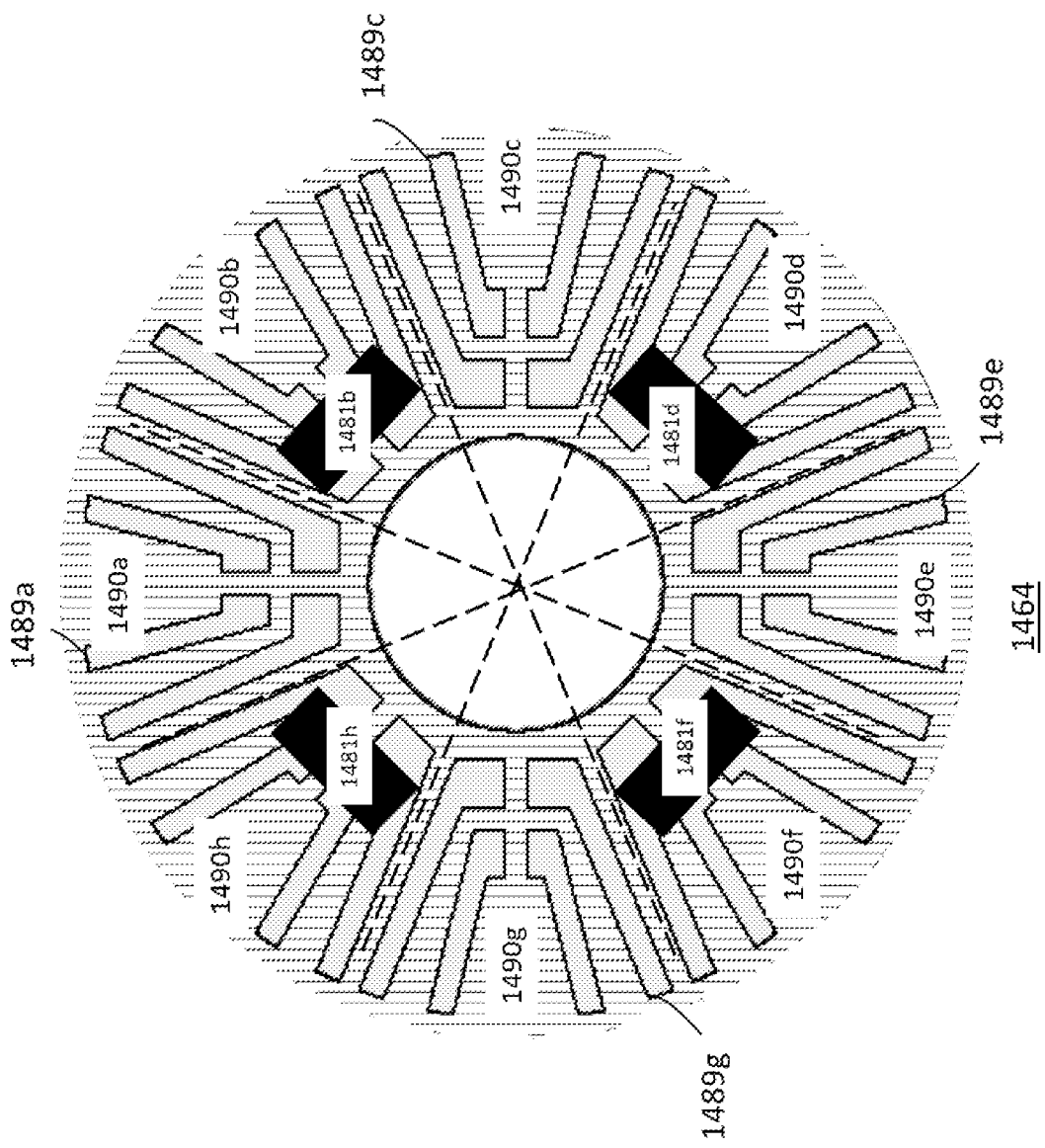
FIG. 14 is a schematic of another rotor structure in cross section, according to some embodiments.

FIG. 14 illustrates another embodiment of a construction of an eight-pole rotor 1464 of a motor system. The geometry of eight-phase rotor 1464 may be arranged in poles 1490a-1490h that may include another non-uniform physical construction and layout. For example, as shown in FIG. 14, each one of rotor poles 1490b, 1490d, 1490f, and 1490h may include one embedded magnet (e.g., magnet 1481b, magnet 1481d, magnet 1481f, and magnet 1381h, respectively). However, rotor poles 1490a, 1490c, 1490e, and 1490g may not have embedded permanent magnets. Instead, rotor poles 1490a, 1490c, 1490e, and 1490g may each have a geometry of variable reluctance (e.g., geometry 1489a, geometry 1489c, geometry 1489e, and geometry 1489g, respectively). Such an arrangement may be designed to allow electromagnetic coupling between stator and rotor to generate reluctance torque.

Figure 15:
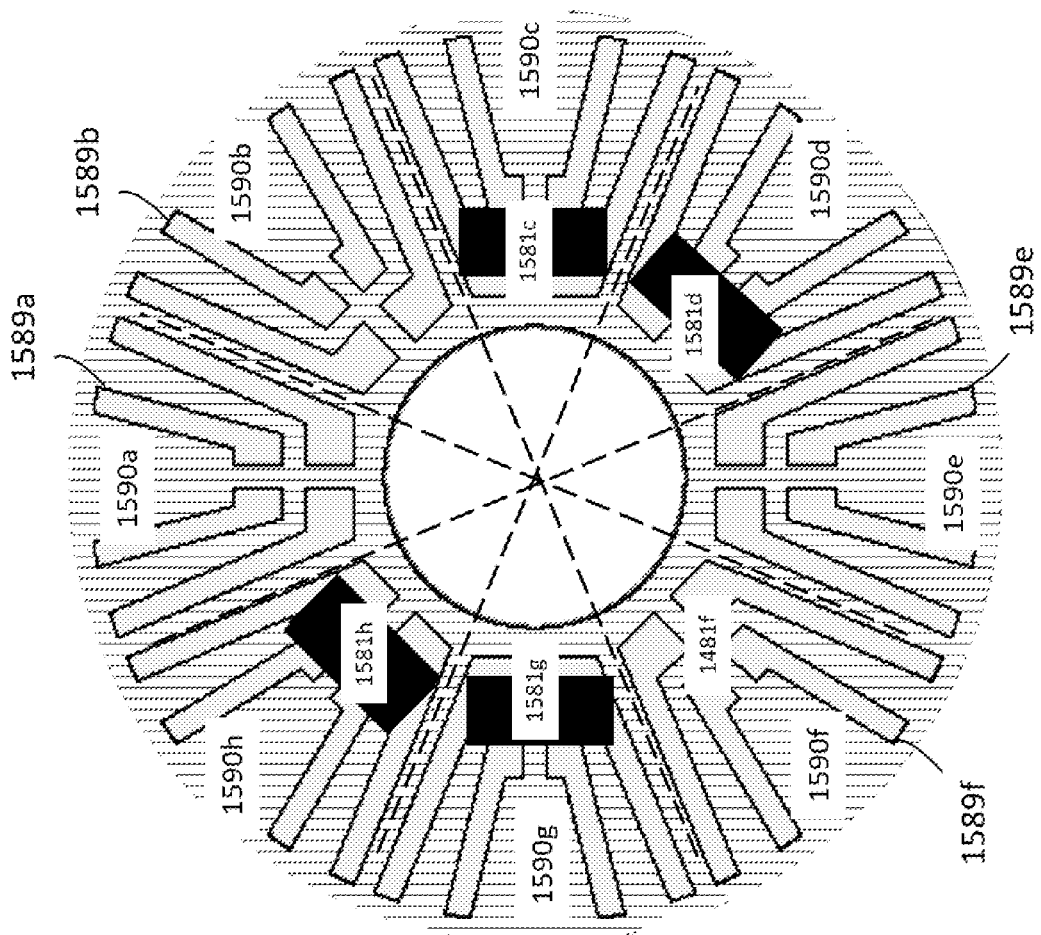
FIG. 15 is a schematic of another rotor structure in cross section, according to some embodiments.

FIG. 15 illustrates another embodiment of a construction of an eight-pole rotor 1564 of a motor system. The geometry of eight-phase rotor 1564 may be arranged in poles 1590a-1590h that may include another non-uniform physical construction and layout. For example, as shown in FIG. 15, each one of rotor poles 1590c, 1590d, 1590g, and 1590h may include one embedded magnet (e.g., magnet 1581c, magnet 1581d, magnet 1581g, and magnet 1581h, respectively). However, rotor poles 1590a, 1590b, 1590e, and 1590f may not have embedded permanent magnets. Instead, rotor poles 1590a, 1590b, 1590e, and 1590f may each have a geometry of variable reluctance (e.g., geometry 1589a, geometry 1589b, geometry 1589e, and geometry 1589f, respectively). Such an arrangement may be designed to allow electromagnetic coupling between stator and rotor to generate reluctance torque.

A motor with a rotor geometry illustrated by any one of FIGS. 11-13 may be used by a control system, such as system 399 of FIG. 3. Similarly, a motor with a rotor geometry illustrated by any one of FIGS. 14 and 15 may be used by a control system, such as system 699 of FIG. 6. When receiving a torque command, such a system can determine which inverter phases to activate, and can determine the strategy of controlling inverter switching devices of half bridges that outputs activated inverter phases to achieve a desired current amplitude of all activated inverter phases, which may achieve a value of torque command with optimum efficiency.

Figure 21:
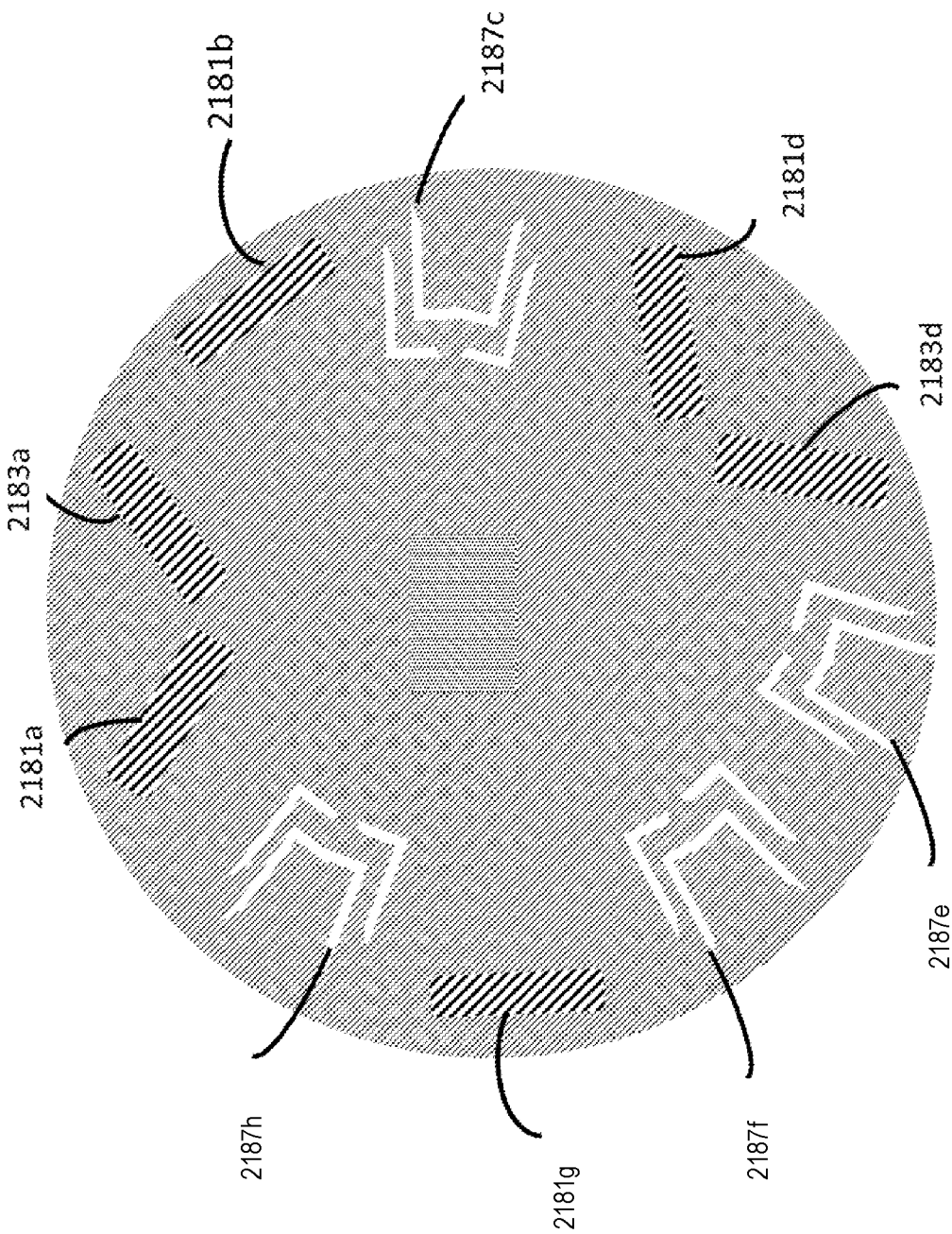
FIG. 21 is a schematic of another rotor structure in cross section, according to some embodiments.

The rotor geometry can be further altered to have varying permanent magnet position and reluctance patterns in a continuous varying fashion along the circumvent, thereby abandoning the need to group sections of a rotor into "poles" (see, e.g., rotor 2164 of FIG. 21, where the rotor base may not be delineated into poles (e.g., no breaks or other pole-defining features)). The stator construction that corresponds to this continuous rotor construction may need to use discrete coils, but magnetic flux pattern generated from the stator can be produced to couple with the continues rotor structure.

A rotor may include one or more embedded permanent magnets and one or more geometries of variable reluctance, such that, when stator flux couples with such a rotor, the stator flux may couple with the permanent magnet(s) (rotor flux) to generate magnetic torque on the rotor and the stator flux may also couple with the geometry(ies) of variable reluctance to generate reluctance torque. Therefore, a motor with a configuration of embedded permanent magnets may generate torques with a combination of both magnetic torque and reluctance torque. For example, a uniformly V-shape interior permanent magnet (e.g., as shown in FIG. 12) may be configured to have a magnetic torque to reluctance torque ratio of 1.5:1.0 or 2.0:1.0 or even greater than 2.0:1.0. Whereas a motor with a rotor of only geometry of variable reluctance may only generate reluctance torque. A synchronous reluctance motor ("SynRM") with PM assist (e.g., a PM assisted SynRM that may include rotor 1464 of FIG. 14 or rotor 1564 of FIG. 15) may have a weak embedded magnet, such as with a magnetic torque to reluctance torque ratio of less than 1.0:1.0. Other motor types may also be provided with no such geometry of variable reluctance present (e.g., surface permanent magnet motors, induction motors, etc.). A reluctance motor may be provided by configuring a rotor of the motor to include one or more embedded permanent magnets (e.g., the rotor may include a soft magnetic material (e.g., laminated silicon steel) with one or more projections acting as salient magnetic poles through magnetic reluctance). When a stator pole is equidistant from two adjacent rotor poles, the rotor pole may be referred to as being in a fully unaligned position, which may be a position of maximum magnetic reluctance for the rotor pole. In an aligned position, two or more rotor poles may be fully aligned with two or more stator poles and may be a position of minimum reluctance. When a stator pole is energized, rotor torque may be in a direction that may reduce reluctance, whereby a nearest rotor pole may be pulled from an unaligned position into alignment with the stator field (e.g., a position of less reluctance). To sustain rotation, the stator field may rotate in advance of the rotor poles, which may continuously pull the rotor along the path. A switched reluctance motor may include less rotor poles than stator poles, which may minimize torque ripple and/or prevent the poles from all aligning simultaneously (e.g., position that cannot generate torque). A synchronous reluctance motor may have an equal number of stator and rotor poles, where the projections on the rotor may be arranged to introduce internal flux barriers (e.g., holes that may direct the magnetic flux along a direct axis). Thus, stator flux that couples with rotor poles that only have geometry of variable reluctance may generate reluctance torque, and stator flux that couples with rotor poles that have permanent magnet(s) may generate magnet torque, such that stator flux that couples with a rotor that has permanent magnet(s) but also geometry of variable reluctance may generate reluctance torque due to the variable reluctance.

Figure 16:
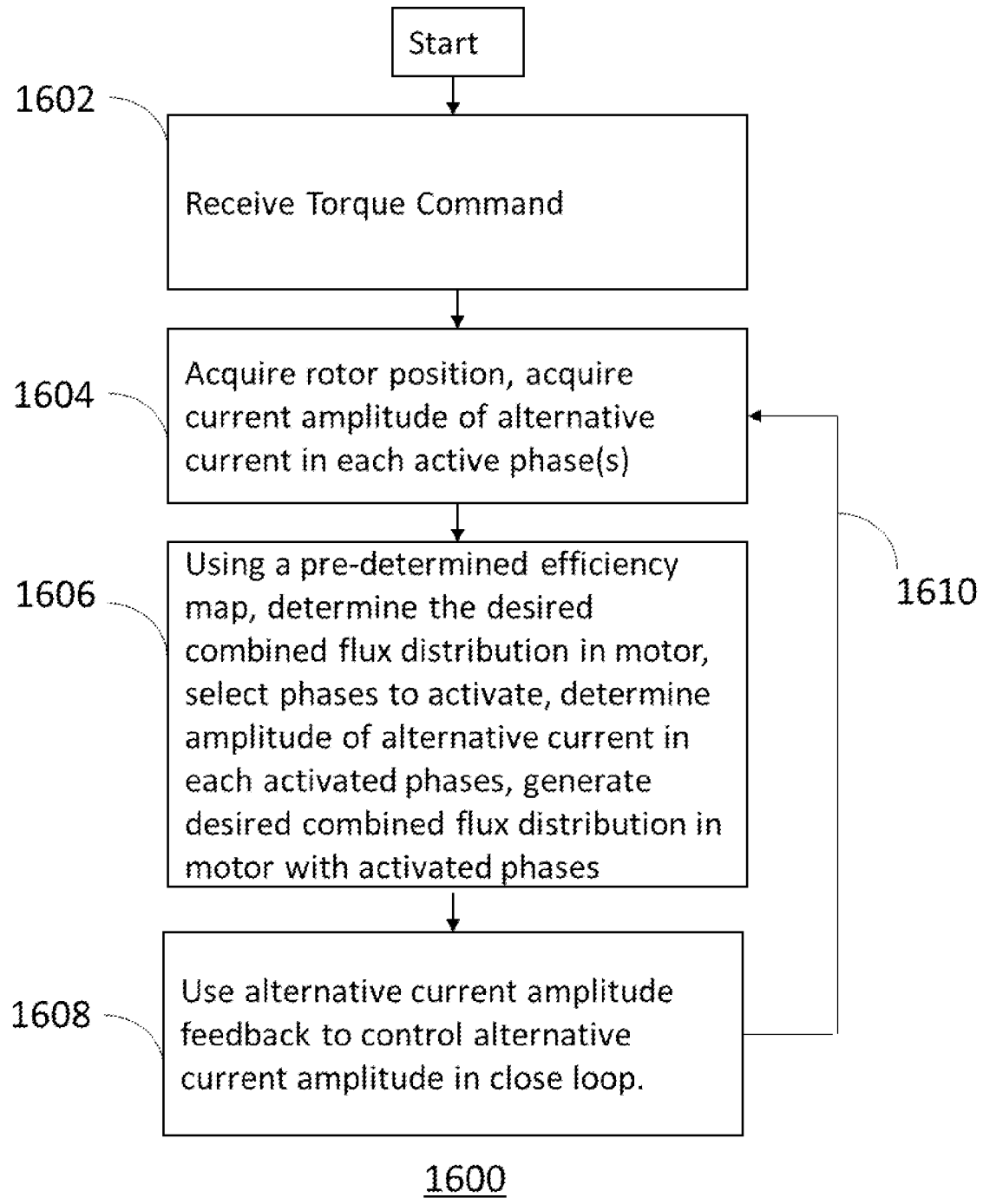
FIG. 16 is a flowchart of an illustrative process for controlling a motor, according to some embodiments.
Figure 17:
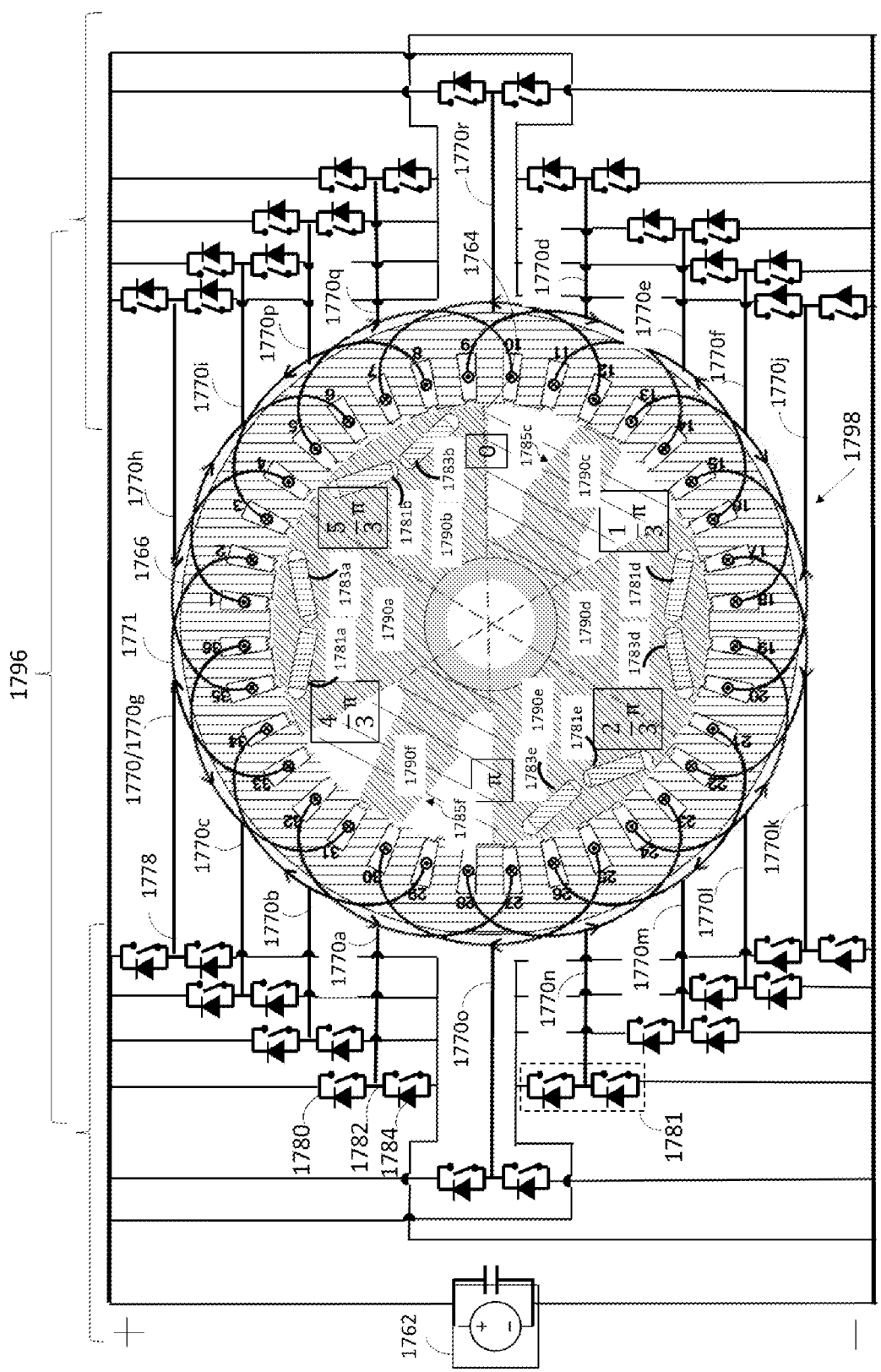
FIG. 17 is a schematic of another system with a motor in cross section in a first stage, according to some embodiments.

FIG. 16 is a flowchart of an illustrative process 1600 for driving a motor of a system. At operation 1602 of process 1600, a torque command may be received and registered into a controller of the system (e.g., a command of signal 391 may be received and registered by controller 394 of system 399 of FIG. 3). At operation 1604 of process 1600, a current rotor position and/or a current AC amplitude may be acquired by the controller of the system (e.g., via signal(s) 395 and/or signal(s) 392 of system 399). For example, the controller may be operative to acquire the current rotor position (e.g., using a resolver or similar component that may be mechanically coupled or fixed onto a rotor, or a hall sensor or similar component (e.g., position encoder) that may be mechanically coupled or fixed onto a stator, or a combination of both). It may also be possible to acquire rotor position from the back-emf from the rotor. If the current rotor position has been registered in the controller in parallel to receiving a torque command, the controller can reference the registered value. The controller may be configured to acquire the current AC amplitude of each phase of the motor (e.g., using current sensors that may be coupled or fixed onto the inverter (e.g., via signal(s) 392 of system 399 of FIG. 3)). At operation 1606 of process 1600, a predetermined efficiency map may be referenced by the controller (e.g., with a current rotor position, current AC amplitude of each phase, etc. of operation 1604 and/or with the received torque command of operation 1602) and the controller may determine the desired combined flux distribution in the motor. The controller may also be configured to select phases to activate, operate the half bridges by sending on and off signals to switching devices, and/or generate the determined desired combined flux distribution in the motor with such activated phases. A goal may be to find the most efficient combination to produce the desired torque. The system may choose priority other than efficiency when making the selection if required function is satisfied. Targets other than efficiency may include, but are not limited to, harmonic distortion, torque ripple, and/or the like. A control strategy may be configured to minimize the harmonic distortion or torque ripple, even if that does not operate the motor at the most efficient parameter. For example, if a certain torque demand is given, the most efficient way of operating the machine may be activating 6 out of 18 phases (e.g., as shown in FIG. 17), but the system may be configured instead to activate 12 out of 18 phases so as to minimize torque ripple. At operation 1608 of process 1600, if the rotor is rotating, the system may activate and deactivate coils and corresponding half bridges to maintain a rotating combined flux distribution in the motor, and the rotation of combined flux distribution may be synchronous with the rotation of the rotor. The system can be configured to maintain the selection of rotor poles and the PWM parameters of activated half bridges until a new torque command is provided. At operation 1610, once a new torque command has been received, process 1600 may return to operation 1604 (e.g., from operation 1608). For example, the controller may acquire a new rotor position (e.g., at operation 1604) and determine the desired combined stator flux distribution (e.g., at operation 1606). The controller may determine an efficient (e.g., the optimum efficient) manner of producing torque is to activate certain stator phases and corresponding inverter half bridges.

It is understood that the operations shown in process 1600 of FIG. 16 are only illustrative and that existing operations may be modified or omitted, additional operations may be added, and the order of certain operations may be altered.

Figure 18:
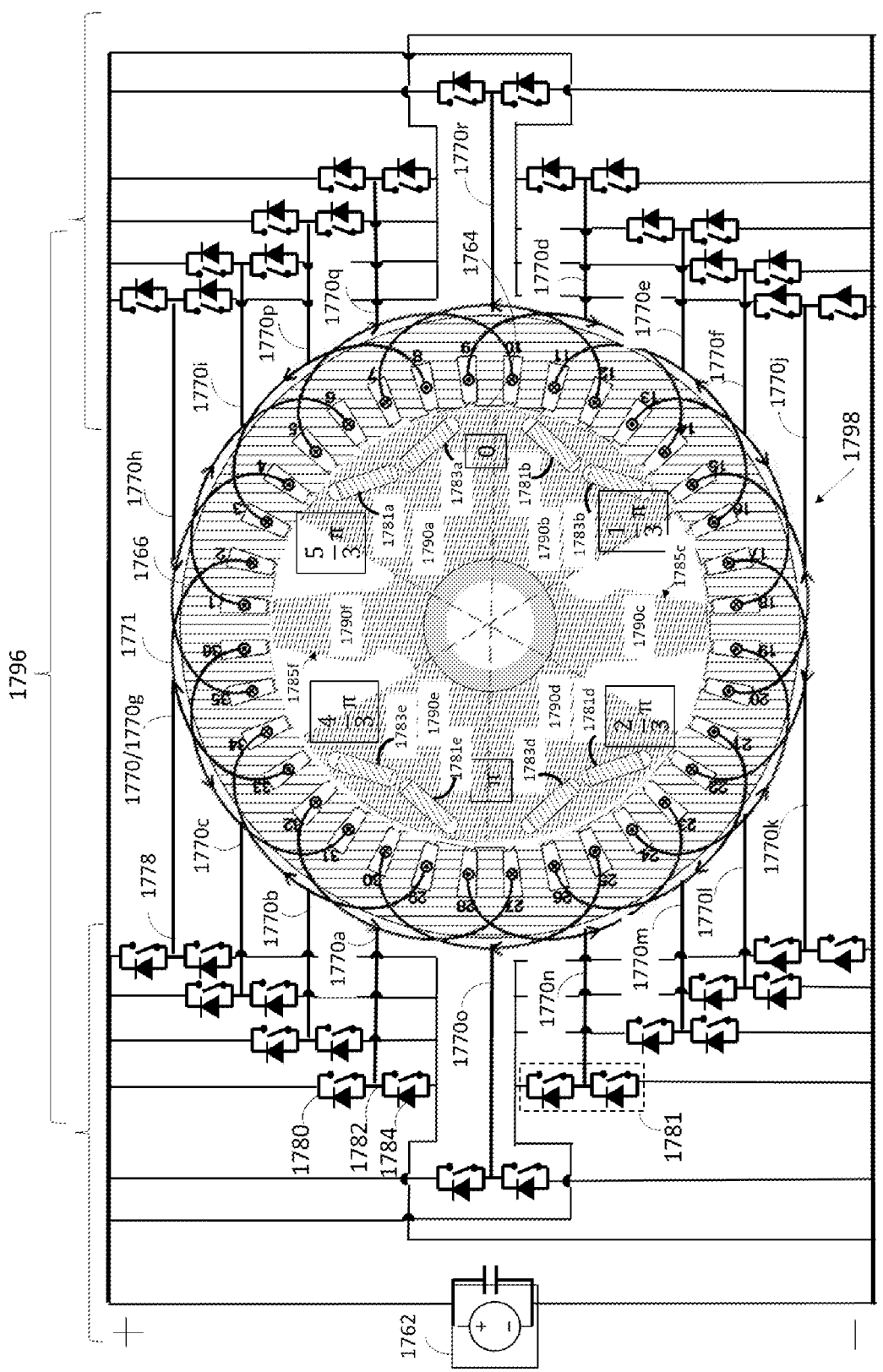
FIG. 18 is a schematic of the system of FIG. 17 in a second stage, according to some embodiments.

FIGS. 17 and 18 illustrate a schematic of a system 1799 that may include a power source 1762, an inverter 1796, and a motor 1798 that may include a rotor 1764 and a stator 1766 (the stator and rotor are shown in section view for clarity). As shown, in some embodiments, rotor 1764 may be a six-pole rotor with 6 rotor poles 1790*a*-1790*f*, although any other suitable number of poles may be provided by a rotor of this disclosure. As shown, in some embodiments, stator 1766 may include 36 stator slots 1701-1736, 18 stator coils 1771, and 18 stator phases 1770 (i.e., stator phases 1770*a*-1770*r*), which may be electrically coupled to 18 inverter phases 1778, respectively, although any other suitable number of stator slots, stator coils, stator phases, and/or inverter phases may be provided by or for a stator of this disclosure (it is to be noted that the stator slots referred to herein as stator slots 1701-1736 are shown by FIG. 17 as stator slots 1-36 for clarity sake).

As shown in FIGS. 17 and 18, inverter 1796 may include any suitable number of inverter components or half bridges 1781 (e.g., 18 as shown, or any other suitable number), where each half bridge 1781 may include a high power switch or switching device 1780 (e.g., at the top) and a low power switch or switching device 1784 (e.g., at the bottom), where switching device 1780 may be electrically coupled to a high side of any suitable power source 1762 (e.g., a battery), and where switching device 1784 may be electrically coupled to a low side of power source 1762. A midpoint 1782 of a connection between switching devices 1780 and 1784 of a half bridge 1781 may be operative to output or otherwise provide a respective inverter phase 1778 and electrically couple to a respective stator phase 1770. Each stator phase 1770 may be electrically coupled to a respective stator coil 1771. Any suitable inverter component(s) may be utilized to provide an inverter, including, but not limited to, a half bridge, H-bridge, various switches, and/or the like. As shown, a diode may be provided in parallel with a switching device (e.g., for reactive power/generating action), although such a component may not be provided in some embodiments. While two terminals of a switching device may be coupled to a midpoint and one of a low or high side of a power source, each switch may be controlled to be open or closed selectively using any suitable control signal(s) from any suitable source (e.g., control signal(s) 393 from controller 394 of FIG. 3 or any other suitable controller).

As shown in FIGS. 17 and 18, each stator coil 1771 may be represented by a curved line that may be surrounding stator 1766. Each stator coil 1771 may occupy two or more stator slots (e.g., labelled stator coil 1771 of FIG. 17 may occupy stator slots 1733 and 1702, etc.), with the curved line entering or exiting the plane of the illustrated section along the slots of the stator. Stator 1766 may include any suitable number of stator slots (e.g., 36 slots 1701-1736) and any suitable number of stator coils 1771 (e.g., 18 stator coils 1771), where each stator coil 1771 may be coupled to one stator phase 1770. Different stator coils of stator 1770 may be coupled together to form connection(s), such as a star/Wye connection or a delta connection or any other suitable connection, to complete the circuit. Although the number of stator coils in a system may be a multiple of three (e.g., as shown by FIG. 17), the number of stator coils in a system can be any number, such as five (e.g., in a five phase motor).

Switching devices 1780 and 1784 of a half bridge 1781 of inverter 1796 may be operative to switch on and off to generate and output AC from an inverter phase 1778 to a stator phase 1770, whereby the AC may enter a stator coil 1771 through that inverter phase 1778 and may generate a magnetic field. Six-pole rotor 1764 may be electromagnetically coupled to the magnetic field generated by all of the stator coils (e.g., all 18 stator coils 1771). As shown, the geometry of six-phase rotor 1764 may be arranged in poles 1790*a*-1790*f* that may include another non-uniform physical construction and layout. For example, as shown in FIGS. 17 and 18, rotor pole 1790*a* may include embedded magnets 1781*a* and 1783*a* (e.g., arranged in a V shape). Similar to rotor pole 1790*a*, rotor poles 1790*b*, 1790*d*, and 1790*e* may each include embedded magnets (e.g., magnets 1781*b* and 1783*b*, magnets 1781*d* and 1783*d*, and magnets 1781*e* and 1783*e*, respectively). However, highlighted rotor poles 1790*c* and 1790*f* may not have embedded permanent magnets. Instead, rotor poles 1790*c* and 1790*f* may each have a switch reluctance geometry (e.g., geometry 1785*c* and geometry 1785*f*, respectively) that may be designed to allow electromagnetic coupling between stator and rotor to generate reluctance torque. Together, FIGS. 17 and 18 may demonstrate a physical representation of operation 1608 of process 1600 of FIG. 16, whereby system 1799 including a six-pole rotor 1764 (e.g., with two opposing highlighted poles 1790*f* and 1790*c*) rotating clockwise (e.g., by 60 degrees (1/3*$\pi$) between the stage of FIG. 17 and the stage of FIG. 18).

When a torque command is received (e.g., when the system is at the stage of FIG. 17), the system may be configured to make the calculation(s) described as operations 1604 and 1606 of process 1600 of FIG. 16, where a system controller may determine the optimum efficient of producing torque may be to activate stator phases 1770*a*, 1770*b*, 1770*c*, 1770*d*, 1770*e*, and 1770*f*, and corresponding inverter half bridges acting at opposing highlighted poles 1790*f* and 1790*c*. Stator coils and half bridges not activated may not supply flux and no torque may be produced at the rotor poles.

FIG. 17A illustrates a graph 1799*a* on a polar axis of magnetic flux distribution 1799*m* of rotor 1764 of system 1799 in the stage of FIG. 17, while FIG. 17B illustrates a graph 1799*b* on a polar axis of combined stator flux distribution 1799*s* from activated stator phases of system 1799 in the stage of FIG. 17. As shown, combined stator flux distribution 1799*s* may include at least two components, such as components 180 degrees apart. On the rotor axis, it may be shown by FIG. 17A that highlighted rotor poles 1790*f* and 1790*c* of FIG. 17 locate at mechanical angle 0-60 degrees (0-1/3*$\pi$) and 180-240 degrees ($\pi$-4/3*$\pi$) with a flat line highlighting the rotor magnet flux distribution. On the stator axis of FIG. 17B, a corresponding stator magnetic flux may be located in the same region with an offset. It is typical but not required for stator magnetic flux acting on the poles to have an offset, or advance angle comparing to rotor mechanical angle.

Figure 18A:
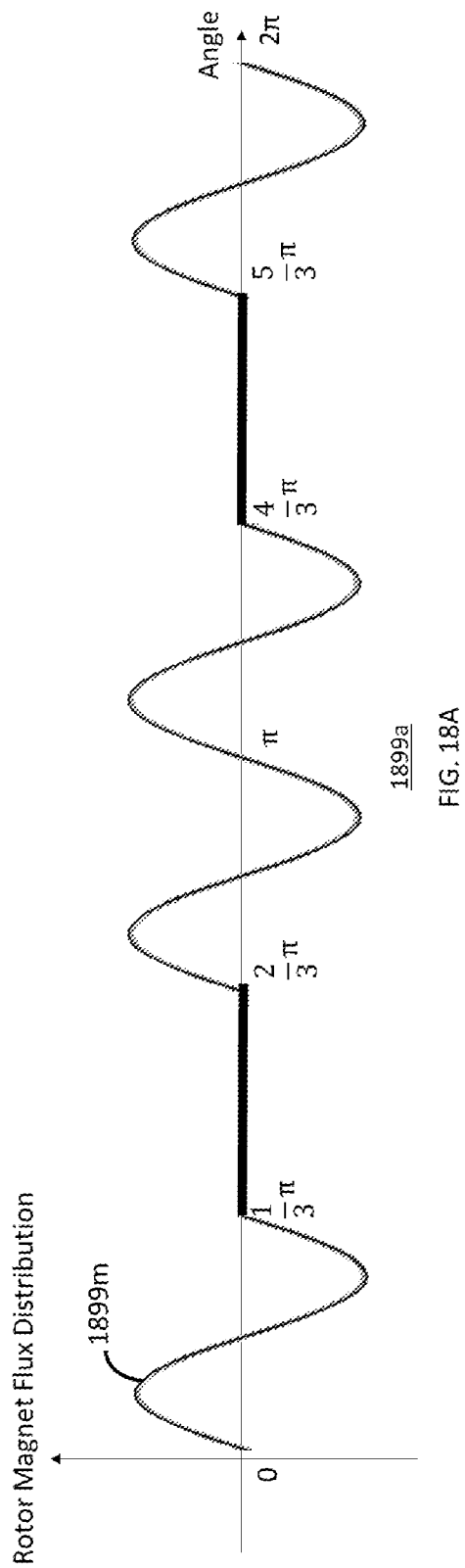
FIG. 18A is a graph of magnetic flux distribution of a rotor of the motor of FIGS. 17 and 18 in the second stage of FIG. 18, according to some embodiments.

As shown in FIG. 18, rotor 1764 of system 1799 has rotated 60 degrees (1/3$\pi$) clockwise from the previous stage of FIG. 17. FIG. 18A illustrates a graph 1899*a* on a polar axis of magnetic flux distribution 1899*m* of rotor 1764 of system 1799 in the stage of FIG. 18, while FIG. 18B illustrates a graph 1899*b* on a polar axis of combined stator flux distribution 1899*s* from activated stator phases of system 1799 in the stage of FIG. 18. As shown by FIGS. 18-18B, on the rotor axis, highlighted rotor poles 1790*f* and 1790*c* may now be located in mechanical angle 60-120 degrees (1/3*$\pi$-1/2*$\pi$) and 240-300 degrees (4/3*$\pi$-5/3*$\pi$). As with operation 1610 of process 1600, the controller of system 1799 may acquire a new rotor position (e.g., at an iteration of operation 1604) and may determine a desired combined stator flux distribution (e.g., at an iteration of operation 1606). A system controller may determine the optimum efficient of producing torque may be to activate the stator phases 1770*g*, 1770*h*, 1770*i*, 1770*j*, 1770*k*, and 17701, and corresponding inverter half bridges acting at highlighted rotor poles 1790*f* and 1790*c*. Stator coils and half bridges that are not activated may not supply flux and no torque may be produced at the rotor poles. The combined stator magnetic flux distribution may now be advanced sixty degrees (e.g., from distribution 1799*s* to distribution 1899*s*) to continue acting on the rotor and produce the desired torque at optimum efficiency.

Stator coils and connected half bridges may continue to activate and deactivate in alternative manner, forming rotating magnetic flux in synchronize with rotor poles, and producing continuous desired torque at rotor poles until a new torque command has been provided.

Figure 19:
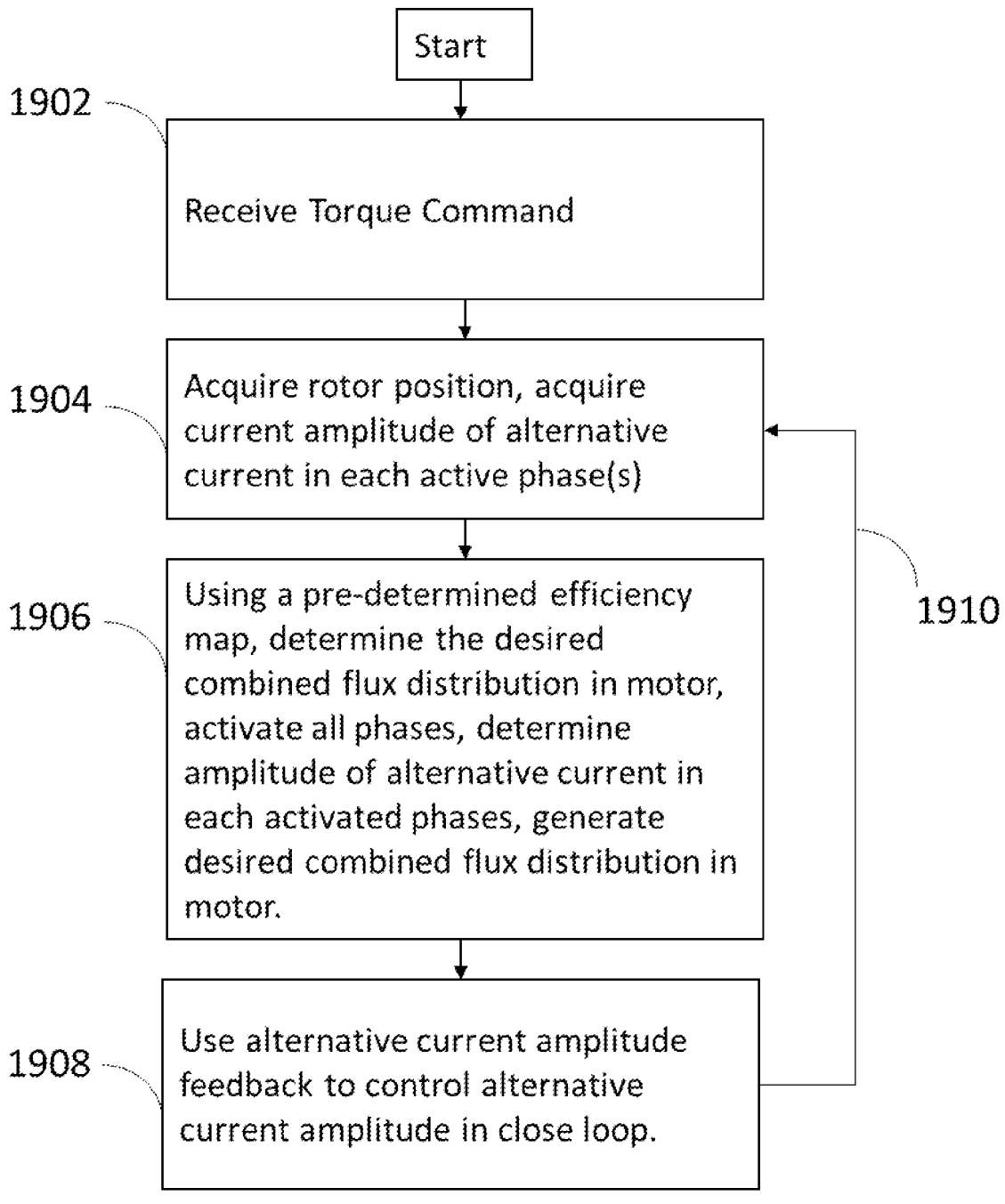
FIG. 19 is a flowchart of another illustrative process for controlling a motor, according to some embodiments.

FIG. 19 is a flowchart of another illustrative process 1900 for driving a motor of a system. At operation 1902 of process 1900, a torque command may be received and registered into a controller of the system (e.g., a command of signal 391 may be received and registered by controller 394 of system 399 of FIG. 3). At operation 1904 of process 1900, a current rotor position and/or a current AC amplitude may be acquired by the controller of the system (e.g., via signal(s) 395 and/or signal(s) 392 of system 399). For example, the controller may be operative to acquire the current rotor position (e.g., using a resolver or similar component that may be mechanically coupled or fixed onto a rotor, or a hall sensor or similar component that may be mechanically coupled or fixed onto a stator, or a combination of both). It may also be possible to acquire rotor position from the back-emf from the rotor. If the current rotor position has been registered in the controller in parallel to receiving a torque command, the controller can reference the registered value. The controller may be configured to acquire the current AC amplitude of each phase (e.g., using current sensors that may be coupled or fixed onto the inverter (e.g., via signal(s) 392 of system 399 of FIG. 3)). At operation 1906 of process 1900, a pre-determined efficiency map may be referenced by the controller (e.g., with a current rotor position, current AC amplitude of each phase, etc. of operation 1904) and the controller may determine the desired combined flux distribution in the motor. The controller may also be configured to select all phases to activate, operate the half bridges by sending on and off signals to switching devices, and/or generate desired combined flux distribution in the motor with all phases. The desired combined flux distribution can be non-repeating and/or non-uniform along the plurality of motor poles. A goal may be to find the most efficient combination to produce the desired torque. The system may choose priority other than efficiency when making the selection, if required function is satisfied (e.g., when all phases are activated, the system may no longer make a selection of which phases to activate, but the system may still be operative to make a selection of how to operate all the phases to generate combined flux distribution (e.g., assuming the flux distribution in FIG. 20 allows the optimum efficiency, the controller may change this distribution to another shape (e.g., providing better harmonic ripple or torque ripple (e.g., while not operating at optimum efficient point)))). At operation 1908 of process 1900, if the rotor is rotating, the system may activate and deactivate coils and corresponding half bridges to maintain a rotating combined flux distribution in the motor, and the rotation of combined flux distribution may be synchronous with the rotation of the rotor. The system can be configured to maintain the selection of rotor poles and the PWM parameters of activated half bridges until a new torque command is provided. At operation 1910, process 1900 may return to operation 1904 from operation 1908. For example, the controller may acquire new rotor position (e.g., at operation 1904) and determine the desired combined stator flux distribution (e.g., at operation 1906). The controller may determine an efficient (e.g., the optimum efficient) manner of producing torque is to activate certain stator phases and corresponding inverter half bridges.

It is understood that the operations shown in process 1900 of FIG. 19 are only illustrative and that existing operations may be modified or omitted, additional operations may be added, and the order of certain operations may be altered.

Figure 20:
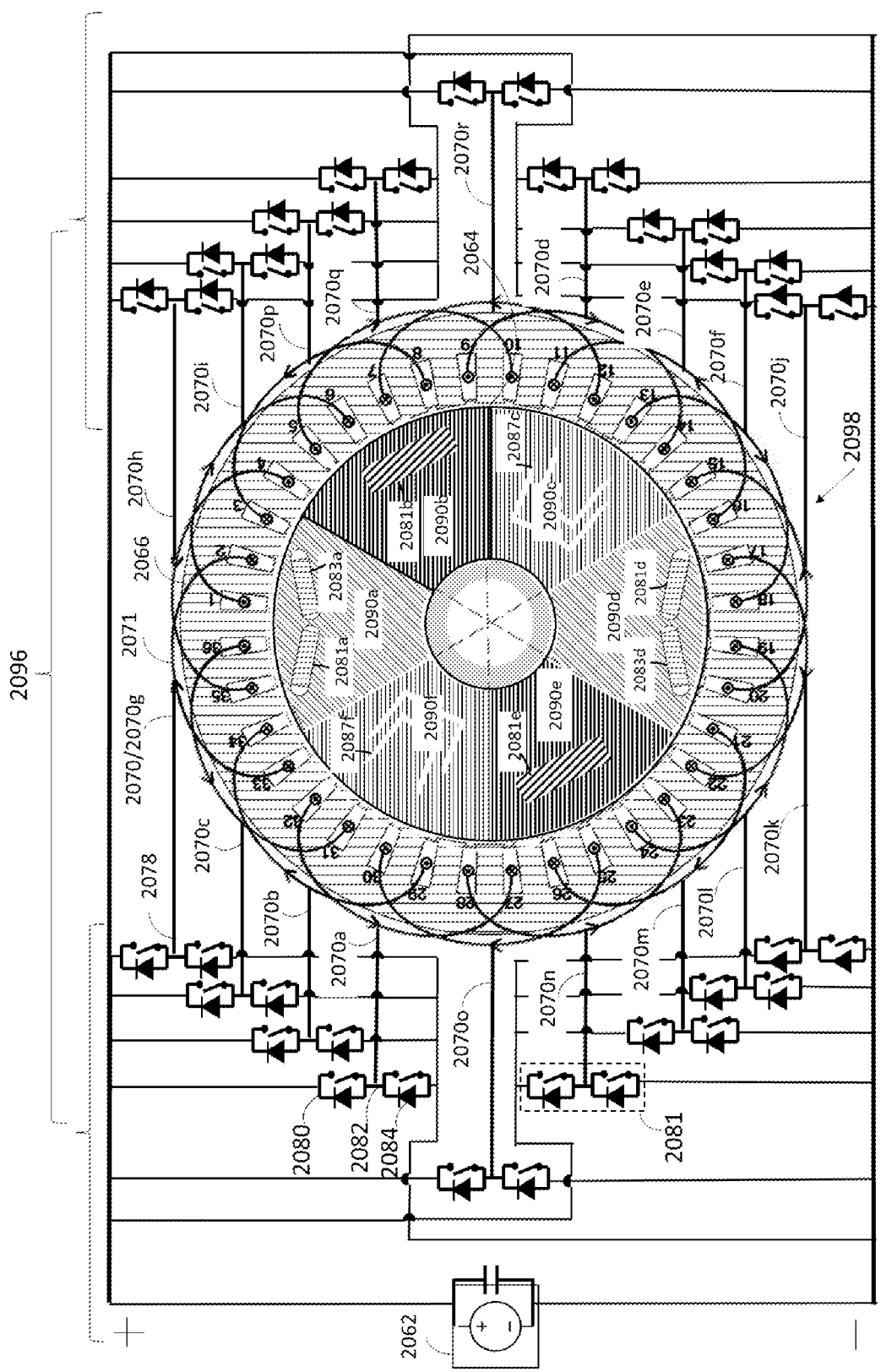
FIG. 20 is a schematic of another system with a motor in cross section, according to some embodiments.

FIG. 20 illustrates a schematic of a system 2099 that may include a power source 2062, an inverter 2096, and a motor 2098 that may include a rotor 2064 and a stator 2066 (the stator and rotor are shown in section view for clarity). As shown, in some embodiments, rotor 2064 may be a six-pole rotor with 6 rotor poles 2090a-2090f, although any other suitable number of poles may be provided by a rotor of this disclosure. As shown, in some embodiments, stator 2066 may include 36 stator slots 2001-2036, 18 stator coils 2071, and 18 stator phases 2070 (i.e., stator phases 2070a-2070r), which may be electrically coupled to 18 inverter phases 2078, respectively, although any other suitable number of stator slots, stator coils, stator phases, and/or inverter phases may be provided by or for a stator of this disclosure (it is to be noted that the stator slots referred to herein as stator slots 2001-2036 are shown by FIG. 20 as stator slots 1-36 for clarity sake).

As shown in FIG. 20, inverter 2096 may include any suitable number of inverter components or half bridges 2081 (e.g., 18 as shown, or any other suitable number), where each half bridge 2081 may include a high power switch or switching device 2080 (e.g., at the top) and a low power switch or switching device 2084 (e.g., at the bottom), where switching device 2080 may be electrically coupled to a high side of any suitable power source 2062 (e.g., a battery), and where switching device 2084 may be electrically coupled to a low side of power source 2062. A midpoint 2082 of a connection between switching devices 2080 and 2084 of a half bridge 2081 may be operative to output or otherwise provide a respective inverter phase 2078 and electrically couple to a respective stator phase 2070. Each stator phase 2070 may be electrically coupled to a respective stator coil 2071. Any suitable inverter component(s) may be utilized to provide an inverter, including, but not limited to, a half bridge, H-bridge, various switches, and/or the like. As shown, a diode may be provided in parallel with a switching device (e.g., for reactive power/generating action), although such a component may not be provided in some embodiments. While two terminals of a switching device may be coupled to a midpoint and one of a low or high side of a power source, each switch may be controlled to be open or closed selectively using any suitable control signal(s) from any suitable source (e.g., control signal(s) 393 from controller 394 of FIG. 3 or any other suitable controller).

As shown in FIG. 20, each stator coil 2071 may be represented by a curved line that may be surrounding stator 2066. Each stator coil 2071 may occupy two or more stator slots (e.g., labelled stator coil 2071 of FIG. 20 may occupy stator slots 2033 and 2002, etc.), with the curved line entering or exiting the plane of the illustrated section along the slots of the stator. Stator 2066 may include any suitable number of stator slots (e.g., 36 slots 2001-2036) and any suitable number of stator coils 2071 (e.g., 18 stator coils 2071), where each stator coil 2071 may be coupled to one stator phase 2070 (e.g., one of stator phases 207a-2070r). Different stator coils of stator 2070 may be coupled together to form connection(s), such as a star/Wye connection or a delta connection or any other suitable connection, to complete the circuit. Although the number of stator coils in a system may be a multiple of three (e.g., as shown by FIG. 20), the number of stator coils in a system can be any number, such as five (e.g., in a five phase motor). As shown, the geometry of six-phase rotor 2064 may be arranged in poles 2090a-2090f that may include another non-uniform physical construction and layout. For example, as shown in FIG. 20, rotor pole 2090a may include embedded magnets 2081a and 2083a (e.g., arranged in a V shape). Similar to rotor pole 2090a, rotor pole 2090d may include embedded magnets 2081d and 2083d, while rotor poles 2090b and 2090e may only have one embedded magnet (e.g., magnet 2081b and magnet 2081e, respectively). However, rotor poles 2090c and 2090f may not have embedded permanent magnets. Instead, rotor poles 2090c and 2090f may each have a synchronized reluctance geometry (e.g., geometry 2087c and geometry 2087f, respectively) that may be designed to allow electromagnetic coupling between stator and rotor to generate reluctance torque.

FIG. 20 may demonstrate a portion of a physical representation of operation 1908 of process 1900 of FIG. 19. When a torque command is received (e.g., when the system is at the stage of FIG. 20), system 2099 may be configured to make the calculation(s) described as operations 1904 and 1906 of process 1900 of FIG. 19, where a system controller may determine the optimum efficient of producing torque may be to activate all eighteen stator phases 2070a-2070r, and all corresponding inverter half bridges acting at all six poles 2090a-2090f.

FIG. 20A illustrates a graph 2099a on a polar axis of magnetic flux distribution 2099m of rotor 2064 of system 2099 in the stage of FIG. 20, while FIG. 20B illustrates a graph 2099b on a polar axis of combined stator flux distribution 2099s from all stator phases of system 2099 in the stage of FIG. 20. It is typical but not required for stator magnetic flux acting on the poles to have an offset, or advance angle comparing to rotor mechanical angle. Stator coils and connected half bridges may continue to form rotating magnetic flux in synchronize with rotor poles, producing continuous desired torque at rotor poles until a new torque command has been provided.

Motor control of process 1600 and/or process 1900 and/or any other suitable process may, in some embodiments, use any suitable field oriented control ("FOC") methodology to determine the AC amplitude of phase current at a given time. The phase current, anchor at stator or stationary, may not rotate, but may transform via mathematical calculation carried out in the controller, and may then be divided into Iq (e.g., current in quadrature axis Q that may be running perpendicular to the pole axis of the rotor) and Id (e.g., current in direct axis D that may be running parallel to the pole axis of the rotor). A general goal of selecting Iq and Id may be to minimize loss, or increase efficiency. Once a desired Id and Iq are determined, it may be transformed to desired phase current. In some embodiments, not all phases may be configured or instructed to generate output/carry an amplitude of alternative current. As mentioned, a motor may not be able to know or determine its own efficiency during operation, but this is not entirely impossible as a feedback loop at both input of the inverter and output of the motor may be operative to measure the efficiency. An efficiency map may be determined during the design phase of a motor, and validated after prototype construction. The optimum efficiency of a motor may utilize some tuning to be achieved, but the map may be generally well defined before mass production of the motor. The controller may or may not store an efficiency map. Instead, in some embodiments, a programmer or otherwise creating a control algorithm may tune a set of parameters to achieve an optimum efficiency with a given motor/inverter structure (e.g., for Id, Iq, the controller may hard code a matrix of Iq, Id, then reference the Iq, Id output during actual operation). A full calculation may involve a controller using a rotor position, torque demand, and possibly rotor speed. In some embodiments, rotor speed may be used by the controller, however, the controller may not need to receive a speed signal from the motor but instead the controller may calculate speed from other signals. While a control algorithm of any suitable type may be complex, an end goal may be to achieve optimum efficiency.

Figure 23:
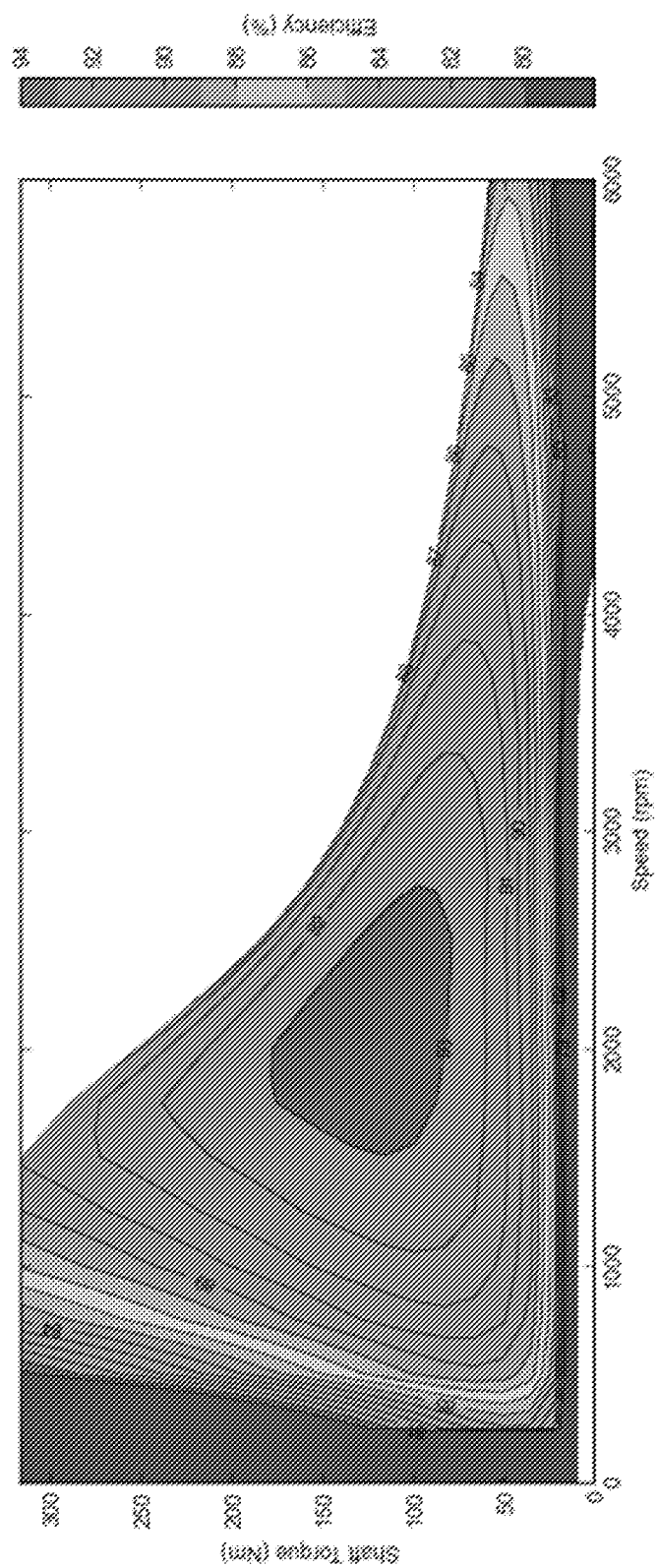
FIG. 23 is an exemplary efficiency map.

In some embodiments, a controller may not store an efficiency map, but, instead, may store an Id, Iq look up table (e.g., as another example of potential controller data (e.g., data 394d)), and the controller may reference such a look up table (e.g., at operation 1606 and/or operation 1906) to operate the motor. An Id, Iq look up table may be generated to reach an optimum efficiency map. For example, an array of efficiency maps for individual rotor poles or pairs or groups may be provided, then another look up table of coefficients may be generated based on such a map array, and then all of these tables may be used to generate an optimum efficiency map. A controller may use feedback of amplitude of phase current and feedback of motor position/ speed to carry out motor control. For an asynchronous machine system, speed may be used. For a synchronous machine system, rotor position may be more often used. A controller may not store an efficiency map, but may instead store a look up table of Id, Iq. The Id, Iq value may be optimized based on the system's efficiency map. For example, when a motor is being designed, a designer may estimate/guess the Id, Iq look up table, which in a first trial run may generate an efficiency map. After some tuning, the Id, Iq may be settled, which may give the best efficiency, and a final efficiency map may be generated. Map 2300 of FIG. 23 may be an example of an efficiency map, which may plot efficiency (e.g., efficiency percentage) by rotation speed (e.g., revolutions/minute) and torque (e.g., peak and continuous torque in Nm) (e.g., as a two dimension map). During motor operation, the phase current may be converted into Id, Iq and fed into the controller (e.g., as feedback signal 392). The controller may control the switching device(s) of the inverter so that the Id, Iq may match the look up table. For a typical 3 phase motor, there may only be one look up table of Id, Iq. Such a look up table may include two axes, such as motor torque and motor speed, as shown by FIG. 23. The controller may use such data to find the Iq, Id value based on current rotor speed and torque command. The current rotor speed can be measured or calculated. To calculate current rotor speed, the controller may use back-EMF or use rotor position at different time stamps. An Id calibration table, such as table 2400 of FIG. 24, and/or an Iq calibration table, such as table 2500 of FIG. 25, may also be obtained and used to generate a calibrated look up table of Id, Iq for a particular motor using any suitable calibration techniques.

Figure 27:
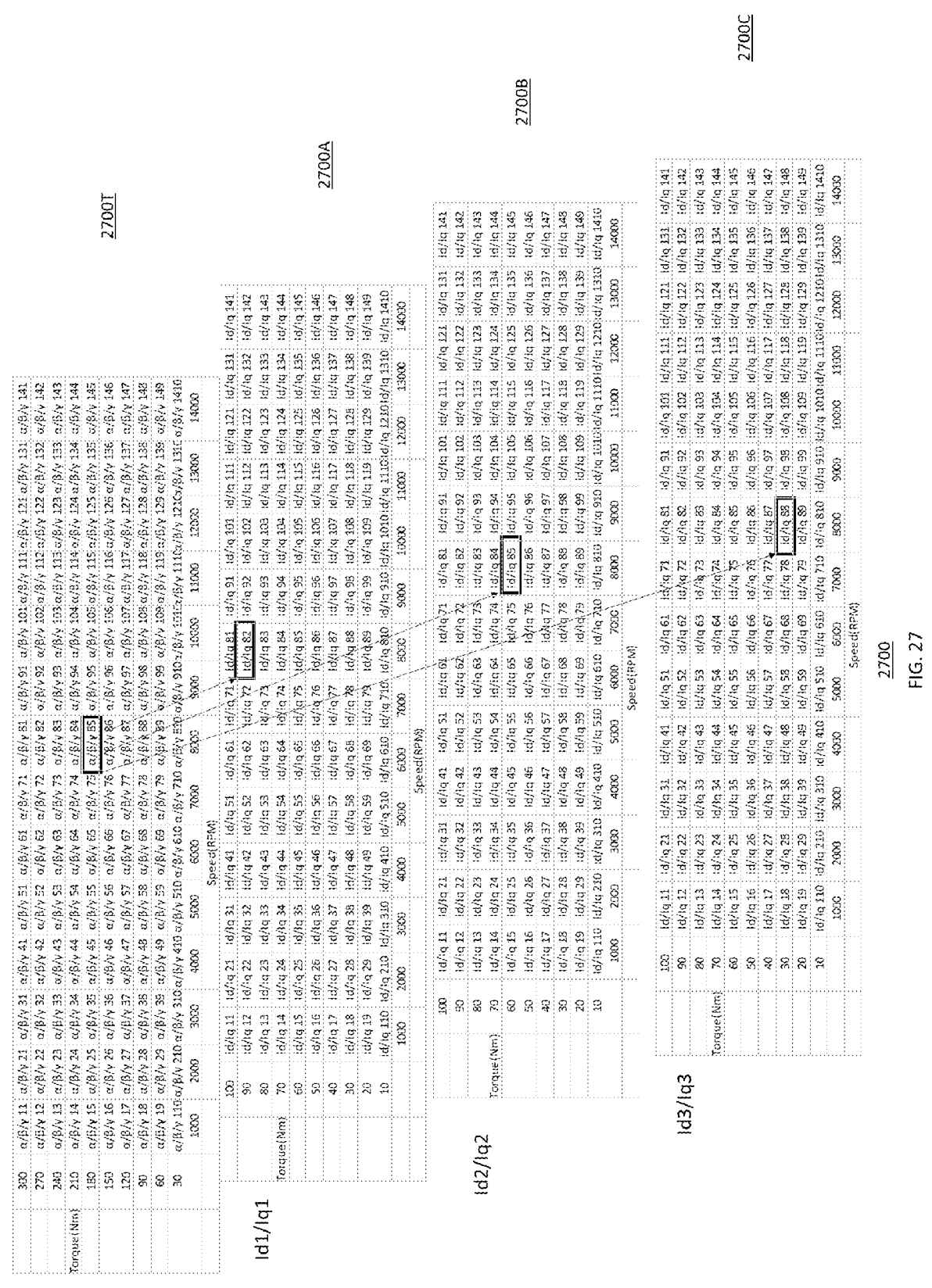

With respect to motor 2098 of FIG. 20, when designing the motor, the designer may estimate one look up table for the situation when 6 out of the 18 phases will be activated and generate a stator flux for ONLY acting on a first rotor portion (e.g., phases 2070g-2070i and phases 2070j-2070l (e.g., at the orientation of FIG. 20) with respect to a first rotor pole portion of poles 2090a and 2090d (although it is to be understood that the activated phases will change as the rotor rotates (see, e.g., FIG. 18 compared to FIG. 17)), and generate a first rotor portion Id1 and Iq1 look up table (e.g., first rotor portion look up table 2700A of FIG. 27). For example, during a first stage of motor tuning, Id1 and Iq1 may settle to provide optimum efficiency, whereby an efficiency map 2600 of FIG. 26 may also be determined. Similarly, a second rotor portion Id2 and Iq2 look up table (e.g., second rotor portion look up table 2700B of FIG. 27) may be generated for the situation when 6 out of the 18 phases will be activated and generate a stator flux for ONLY acting on another second rotor portion (e.g., phases 2070p-2070r and phases 2070m-2070o (e.g., at the orientation of FIG. 20) with respect to a second rotor pole portion of poles 2090b and 2090e). Similarly, a third rotor portion Id3 and Iq3 look up table (e.g., third rotor portion look up table 2700C of FIG. 27) may be generated for the situation when 6 out of the 18 phases will be activated and generate a stator flux for ONLY acting on another distinct third rotor portion (e.g., phases 2070d-2070f and phases 2070a-2070c (e.g., at the orientation of FIG. 20) with respect to a third rotor pole portion of poles 2090c and 2090f). Therefore, a total of three Id and Iq look up tables may be generated (e.g., respective tables 2700A, 2700B, and 2700C of collection 2700 of FIG. 27), one for each of the distinct rotor portions (e.g., each of the three pairs of rotor poles of system 2099, each with a matching and opposing geometry (e.g., matching sets of V-shaped magnets, matching single magnets, and matching synchronized reluctance geometries)). Although it is to understood that any suitable number of distinct rotor portions of a non-uniform rotor may be identified such that a same number of Id, Iq look up tables may be generated (e.g., eight distinct rotor portions may be identified for rotor 2164 of FIG. 21 (e.g., a first rotor portion for the portion of the rotor including magnets 2181a and 2183a, a second rotor portion for the portion of the rotor including magnet 2181b, a third rotor portion for the portion of the rotor including reluctance geometry 2187c, a fourth rotor portion for the portion of the rotor including magnets 2181d and 2183d, a fifth rotor portion for the portion of the rotor including reluctance geometry 2187e, a sixth rotor portion for the portion of the rotor including reluctance geometry 2187f, a seventh rotor portion for the portion of the rotor including magnet 2181g, and an eighth rotor portion for the portion of the rotor including reluctance geometry 2187h) such that eight Id, Iq look up tables may be generated (e.g., a respective one for when a subset of stator phases will be activated and generate a stator flux for ONLY acting on a respective one of the rotor portions)). Continuing with the example of FIG. 20, the motor may also have three efficiency maps now (e.g., map 2600 and two additional efficiency maps). For example, the value of each cell in a rotor portion look up table may include an Id value and an Iq value that may be indicative of the Id and Iq to be applied to achieve the amount of torque associated with that cell when the motor's speed is the speed associated with that cell in order to achieve optimization with respect to a particular motor characteristic (e.g., efficiency, torque, power, cogging torque, harmonic distortion, torque ripple, etc.). The process of determining a particular set of Id and Iq to define a particular cell for a particular torque and a particular speed for a particular optimized characteristic for a particular rotor portion's look up table may include adjusting the Id and Iq applied to the appropriate phases for acting only on the particular rotor portion until the desired torque is met with that optimized characteristic while the motor is running at the desired speed. Different sets of rotor portion look up tables may be defined for different optimized characteristics. For example, a first set of rotor portion look up tables 2700A-2700C may be defined for optimizing efficiency of the motor, while a second set of rotor portion look up tables (for the same distinct rotor portions) may be defined for optimizing (e.g., minimizing) harmonic distortion.

Assuming that (1) torque generated from poles 2090a and 2090d is T1, (2) torque generated from poles 2090b and 2090e is T2, and (3) torque generated from poles 2090c and 2090f is T3, and three rotor portion coefficients $\alpha$, $\beta$, and $\gamma$ may be assigned with $\alpha+\beta+\gamma=100\%$, the motor combined output torque at a given speed T(total) may equal $\alpha T1 + \beta T2 + \gamma T3$ (e.g., whereby $\alpha$ may be associated with the first rotor portion of table 2700A, $\beta$ may be associated with the second rotor portion of table 2700B, and $\gamma$ may be associated with the third rotor portion of table 2700C). During a second stage of motor tuning, a total rotor Id and Iq look up table (e.g., table 2700T of FIG. 27) may be generated based on a determined set of values for the rotor portion coefficients for each torque/speed combination, which may allow a motor to operate at an optimum motor characteristic (e.g., optimum efficiency) with a given torque command/speed combination, and at each given point of torque command/speed combination, each coefficient value at the torque command/speed combination may represent a specific combination of Id and Iq from each of the distinct rotor portion Id, Iq look up tables. For example, the value of each cell in a total rotor look up table may either include a particular set of values for the rotor portion coefficients or a particular set of Id and Iq values based on a particular set of values for the rotor portion coefficients. In either embodiment, the value of each cell in a total rotor look up table may enable identification of a number of pairs of a particular Id value and a particular Iq value, where each pair of Id and Iq values is to be applied to the stator phases associated with a particular one of the rotor portions to achieve the amount of torque associated with that cell when the motor's speed is the speed associated with that cell in order to achieve optimization with respect to a particular motor characteristic (e.g., efficiency, torque, power, cogging torque, harmonic distortion, torque ripple, etc.). The process of determining a particular pair of Id and Iq to define one pair of the number of pairs for a particular cell of the total rotor look up table for a particular torque and a particular speed for a particular optimized characteristic may include adjusting the rotor portion coefficients (e.g., three rotor portion coefficients $\alpha$, $\beta$, and $\gamma$) for weighting the values from the various rotor portion look up tables until the desired torque is met with that optimized characteristic while the motor is running at the desired speed when the combined weighted Id and Iq values are applied to the appropriate phases for acting on the various rotor portions. As just one example, following the highlighted cells of the tables of FIG. 27, once rotor portion tables 2700A-2700C have been determined for optimization of a particular motor characteristic for a particular motor with three defined rotor portions, a total rotor table 2700T may be defined for optimization of that same motor characteristic for that same motor. As one example, a cell of table 2700T for the particular combination of speed 8000 RPM and total torque 180 Nm in order to optimize the particular motor characteristic may be determined by varying the values of the three rotor portion coefficients $\alpha$, $\beta$, and $\gamma$ until the application of those coefficients identify the appropriate Id and Iq pair values for each rotor portion that when applied to the motor achieve total torque 180 Nm at a motor speed 8000 RPM with the particular motor characteristic (e.g., efficiency) optimized. A first set of values of the three rotor portion coefficients $\alpha$, $\beta$, and $\gamma$ may be 50%, 33%, and 17% for this particular highlighted cell of table 2700T and may be used to identify the highlighted cells of respective tables 2700A, 2700B, and 2700C (e.g., when rotor portion coefficient $\alpha$ of table 2700A is 50% and the total torque (e.g., for the applicable cell of table 2700T) is 180 Nm and the total speed is 8000 RPM, then the torque value of table 2700A is to be 90 Nm (i.e., 50% of the total motor torque 180 Nm) and the speed value of table 2700A is to be 8000 RPM (i.e., the same as the total motor speed) so as to identify the particular Id1/Iq1 pair 82 of the highlighted cell of table 2700A, when rotor portion coefficient $\beta$ of table 2700B is 33% and the total torque (e.g., for the applicable cell of table 2700T) is 180 Nm and the total speed is 8000 RPM, then the torque value of table 2700B is to be 60 Nm (i.e., 33% of the total motor torque 180 Nm) and the speed value of table 2700B is to be 8000 RPM (i.e., the same as the total motor speed) so as to identify the particular Id2/Iq2 pair 85 of the highlighted cell of table 2700B, and when rotor portion coefficient $\gamma$ for table 2700C is 17% and the total torque (e.g., for the applicable cell of table 2700T) is 180 Nm and the total speed is 8000 RPM, then the torque value of table 2700C is to be 30 Nm (i.e., 17% of the total motor torque of 180 Nm) and the speed value of table 2700C is to be 8000 RPM (i.e., the same as the total motor speed) so as to identify the particular Id3/Iq3 pair 88 of the highlighted cell of table 2700C). Then those three identified rotor portion Id/Iq pairs may be applied to the respective appropriate phases for acting only on the respective particular rotor portions as the motor rotates at speed 8000 with torque 210 to determine the motor characteristic (e.g., efficiency). Various different combinations of values of the three rotor portion coefficients α, β, and γ may be utilized (e.g., during simulation and/or tuning and/or calibration of a motor) for that particular torque/speed combination until the optimum characteristic is achieved, and then that particular combination of values of three rotor portion coefficients α, β, and γ may be used to finalize the defined values of that cell 85 of total rotor table 2700T. In some embodiments, if it is determined that the three rotor portion coefficients α, β, and γ may be 50%, 33%, and 17% for achieving optimum efficiency for total torque 210 Nm and speed 8000 RPM, then those three coefficient values may be stored in cell 85 of table 2700T, whereby table 2700T may be used in combination with tables 2700A-2700C by a motor control system (e.g., in the field (e.g., when the motor is being used by an end user (e.g., in a motor vehicle being driven on a road))) to identify the particular Id1/Iq1 pair 82 of the highlighted cell of table 2700A and the particular Id2/Iq2 pair 85 of the highlighted cell of table 2700B and the particular Id3/Iq3 pair 88 of the highlighted cell of table 2700C when the highlighted cell 85 of table 2700T is referenced for identifying the appropriate three pairs of Id/Iq values for use in controlling an inverter to generate the appropriate flux on the three rotor portions to achieve optimum efficiency when the motor is to have the torque/speed combination of 210 Nm and 8000 RPM. In some other embodiments, if it is determined that the three rotor portion coefficients α, β, and γ may be 50%, 33%, and 17% for achieving optimum efficiency for total torque 210 Nm and speed 8000 RPM, then those three coefficient values may be used to identify the particular Id1/Iq1 pair 82 of the highlighted cell of table 2700A and the particular Id2/Iq2 pair 85 of the highlighted cell of table 2700B and the particular Id3/Iq3 pair 88 of the highlighted cell of table 2700C and then those appropriate three pairs of Id/Iq values may be stored directly in the highlighted cell 85 of table 2700T, such that only total rotor table 2700T may be accessible by and used by a motor control system (e.g., in the field) to identify the particular Id1/Iq1 pair 82 and the particular Id2/Iq2 pair 85 and the particular Id3/Iq3 pair 88 when the highlighted cell 85 of table 2700T is referenced for identifying the appropriate three pairs of Id/Iq values for use in controlling an inverter to generate the appropriate flux on the three rotor portions to achieve optimum efficiency when the motor is to have the torque/speed combination of 210 Nm and 8000 RPM (e.g., such that only table 2700T and not also tables 2700A-2700C may be stored in or otherwise accessible to a controller of the motor system when being used in the field). As mentioned, different sets of rotor portion look up tables may be defined for different optimized characteristics (e.g., a first set of rotor portion look up tables 2700A-2700C may be defined for optimizing efficiency of the motor, while a second set of rotor portion look up tables (for the same distinct rotor portions) may be defined for optimizing (e.g., minimizing) harmonic distortion), and, therefore, so too may different respective total rotor look up tables be defined for different optimized characteristics (e.g., a first total rotor look up table 2700T may be defined for optimizing efficiency of the motor, while a second total rotor look up table (for the same motor) may be defined for optimizing (e.g., minimizing) harmonic distortion).

Continuing with the example of total rotor table 2700T being properly defined to optimize a motor characteristic (e.g., efficiency) for a motor determined to have three rotor portions (e.g., such that table 2700T associated with that motor characteristic may be defined by or may reference three distinct rotor portion tables) and eighteen stator phases, then, when a controller for that motor identifies a total motor torque demand of 180 Nm and a motor speed of 8000 RPM, the controller may use table 2700T to identify the particular Id1/Iq1 pair 82 and the particular Id2/Iq2 pair 85 and the particular Id3/Iq3 pair 88 (e.g., as associated with highlighted cell 85 of table 2700T). Then, based on the relative position of each rotor portion to the stator phases at any given moment (e.g., as may also be determined by the controller), the controller may be configured to apply each one of the three identified particular Id/Iq pairs (e.g., Id1/Iq1 pair 82 for the first rotor portion, Id2/Iq2 pair 85 for the second rotor portion, and Id3/Iq3 pair 88 for the third rotor portion) to an appropriate respective subset of the eighteen stator phases. The controller may be configured to convert each Id/Iq pair to actual stator phase currents and modulate the appropriate switches of the inverter so that such actual stator phase currents may be applied to appropriate stator phases, where the appropriate subset of stator phases may constantly change for a particular rotor portion as the rotor moves with respect to the stator phases. Any suitable controller application(s) and/or firmware and/or software and/or hardware and/or any suitable circuitry and/or techniques (e.g., space vector pulse width modulation ("SVPWM"), FOC, Park transforms, inverse Park transforms, Clarke transforms, inverse Clarke transforms, proportional integral derivative ("PID") control, quadrature encoder pulse ("QEP"), enhanced capture ("ECAP"), and/or the like) may be utilized by one or more motor controllers to enable such driving of a motor based on a total rotor Id and Iq look up table that may be based on two or more rotor portion Id and Iq look up tables for optimizing a particular motor characteristic (e.g., such that a particular identified Id/Iq pair may be applied to appropriate phases at the right time to meet a particular associated rotor portion as it rotates with respect to the stator).

For example, when a torque demand is received, a controller of a system may be configured to calculate which combination of rotor pole(s), stator coil(s), and corresponding half bridges should be activated, and the optimum PWM parameter for operating the switches of the half bridges, based on the current speed of rotor. The system may be configured to make the selection and generate PWM parameters based on a pre-determined efficiency map(s) and/or look up table(s). A goal may generally be to find the most efficient (or other optimized motor characteristic) combination to produce the desired torque. The system may be configured to choose priority other than efficiency when making the selection if required function is satisfied. If the rotor is rotating, the system may be configured to activate and deactivate coils and corresponding half bridges to maintain a rotating radial stator flux in synchronize with the rotor. The system can be configured to maintain the selection of rotor poles and the PWM parameters of activated half bridges until a new torque demand is provided, or the rotor speed has changed and requires new calculation. As just one example, in both FIG. 17B and FIG. 18B, respective combined stator flux distribution 1799s and combined stator flux distribution 1899s may have only one rotor pole pair 1790c and 1790f being used, and only 6 out of 18 phases activated, whereby α=0, β=0, and γ=100%. The controller may be configured to use the look up table for Id3 and Iq3 to determine the phase current. The end result may be the flux distribution of FIG. 17B and FIG. 18B, respectively. It is to be noted that if a new torque command/speed is given, but the controller still determines α=0, β=0, and γ=100% gives the optimum efficiency, then the controller may use look up table for Id3 and Iq3 and find another set of Id3/Iq3 combination based on the new torque command/speed to determine the phase current (e.g., in a new iteration of process 1600).

In FIG. 20B, combined stator flux distribution 2099s may have all pole pairs 2090a-2090f being used, and 18 out of 18 phases activated. Furthermore, if the controller may determine, with a received torque command/speed combination, that the optimum efficiency can be achieved with $\alpha$=50%, $\beta$=33%, and $\gamma$=17%. The controller may then use the look up table 2700A for Id1 and Iq1, table 2700B for Id2 and Iq2, and table 2700C for Id3 and Iq3 to determine the phase current (or such data may already be stored in table 2700T). The end result may be the flux distribution of FIG. 20B. Therefore, the controller may be configured to use a total of four look up tables (e.g., tables 2700A, 2700B, 2700C, and 2700T) to determine (1) which rotor pole pairs (or groups or area(s) or otherwise) to apply stator flux and generate torque, (2) which phases to activate, and/or (3) what is the amplitude of current on each activated phase, respectively. Therefore, a goal of identifying optimum efficiency for a current operating point may be reached. Any other suitable characteristic may be the goal to be achieved other than maximum efficiency (e.g., torque, power, cogging torque, harmonic distortion, torque ripple), in which case that characteristic may be used rather than efficiency to generate another set of look up tables that would then be used to control the motor at the current operating point. The desired phase current amplitude and waveform in time may be generated by pulse width modulation. For motor driving purpose, SVPWM may be a modulation method for generating AC. A field oriented control algorithm may be used to control inverter switches to generate AC.

FIG. 21 illustrates another embodiment of a construction of a rotor 2164 of a motor system. The geometry of rotor 2164 may be arranged to include another non-uniform physical construction and layout, but rotor 2164 may not be divided into individual poles. Instead, horizontally placed embedded magnets (e.g., magnet 2181b and 2181g) may occupy certain rotor angular positions, while V-shaped permanent magnet pairs (e.g., a pair including magnets 2181a and 2183a, and a pair including magnets 2181d and 2183d) may occupy certain rotor angular positions. Geometries of variable reluctance or synchronized reluctance (e.g., geometries 2187c, 2187e, 2187f, and 2187h) may occupy certain rotor angular positions.

Figure 22:
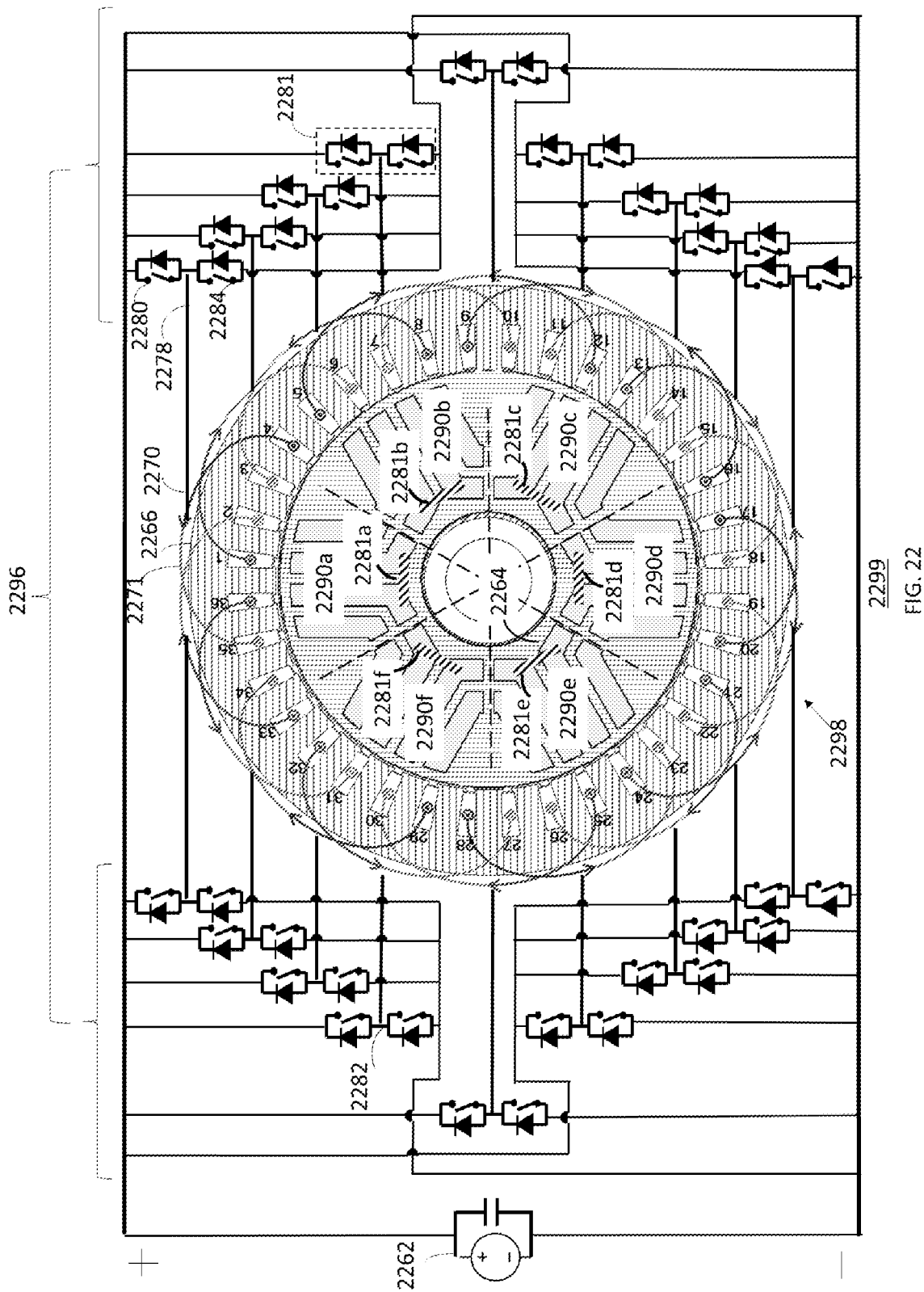
FIG. 22 is a schematic of another system with a motor in cross section, according to some embodiments.

FIG. 22 illustrates a schematic of a system 2299 that may include a power source 2262, an inverter 2296, and a motor 298 that may include a rotor 2264 and a stator 2266 (the stator and rotor are shown in section view for clarity). As shown, in some embodiments, rotor 2264 may be a six-pole rotor with 6 rotor poles 2290a-2290f, although any other suitable number of poles may be provided by a rotor of this disclosure. As shown, in some embodiments, stator 2266 may include 36 stator slots 2201-2236, 18 stator coils 2271, and 18 stator phases 2270, which may be electrically coupled to 18 inverter phases 2278, respectively, although any other suitable number of stator slots, stator coils, stator phases, and/or inverter phases may be provided by or for a stator of this disclosure (it is to be noted that the stator slots referred to herein as stator slots 2201-2236 are shown by FIG. 22 as stator slots 1-36 for clarity sake).

As shown in FIG. 22, inverter 2296 may include any suitable number of inverter components or half bridges 2281 (e.g., 18 as shown, or any other suitable number), where each half bridge 2281 may include a high power switch or switching device 2280 (e.g., at the top) and a low power switch or switching device 2284 (e.g., at the bottom), where switching device 2280 may be electrically coupled to a high side of any suitable power source 2262 (e.g., a battery), and where switching device 2284 may be electrically coupled to a low side of power source 2262. A midpoint 2282 of a connection between switching devices 2280 and 2284 of a half bridge 2281 may be operative to output or otherwise provide a respective inverter phase 2278 and electrically couple to a respective stator phase 2270. Each stator phase 2270 may be electrically coupled to a respective stator coil 2271. Any suitable inverter component(s) may be utilized to provide an inverter, including, but not limited to, a half bridge, H-bridge, various switches, and/or the like. As shown, a diode may be provided in parallel with a switching device (e.g., for reactive power/generating action), although such a component may not be provided in some embodiments. While two terminals of a switching device may be coupled to a midpoint and one of a low or high side of a power source, each switch may be controlled to be open or closed selectively using any suitable control signal(s) from any suitable source (e.g., control signal(s) 393 from controller 394 of FIG. 3 or any other suitable controller).

As shown in FIG. 22, each stator coil 2271 may be represented by a curved line that may be surrounding stator 2266. Each stator coil 2271 may occupy two or more stator slots (e.g., labelled stator coil 2271 may occupy stator slots 2204 and 2235, etc.), with the curved line entering or exiting the plane of the illustrated section along the slots of the stator. Stator 2266 may include any suitable number of stator slots (e.g., 36 slots 2201-2236) and any suitable number of stator coils 2271 (e.g., 18 stator coils 2271), where each stator coil 2271 may be coupled to one stator phase 2270. Although the number of stator slots may be twice the number of stator coils for a particular system (e.g., one coil may occupy two different slots, where each slot may be configured to accept one coil) as shown herein (e.g., for clarity purposes), any other suitable relationship may be appropriate. For example, certain systems may provide slots where each slot may be configured to accept two or more coils, in which case the number of slots may be equal to or less than the number of coils. In some particular situations (e.g., where balance and/or physical space may not be a determining factor), a system may include different slots that accept different numbers of coils, respectively. Different stator coils of stator 2270 may be coupled together to form connection(s), such as a star/Wye connection (see, e.g., the connections of FIG. 3) or a delta connection or any other suitable connection, to complete the circuit. Although the number of stator coils in a system may be a multiple of three (e.g., as shown by FIG. 22), the number of stator coils in a system can be any number, such as five (e.g., in a five phase motor).

Switching devices 2280 and 2284 of a half bridge 2281 of inverter 2296 may be operative to switch on and off to generate and output AC from an inverter phase 2278 to a stator phase 2270, whereby the AC may enter a stator coil 2271 through that inverter phase 2278 and may generate a magnetic field. Six-pole rotor 2264 may be electromagnetically coupled to the magnetic field generated by all of the stator coils (e.g., all 18 stator coils 2271).

System 2299 of FIG. 22 may be similar to system 199 of FIG. 1, but with an exception that, within each one of 6 rotor poles 2290a-2290f of rotor 2264, a respective one of permanent magnets 2281a-2281f may be embedded, thereby providing the rotor poles with both geometry of variable reluctance as well as permanent magnet, whereby system 2299 with such a motor 2298 may be referred to as a permanent magnet assisted synchronous reluctance motor.

FIG. 28 is a flowchart of an illustrative process 2800 for enabling control of a motor, wherein the motor may include a stator and a rotor, wherein the rotor may include a first rotor portion with a first rotor structural geometry and a second rotor portion with a second rotor structural geometry that is different than the first rotor structural geometry, and wherein the stator may include a first group of stator phases and a second group of stator phases that is different than the first group of stator phases (e.g., motor 2098 that may include rotor 2064 with a first rotor pole 2090a having magnets 2081a/2083a and a second rotor pole 2090b having magnet 2081b and a third rotor pole 2090c having geometry 2087c, and a stator 2066 with different groups of stator phases 2070 (e.g., 2070g-2070i and 2070p-2070r, etc.)). At operation 2802, process 2800 may define a first rotor portion look up table that, for each one of a plurality of combinations of a particular first rotor portion motor torque and a particular first rotor portion motor speed, includes a first Id value and a first Iq value to be applied to one of the groups of stator phases to achieve the particular first rotor portion motor torque and the particular first rotor portion motor speed when the motor is operating with an optimum characteristic (e.g., look up table 2700A may be defined for optimizing the efficiency characteristic of motor 2098 with respect to a first rotor portion (e.g., rotor pole 2090a alone or in combination with rotor pole 2090d)). At operation 2804, process 2800 may define a second rotor portion look up table that, for each one of the plurality of combinations of a particular second rotor portion motor torque and a particular second rotor portion motor speed, includes a second Id value and a second Iq value to be applied to one of the groups of stator phases to achieve the particular second rotor portion motor torque and the particular second rotor portion motor speed when the motor is operating with the optimum characteristic (e.g., look up table 2700B may be defined for optimizing the efficiency characteristic of motor 2098 with respect to a second rotor portion (e.g., rotor pole 2090b alone or in combination with rotor pole 2090e)). At operation 2806, process 2800 may define a total rotor look up table that, for each one of the plurality of combinations of a particular total rotor motor torque and a particular total rotor motor speed, includes (1) the first Id value and the first Iq value from the first rotor portion look up table for the combination of (1a) a particular first rotor portion motor torque that is related to the particular total rotor motor torque based on a first rotor portion coefficient and (1b) a particular first rotor portion motor speed that is equal to the particular total rotor motor speed, and (2) the second Id value and the second Iq value from the second rotor portion look up table for the combination of (2a) a particular second rotor portion motor torque that is related to the particular total rotor motor torque based on a second rotor portion coefficient and (2b) a particular second rotor portion motor speed that is equal to the particular total rotor motor speed (e.g., total rotor look up table 2700T may be defined for optimizing the efficiency characteristic of motor 2098 using each one of defined rotor portion look up tables 2700A and 2700B). At operation 2808, process 2800 may include enabling a controller to access the defined total rotor look up table for controlling the motor in the field (e.g., a controller (e.g., controller 394) may access total rotor look up table 2700T (e.g., data 394d) for identifying particular pairs of Id/Iq values for controlling a motor (e.g., motor 398) for a particular torque demand (e.g., demand 391) and a particular motor speed).

It is understood that the operations shown in process 2800 of FIG. 28 are only illustrative and that existing operations may be modified or omitted, additional operations may be added, and the order of certain operations may be altered.

One, some, or all of the processes described with respect to FIGS. 1-28 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device. In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from any one of the subsystems, devices, servers, computers, machines, or the like to any other one of the subsystems, devices, servers, computers, machines, or the like using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of any one or more of the subsystems, devices, servers, computers, machines, or the like may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of any one or more of the subsystems, devices, servers, computers, machines, or the like are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for driving polyphase motors, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Many alterations and modifications of the preferred embodiments will no doubt become apparent to a person of ordinary skill in the art after having read the foregoing description, it is to be understood that the particular embodiments shown and described by way of illustration are in no way intended to be considered limiting.

Therefore, those skilled in the art will appreciate that the concepts can be practiced by other than the described embodiments, which are presented for purposes of illustration rather than of limitation.

What is claimed is:

1. A method for enabling control of a motor, wherein the motor comprises a stator and a rotor, wherein the rotor comprises a first rotor portion with a first rotor structural geometry and a second rotor portion with a second rotor structural geometry that is different than the first rotor structural geometry, and wherein the stator comprises a first group of stator phases and a second group of stator phases that is different than the first group of stator phases, the method comprising:
   defining a first rotor portion look up table that, for each one of a plurality of combinations of a particular first rotor portion motor torque and a particular first rotor portion motor speed, comprises a first Id value and a first Iq value to be applied to one of the groups of stator phases to achieve the particular first rotor portion motor torque and the particular first rotor portion motor speed when the motor is operating with an optimum characteristic; and
   defining a second rotor portion look up table that, for each one of the plurality of combinations of a particular second rotor portion motor torque and a particular second rotor portion motor speed, comprises a second Id value and a second Iq value to be applied to one of the groups of stator phases to achieve the particular second rotor portion motor torque and the particular second rotor portion motor speed when the motor is operating with the optimum characteristic.

2. The method of claim 1, further comprising:
   defining a total rotor look up table that, for each one of the plurality of combinations of a particular total rotor motor torque and a particular total rotor motor speed, comprises:
   the first Id value and the first Iq value from the first rotor portion look up table for the combination of a particular first rotor portion motor torque that is related to the particular total rotor motor torque based on a first rotor portion coefficient and a particular first rotor portion motor speed that is equal to the particular total rotor motor speed; and
   the second Id value and the second Iq value from the second rotor portion look up table for the combination of a particular second rotor portion motor torque that is related to the particular total rotor motor torque based on a second rotor portion coefficient and a particular second rotor portion motor speed that is equal to the particular total rotor motor speed.

3. The method of claim 2, further comprising enabling a controller to access the defined total rotor look up table for controlling the motor in the field.

4. The method of claim 1, wherein the optimum characteristic is efficiency.

5. The method of claim 1, wherein the optimum characteristic comprises harmonic distortion.

6. The method of claim 1, wherein the optimum characteristic comprises torque ripple.

7. The method of claim 1, wherein:
   the first rotor structural geometry comprises switch reluctance geometry or synchronized reluctance geometry; and
   the second rotor structural geometry comprises at least one permanent magnet.

8. The method of claim 1, wherein the rotor comprises:
   a first rotor pole comprising the first rotor structural geometry; and
   a second rotor pole comprising the second rotor structural geometry.

9. The method of claim 1, wherein:
   the rotor comprises:
      a first rotor pole comprising the first rotor structural geometry;
      a second rotor pole comprising the second rotor structural geometry;
      a third rotor pole comprising the first rotor structural geometry; and
      a fourth rotor pole comprising the second rotor structural geometry;
   the first rotor portion comprises the first rotor pole and the third rotor pole; and
   the second rotor portion comprises the second rotor pole and the fourth rotor pole.

10. The method of claim 1, further comprising enabling a controller to access each one of the defined first rotor portion look up table and the defined second rotor portion look up table for controlling the motor in the field.

11. The method of claim 1, wherein:
   the rotor further comprises a third rotor portion with a third rotor structural geometry that is different than the first rotor structural geometry and that is different than the second rotor structural geometry;
   the stator further comprises a third group of stator phases that is different than the first group of stator phases and that is different than the second group of stator phases; and
   the method further comprises defining a third rotor portion look up table that, for each one of the plurality of combinations of a particular third rotor portion motor torque and a particular third rotor portion motor speed, comprises a third Id value and a third Iq value to be applied to one of the groups of stator phases to achieve the particular third rotor portion motor torque and the particular third rotor portion motor speed when the motor is operating with the optimum characteristic.

12. The method of claim 11, further comprising enabling a controller to access each one of the defined first rotor portion look up table and the defined second rotor portion look up table and the defined third rotor portion look up table for controlling the motor in the field.

13. The method of claim 11, further comprising:
   defining a total rotor look up table that, for each one of the plurality of combinations of a particular total rotor motor torque and a particular total rotor motor speed, comprises:
   the first Id value and the first Iq value from the first rotor portion look up table for the combination of a particular first rotor portion motor torque that is related to the particular total rotor motor torque based on a first rotor portion coefficient and a particular first rotor portion motor speed that is equal to the particular total rotor motor speed;
   the second Id value and the second Iq value from the second rotor portion look up table for the combination of a particular second rotor portion motor torque that is related to the particular total rotor motor torque based on a second rotor portion coefficient and a particular second rotor portion motor speed that is equal to the particular total rotor motor speed; and the third Id value and the third Iq value from the third rotor portion look up table for the combination of a particular third rotor portion motor torque that is related to the particular total rotor motor torque based on a third rotor portion coefficient and a particular third rotor portion motor speed that is equal to the particular total rotor motor speed.

14. The method of claim 13, further comprising enabling a controller to access the defined total rotor look up table for controlling the motor in the field.

15. The method of claim 11, wherein:
the rotor comprises:
- a first rotor pole comprising the first rotor structural geometry;
- a second rotor pole comprising the second rotor structural geometry;
- a third rotor pole comprising the third rotor structural geometry;
- a fourth rotor pole comprising the first rotor structural geometry;
- a fifth rotor pole comprising the second rotor structural geometry; and
- a sixth rotor pole comprising the third rotor structural geometry;

the first rotor portion comprises the first rotor pole and the fourth rotor pole;
the second rotor portion comprises the second rotor pole and the fifth rotor pole; and
the third rotor portion comprises the third rotor pole and the sixth rotor pole.

* * * * *